(12) United States Patent
McQuilkin et al.

(10) Patent No.: US 12,174,111 B2
(45) Date of Patent: Dec. 24, 2024

(54) SPECTRAL IMAGING AND ANALYSIS FOR REMOTE AND NONINVASIVE DETECTION OF PLANT RESPONSES TO HERBICIDE TREATMENTS

(71) Applicant: INNOPIX, INC., Plymouth, MN (US)

(72) Inventors: Gary L. McQuilkin, Plymouth, MN (US); Gregory L. Engelke, New Brighton, MN (US)

(73) Assignee: INNOPIX, INC., Plymouth, MN (US)

( * ) Notice: Subject to any disclaimer, the term of this patent is extended or adjusted under 35 U.S.C. 154(b) by 236 days.

(21) Appl. No.: 17/767,279

(22) PCT Filed: Oct. 6, 2020

(86) PCT No.: PCT/US2020/054349
§ 371 (c)(1),
(2) Date: Apr. 7, 2022

(87) PCT Pub. No.: WO2021/071804
PCT Pub. Date: Apr. 15, 2021

(65) Prior Publication Data
US 2022/0397517 A1 Dec. 15, 2022

Related U.S. Application Data

(60) Provisional application No. 62/911,695, filed on Oct. 7, 2019.

(51) Int. Cl.
*G01N 21/31* (2006.01)
*G01N 21/17* (2006.01)
*G01N 21/84* (2006.01)

(52) U.S. Cl.
CPC ..... *G01N 21/31* (2013.01); *G01N 2021/1789* (2013.01); *G01N 2021/1793* (2013.01); *G01N 2021/8466* (2013.01)

(58) Field of Classification Search
CPC . G01J 2003/2826; G01J 3/027; A01B 79/005; G01N 2021/1797; G01N 2021/3155; G01N 21/84; G01N 2021/635
(Continued)

(56) References Cited

U.S. PATENT DOCUMENTS

| 3,922,550 A | 11/1975 | Crowley et al. |
| 4,182,571 A | 1/1980 | Naofumi et al. |

(Continued)

FOREIGN PATENT DOCUMENTS

| EP | 0 885 587 A1 | 12/1998 |
| EP | 1 208 376 A1 | 5/2002 |

(Continued)

OTHER PUBLICATIONS

PCT/US2015/036146, International Search Report and Written Opinion of the International Searching Authority, ISA/US, Oct. 12, 2015, 10 pgs.

(Continued)

*Primary Examiner* — Md M Rahman
(74) *Attorney, Agent, or Firm* — Kagan Binder, PLLC

(57) ABSTRACT

An approach to remotely and noninvasively detect and evaluate the response of a plant or plant population to a man-made or natural treatment regime (e.g., herbicide, fungicide or fertilizer treatment) via spectral imaging methods and systems comprising the capture of a plurality of spectral images for a common plant scene, each associated with a selected wavelength region of the electromagnetic spectrum, the formulation of an index function from the spectral information indicative of the plant response over time, and the assessment of mathematical parameters quantifying the time-varying plant response to the treatment regime. The plant response to a treatment regime may be quantified in illustrative embodiments in a fraction of the time previously (Continued)

required by many conventional approaches. Applying varying herbicide dosages to segments of the same plant population enables easy determination of a dose-response curve.

21 Claims, 24 Drawing Sheets

(58) Field of Classification Search
USPC ........................................................ 356/326
See application file for complete search history.

(56) References Cited

U.S. PATENT DOCUMENTS

| | | | |
|---|---|---|---|
| 4,275,741 A | 6/1981 | Edrich | |
| 4,407,292 A | 10/1983 | Edrich | |
| 4,993,424 A | 2/1991 | Suszynski et al. | |
| 5,115,815 A | 5/1992 | Hansen | |
| 5,293,877 A | 3/1994 | O'Hara et al. | |
| 5,324,937 A | 6/1994 | Chen et al. | |
| 5,386,831 A | 2/1995 | Gluck | |
| 5,420,419 A | 5/1995 | Wood | |
| 5,450,053 A | 9/1995 | Wood | |
| 5,675,149 A | 10/1997 | Wood et al. | |
| 5,678,555 A | 10/1997 | O'Connell | |
| 5,874,711 A | 2/1999 | Champetier et al. | |
| 5,874,736 A | 2/1999 | Pompei | |
| 5,893,833 A | 4/1999 | Pompei et al. | |
| 6,045,257 A | 4/2000 | Pompei et al. | |
| 6,056,435 A | 5/2000 | Pompei | |
| 6,111,640 A | 8/2000 | Hedman et al. | |
| 6,144,031 A | 11/2000 | Herring et al. | |
| 6,160,902 A | 12/2000 | Dickson et al. | |
| 6,173,068 B1 | 1/2001 | Prookoski | |
| 6,241,384 B1 | 6/2001 | Pompei et al. | |
| 6,292,685 B1 | 9/2001 | Pompei | |
| 6,299,347 B1 | 10/2001 | Pompei | |
| 6,300,632 B1 | 10/2001 | Liu et al. | |
| 6,366,681 B1 | 4/2002 | Hutchins | |
| 6,402,371 B2 | 6/2002 | Pompei et al. | |
| 6,490,075 B1 | 12/2002 | Scheps et al. | |
| 6,499,877 B2 | 12/2002 | Pompei | |
| 6,524,239 B1 | 2/2003 | Reed et al. | |
| 6,547,744 B1 | 4/2003 | Pompei et al. | |
| 6,559,447 B2 | 5/2003 | Wood | |
| 6,596,997 B2 | 7/2003 | Kaufman | |
| 6,606,115 B1 | 8/2003 | Alicandro et al. | |
| 6,611,289 B1 | 8/2003 | Yu et al. | |
| 6,631,287 B2 | 10/2003 | Newman et al. | |
| 6,639,665 B2 | 10/2003 | Poole | |
| 6,709,154 B1 | 3/2004 | Janotte | |
| 7,149,366 B1 | 12/2006 | Sun | |
| 7,277,744 B2 | 10/2007 | Schaefer | |
| 7,340,293 B2 | 3/2008 | McQuilkin et al. | |
| 7,446,299 B2 | 11/2008 | Kobayashi | |
| 7,622,641 B2 | 11/2009 | McCutchen et al. | |
| 8,109,634 B2 | 2/2012 | Gil | |
| 8,126,213 B2 | 2/2012 | Chao et al. | |
| 8,159,525 B2 | 4/2012 | Park et al. | |
| 8,224,425 B2 | 7/2012 | Freeman et al. | |
| 8,269,197 B2 | 9/2012 | Goer et al. | |
| 8,320,996 B2 | 11/2012 | Panasyuk et al. | |
| 8,374,682 B2 | 2/2013 | Freeman et al. | |
| 8,665,440 B1 | 3/2014 | Kompaniets et al. | |
| 8,952,222 B2 | 2/2015 | Sala et al. | |
| 9,541,495 B2 | 1/2017 | Ohtomo et al. | |
| 9,551,616 B2 | 1/2017 | McQuilkin et al. | |
| 10,222,260 B2 | 3/2019 | McQuilkin et al. | |
| 10,656,015 B2 | 5/2020 | McQuilkin et al. | |
| 10,935,427 B2 | 3/2021 | McQuilkin et al. | |
| 11,422,030 B2 | 8/2022 | McQuilkin et al. | |
| 2001/0016053 A1 | 8/2001 | Dickson et al. | |
| 2002/0024665 A1 | 2/2002 | Masten | |
| 2002/0049386 A1 | 4/2002 | Herman et al. | |
| 2002/0143257 A1 | 10/2002 | Newman et al. | |
| 2003/0006170 A1 | 1/2003 | Lawandy | |
| 2003/0012253 A1 | 1/2003 | Pavlidis | |
| 2003/0030801 A1 | 2/2003 | Levenson et al. | |
| 2003/0067958 A1 | 4/2003 | Jang | |
| 2003/0142723 A1 | 7/2003 | Laurence et al. | |
| 2004/0019269 A1 | 1/2004 | Schaefer et al. | |
| 2004/0101210 A1 | 5/2004 | Weinstein et al. | |
| 2004/0154550 A1 | 8/2004 | McQuilkin | |
| 2004/0254472 A1 | 12/2004 | McQuilkin | |
| 2005/0098713 A1 | 5/2005 | Holland | |
| 2005/0104771 A1 | 5/2005 | Terry et al. | |
| 2006/0247514 A1 | 11/2006 | Panasyuk et al. | |
| 2007/0016079 A1 | 1/2007 | Freeman et al. | |
| 2007/0232930 A1 | 10/2007 | Brand et al. | |
| 2007/0249913 A1 | 10/2007 | Freeman et al. | |
| 2008/0088837 A1 | 4/2008 | Gardner | |
| 2008/0154138 A1 | 6/2008 | McQuilkin | |
| 2008/0212089 A1 | 9/2008 | Rosengaus | |
| 2009/0021598 A1 | 1/2009 | McLean | |
| 2009/0295910 A1 | 12/2009 | Mir et al. | |
| 2009/0326383 A1 | 12/2009 | Barnes et al. | |
| 2011/0125477 A1 | 5/2011 | Lightner et al. | |
| 2012/0061586 A1 | 3/2012 | Yao et al. | |
| 2012/0200682 A1 | 8/2012 | Mestha et al. | |
| 2013/0094717 A1 | 4/2013 | Janni et al. | |
| 2013/0137949 A1 | 5/2013 | Freeman et al. | |
| 2014/0022381 A1 | 1/2014 | Heinhold | |
| 2014/0232858 A1 | 8/2014 | Ohtomo et al. | |
| 2015/0092099 A1 | 4/2015 | Shen et al. | |
| 2016/0069743 A1 | 3/2016 | McQuilkin et al. | |
| 2018/0024050 A1 | 1/2018 | Hollstein | |

FOREIGN PATENT DOCUMENTS

| | | | |
|---|---|---|---|
| JP | S54-62880 A | | 5/1979 |
| WO | WO 00/16051 A1 | | 3/2000 |
| WO | WO 01/16594 A1 | | 3/2001 |
| WO | WO 2004/089206 A1 | | 10/2004 |
| WO | WO 2004/110248 A2 | | 12/2004 |
| WO | WO 2013/047627 A1 | | 4/2013 |
| WO | WO 2013/063106 A2 | | 5/2013 |
| WO | WO 2013/064511 A1 | | 5/2013 |
| WO | 2013/116316 A1 | | 8/2013 |
| WO | WO 2015/195746 A1 | | 12/2015 |
| WO | WO 2021/071804 A1 | | 4/2021 |

OTHER PUBLICATIONS

Ahlberg, L., "Cradle turns smartphone into handheld biosensor," Inside Illinois, vol. 32, No. 22, Jun. 2013, pp. 1-12.
Anonymous, "SARS Temperature Sensors," retrieved from URL:http://www.temperatures.com/sarssensors.html, on Jan. 2011, pp. 6. (XP002616682).
Ashraf et al., "Chapter 8—Introduction to Remote Sensing of Biomass," from Biomass and Remote Sensing of Biomass, Edited by E. Atazadeh, Sep. 2011, ISBN 978-953-307-490-0; DOI: 10.5772/939, pp. 129-170.
Asner, G., "Biophysical and Biochemical Sources of Variability in Canopy Reflectance," Remote Sensing of Environment, vol. 64, No. 3, Jun. 1998, pp. 234-253.
Barbagallo et al., "Rapid, Noninvasive Screening for Perturbations of Metabolism and Plant Growth Using Chlorophyll Fluorescence Imaging," Plant Physiology, vol. 132, No. 2, Jun. 2003, pp. 485-493.
Blum et al., "Protocol for Rapid Point-of-Contact Public Screening for SARS using Clinical Digital Infrared Thermal Imaging," American College of Clinical Thermology (ACCT), New Derry, PA, USA, Apr. 2003, pp. 5. (XP008131528).
Borah et al., "A review of communication-oriented optical wireless systems," EURASIP Journal on Wireless Communications and Networking, vol. 91, Mar. 2012, pp. 28.
Brecke et al., "Effect of Glyphosate on Intact Bean Plants (*Phaseolus vulgaris* L.) and Isolated Cells," Plant Physiology, vol. 66, No. 4, Oct. 1980, pp. 656-659.
Burgos et al., "Review: Confirmation of Resistance to Herbicides and Evaluation of Resistance Levels," Weed Science, vol. 61, No. 1, Jan. 2013, pp. 4-20.

(56) References Cited

OTHER PUBLICATIONS

Cerussi et al., "Predicting response to breast cancer neoadjuvant chemotherapy using diffuse optical spectroscopy," Proceedings of the National Academy of Sciences of the United States of America, vol. 104, No. 10, Mar. 2007; pp. 4014-4019.
Chao et al., "Detection of Fecal/Ingesta Contaminants on Poultry Processing Equipment Surfaces by Visible and Near-Infrared Reflectance Spectroscopy," Applied Engineering in Agriculture, vol. 24, No. 1, Jan. 2008, pp. 49-55.
Crespo, R.J., "Herbicide-Resistant Risk Assessment: Response of Common Nebraska Weeds to Dicamba Dose," Thesis for Degree of Master of Science, Agronomy, University of Nebraska, Jul. 2011, pp. 162.
Curtin, A., "File: Oxy and Deoxy Hemoglobin Near-Infrared absorption spectra.png," from Wikimedia Commons, Aug. 2012, retrieved from https://commons.wikimedia.org/wiki/File:Oxy_and_Deoxy_Hemoglobin_Near-Infrared_absorption_spectra.png, pp. 1.
Dias et al., "Germination test as a fast method to detect glyphosate-resistant sourgrass," Plant Protection, Bragantia, vol. 74, No. 3, Jul.-Sep. 2015, pp. 307-310.
Gomes et al., "Alteration of plant physiology by glyphosate and its by-product aminomethylphosphonic acid: an overview," Journal of Experimental Botany, vol. 65, No. 17, Jul. 2014, pp. 4691-4703.
Hassan et al., "Observation of skin thermal inertia distribution during reactive hyperaemia using a single-hood measurement system," Physiological Measurement, vol. 22, 2001, pp. 187-200.
Heuveling et al., "Nanocolloidal albumin-IRDye 800CW: a near-infrared fluorescent tracer with optimal retention in the sentinel lymph node," European Journal of Nuclear Medicine and Molecular Imaging, vol. 39, No. 7, Feb. 2012, pp. 1161-1168.
Jun et al., "Assessment of bacterial biofilm on stainless steel by hyperspectral fluorescence imaging," Sensing and Instrumentation for Food Quality and Safety, vol. 3, No. 1, Jan. 2009, pp. 41-48.
Lawrence et al., "Egg Embryo Development Detection with Hyperspectral Imaging," International Journal of Poultry Science, vol. 5, No. 10, Oct. 2006, pp. 964-969.
Liu et al., "Applying Near-Infrared Spectroscopy and Chemometrics to Determine Total Amino Acids in Herbicide-Stressed Oilseed Rape Leaves," Food Bioprocess Technology, vol. 4, No. 7, Oct. 2010, pp. 1314-1321.
Mieog et al., "Toward optimization of imaging system and lymphatic tracer for near-infrared fluorescent sentinel lymph node mapping in breast cancer," Annals of Surgical Oncology, vol. 18 No. 9, Mar. 2011, pp. 2483-2491.
Minkey et al., "Estimating Dose Response Curves for Predicting Glyphosate Use Rates in Australia," Eleventh Australian Weeds Conference Proceedings, Sep./Oct. 1996, pp. 166-169.
Nandula et al., "Herbicide Absorption and Translocation in Plants using Radioisotopes," Weed Science, vol. 63, No. SP1 Special Issue: Research Methods in Weed Science, Feb. 2015, pp. 140-151.
Ng et al., "Infrared thermographic in identification of human elevated temperature with Biostatistical and ROC analysis," Proceedings of SPIE, vol. 5405, Thermosense XXVI, Apr. 2004, pp. 88-97. (XP040184264).
Otsuka et al., "Imaging of Skin Thermal Properties with Estimation of Ambient Radiation Temperature," IEEE Engineering in Medicine and Biology, vol. 21, No. 6, Nov./Dec. 2002, pp. 49-55.
Park et al., "Contaminant Classification of Poultry Hyperspectral Imagery Using a Spectral Angle Mapper Algorithm," Biosystems Engineering, vol. 96, No. 3, Mar. 2007, pp. 323-333.
Pompei et al., "Arterial Thermometry Via Heat Balance at the Ear," Physicians Reference Handbook of Temperature, Oct. 1996, pp. 7.
Qin et al., "Detection of Organic Residues on Poultry Processing Equipment Surfaces by LED-Induced Fluorescence Imaging," Applied Engineering in Agriculture, vol. 27, No. 1, Jan. 2011, pp. 153-161.
Rajchard, J., "Ultraviolet (UV) light perception by birds: a review," Veterinarni Medicina, vol. 54, No. 8, Aug. 2009, pp. 351-359.

Seffrin, R.J., "Thermal Imaging for Detecting Potential SARS Infection," Presented at the National Conference on Thermal Imagers for Fever Screening-Selection, Usage and Testing, May 2003, pp. 5.
Smith et al., "Detection of hatching and table egg defects using hyperspectral imaging," USDA, Agricultural Research Service, Russell Research Center, Athens, GA, USA, European Poultry Conference Proceedings, Sep. 2006, pp. 5.
Tan et al., "Development and deployment of Infrared Fever Screening Systems," Proceedings of SPIE, vol. 5405, Thermosense XXVI, Apr. 2004, pp. 68-78. (XP040184262).
Ulrich, T., "Quantifying Spectral Diversity within a MODIS Footprint—Goetz Recipient Research in the Himalayas," The NIR Community from ASD Inc., a PANalytical Company, posted on Jan. 2013 and retrieved from http://discover.asdi.com/bld/93042/Quantifying-Spectral-Diversity-within-a-MODIS-Footprint-Goetz-Recipeint-Research-in-the-Himalayas, on Sep. 2015, pp. 4.
Wang et al . . . , "Types of thermal imaging systems for mass fever screening and their evaluations," Proceedings of SPIE, vol. 5405, Thermosense XXVI, Apr. 2004, pp. 79-87. (XP040184263).
Wu et al., "Stop outbreak of SARS with Infrared Cameras," Proceedings of SPIE, vol. 5405, Thermosense XXVI, Apr. 2004, pp. 98-105. (XP040184265).
Yoon et al., "Development of real-time line-scan hyperspectral imaging system for online agricultural and food product inspection," Proceedings of SPIE, The International Society for Optical Engineering, No. 7676, Sensing for Agriculture and Food Quality and Safety II, Apr. 2010, pp. 3 (Abstract Only).
Zhang et al., "Comparison of Spectral and Image Morphological Analysis for Egg Early Hatching Property Detection Based on Hyperspectral Imaging," PLoS One, vol. 9, No. 2, Feb. 2014, e88659, pp. 10.
Zitova et al., "Image registration methods: a survey," Image and Vision Computing, vol. 21, No. 11, Oct. 2003, pp. 977-1000.
Zuzak et al., "Novel hyperspectral imager aids surgeons," SPIE Newsroom, Dec. 2008, pp. 3.
"CCD sensor Spectral sensitivity," from http://www.gitthailand.com/Lighting_for_Machine_Vision.php—viewed Sep. 16, 2015 and elsewhere prior to Jun. 18, 2014, pp. 1.
"Crysta-Lyn Chemical Company: Manufacturer of NIR, Visible, UV Laser Dyes and Absorbers," retrieved from http://www.crystalyn.com/about_us_srystalyn.html, on Sep. 14, 2015, pp. 2.
"Facts about Weeds—The Bullies of the Plant World," from Weed Science Society of America (WSSA), posted Dec. 11, 2012, retrieved from https://wssa.net/wp-content/uploads/WSSA-Facts-About-Weeds.pdf, on Oct. 12, 2022, pp. 4.
"Human Body Temperature Monitoring System," from LAND Instruments International, cited in Response to Communication in European Application No. 04785717, on Jan. 24, 2012, pp. 2.
"Introduction to Weeds and Herbicides," Penn State Cooperative Extension—College of Agricultural Sciences, retrieved from https://extension.psu.edu/pests/weeds/control/introduction-to-weeds-and-herbicides/herbicides, on Oct. 5, 2022, pp. 28.
Noncitrus Fruits and Nuts—2012 Preliminary Summary, United States Department of Agriculture, National Agricultural Statistics Service, Jan. 2013, ISSN 1948-2698, pp. 80.
"Non-Photosynthetic Vegetation," from L3Harris™ Geospatial, retrieved from https://www.l3harrisgeospatial.com/docs/NonPhotosyntheticVegetation.html, (Apr. 3, 2018) retrieved on Oct. 12, 2022, pp. 5.
"Retinal image," from Photonetc, retrieved from http://www.photonetc.com/EN/APPLICATION/Health?RETINAL_IMAGING-78, Jun. 2014, pp. 2.
"Urine Absorbance Spectrum," retrieved from http://biotechnology.tbzmed.ac.ir/?pageid=22, viewed prior to Jun. 2014, pp. 1.
"Utah State University, Cooperative Extension/NASA," retrieved from http://extension.usu.edu.nasa, viewed prior to Jun. 2014, pp. 1.
Virtual Labs, http://cse21-iiith.virtural-labs.ac.in/exp3/index.php?section=Theory—vegetation spectra viewed Sep. 2015, viewed on different, expired site prior to Jun. 2014, pp. 4.
Water absorbance spectrum, http://www.inspectiontechnologies.co.uk/ITL%20EYE%20SPY.html, viewed prior to Jun. 2014, pp. 1.

(56) References Cited

OTHER PUBLICATIONS

International Search Report and Written Opinion of International Application No. PCT/US04/16546, dated Feb. 15, 2006, 10 pp.
International Search Report and Written Opinion of the International Application No. PCT/US2015/036146, dated Nov. 6, 2015, 10 pp.
International Search Report and Written Opinion of International Application No. PCT/US20/54349, dated Feb. 17, 2021, 12 pp.
Supplementary European Search Report, EP Application No. 04785717, Mar. 9, 2011, 5 pages.
Supplementary European Search Report, EP Application No. 15810439, Jan. 26, 2018, 7 pages.
Supplementary European Search Report, EP Application No. 2084794, Aug. 11, 2023, 8 pages.
Canadian Application No. 3,157,203, Office action and Examination Search Report, dated Feb. 1, 2024, 5 pgs.

Schematic of color images showing vegetative index performance for detecting new growth in Globe Arborvitae

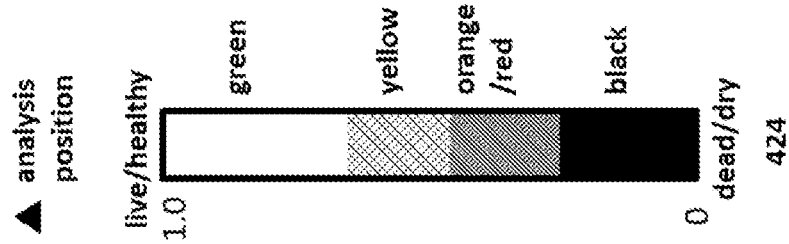
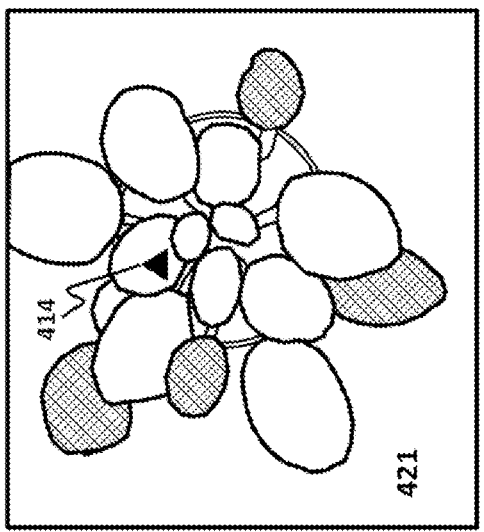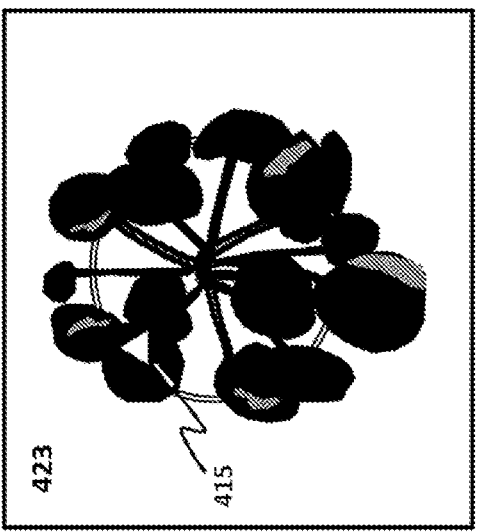
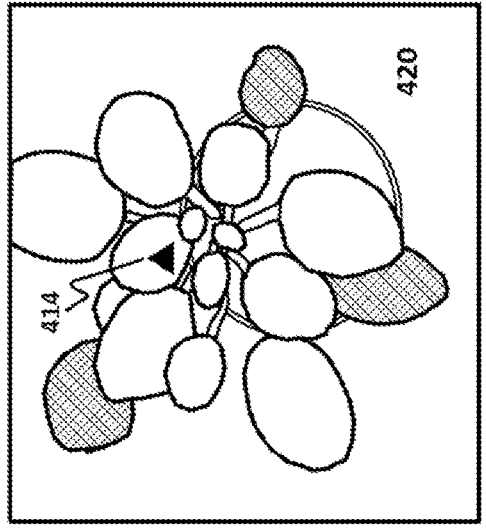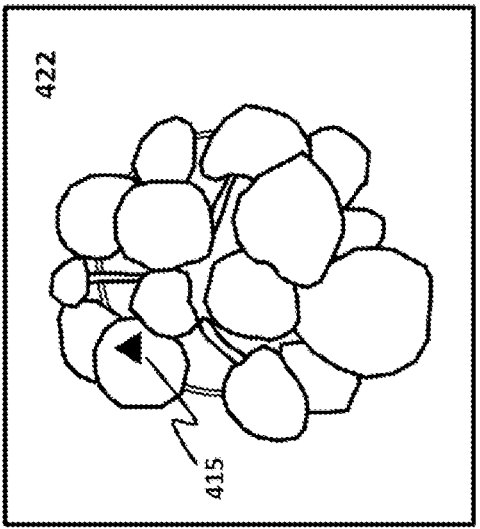
Fig. 20

SPECTRAL IMAGING AND ANALYSIS FOR REMOTE AND NONINVASIVE DETECTION OF PLANT RESPONSES TO HERBICIDE TREATMENTS

PRIORITY CLAIM

This application claims priority to International Application No. PCT/US2020/054349, filed Oct. 6, 2020, which in turn claims the benefit of United States Provisional Patent Application No. 62/911,695 filed on Oct. 7, 2019, entitled "SPECTRAL IMAGING AND ANALYSIS FOR REMOTE AND NONINVASIVE DETECTION OF PLANT RESPONSES TO HERBICIDE TREATMENT," the disclosures of which are hereby incorporated by reference in their respective entireties for all purposes.

FIELD OF THE INVENTION

This invention relates to remotely and noninvasively detecting a plant response to one or more herbicides via spectral analysis techniques. More specifically, this invention relates to remotely and noninvasively detecting a plant response to one or more plant treatments, such as a herbicide treatment, via analysis of spectral data acquired from bands of the electromagnetic spectrum.

BACKGROUND OF THE INVENTION

There is a constant, worldwide competition between desirable plants and undesirable plants for water, sunlight, nutrients and space. Undesired plants can waste water, reduce food supplies, disrupt natural ecosystems, provide tinder for rampant wildfires, injure people and livestock, trigger allergies, serve as a breeding ground for insects, and damage farm equipment. In the ever-changing struggle to keep undesirable plants under control, herbicides serve as a valuable tool.

Herbicides are commonly used in the commercial production of crops to eradicate unwanted plants, such as weeds, from a field of crop plants in a convenient and rapid manner. Plant breeders design crop plants that are tolerant of a herbicide such that a field application destroys the unwanted plants selectively relative to the desired crop plants. See U.S. Pat. No. 7,622,641 B2. Farmers desire to know the degree of herbicide resistance present in their fields. In residential lawns, herbicides are a common tool in the control of weed populations.

In order to apply herbicides in a safe and effective manner, it is desirable to test the efficacy of each herbicide on its target plant population under a variety of conditions. Since nearly 250 plant species have developed resistance to the herbicides used to control them (Weed Science Society of America, Facts about Weeds, http://wssa.net/wp-content/uploads/WSSA-Fact-SheetFinal.pdf), it is evident that this testing process may be repeated periodically to discover changes in efficacy. For these reasons, the need to test herbicides for efficacy against ever-changing plant populations is widely recognized and the number of such tests continues to increase. To this end, a number of test methods have evolved in an attempt to arrive at an efficient, economical and convenient method to measure herbicide efficacy for a target plant population.

There are a number of conventional tests used to evaluate herbicide effectiveness. Examples are:

a) Application of Multiple Herbicide Dosages: In one type of test, multiple herbicide dosages, chosen from a range of herbicide dosages, are sprayed on different segments of a target plant population. "Review: Confirmation of Resistance to Herbicides and Evaluation of Resistance Levels," Weed Science, Vol. 61, No. 1, January-March 2013, is available at http://www.wssajournals.org/; and American University of Nigeria, http://www.aun.edu.eg/distance/agriculture/HRGW/3%20Detecting%20 . . . htm. The plants are typically inspected by trained human inspectors 21-28 days following the treatment to estimate efficacy of the various herbicide dosages acting on the target plant population.

b) Measurement of Foliage Weights: In other tests, foliage weights are measured in a laboratory setting to determine the herbicide resistance of target plants. These tests involve the measurement of foliage fresh weight just prior to the application of the herbicide and a second measurement of foliage weight at a pre-determined time, typically 21-28 days, following the application of the herbicide. Roberto J. Crespo, Herbicide-Resistant Risk Assessment: Response of Common Nebraska Weeds to Dicamba Dose, Thesis, University of Nebraska-Lincoln, July 2011. The ratio of the two foliage weights provides an indication of herbicide resistance.

c) Highly-Trained, Human Inspection: In other tests, highly-trained, human inspectors visually inspect plants before the herbicide application and again at a pre-determined time post application (14 days with sunflowers) using a detailed evaluation criteria to assess a plant response to the herbicide treatment. For example, U.S. Pat. No. 8,952,222 describes a test protocol to determine sunflower resistance to herbicides with visual inspection 14 days after application of herbicide.

d) Germination Tests: In another case, germination tests are conducted on seeds imbibed with a test herbicide to provide an indication of herbicide resistance. Test results may be available within 7 days. Marcos Altomani Neves Dias; Flavio Eduardo Botelhos Mara; Natalia Arruda; Patricia Ribeiro Cursi; Navara Roberto Gonçalves; Pedro Jacob Christoffoleti, Germination test as a fast method to detect glyphosate-resistant sourgrass, http://dx.doi.org/10.1590/1678-4499.0089.

e) Radioisotope Treatments: In still other tests, radioisotope treatments are used in a carefully controlled laboratory procedure to determine herbicide absorption and translocation within a plant via tracking of radioisotopes. Using these methods, significant levels of herbicides have been shown to be absorbed by a plant within 10-20 hours following treatment. Nandula, Vijay K., Vencill, William K., Herbicide Absorption and Translocation in Plants using Radioisotopes, Weed Science, 2015, Special Issue: 140-151.

f) Chlorophyll Fluorescence: Additionally, chlorophyll fluorescence tests, conducted under laboratory conditions, may be used to observe changes in plant metabolism due to herbicide treatments. Romina P. Barbagallo, Kevin Oxborough, Kenneth E. Pallett, and Neil R. Baker, Rapid, Noninvasive Screening for Perturbations of Metabolism and Plant Growth Using Chlorophyll Fluorescence Imaging, Plant Physiology, June 2003, Vol. 132, pp. 485-493, www.plantphysiol.org.

There remains a strong need for testing strategies to determine the response of selected plant populations to treatments with one or more herbicides, wherein such strategies can be used as alternatives to the conventional strategies or can be used in combination with one or more conventional strategies to make the conventional strategies better. Cases of herbicide-resistant weeds are escalating worldwide. Plant breeders, seeking to genetically modify crop productivity, often test for herbicide tolerance at numerous stages of plant development. Farmers benefit from knowing if resistant weeds are present in their fields. Herbicide efficacy for new invasive species often is measured.

Due to this increasing need for herbicide testing, facilities responsible for conducting these tests are presently encountering a shortage of trained inspectors, test protocols that are less sensitive than desired, test protocols that are too subjective when used on their own, complex and lengthy test protocols, and limited capacity (space). These circumstances would benefit from a test system and method that is one or more of economical, convenient, qualitative, quantitative, accurate, sensitive to early changes in plant health, consistent, noninvasive, capable of gathering data from a remote position, and/or capable of being used in either a laboratory or field setting. Additionally, the ideal test would be readily automated and provide results in hours or days instead of only after many weeks.

SUMMARY OF THE INVENTION

The present invention relates to remotely and noninvasively detecting a time-varying plant response for a target plant subjected to a treatment with one or more agents that impact the health of the target plant. More specifically, this invention relates to methods and systems for remotely and noninvasively detecting a plant response for a target plant to a treatment of one or more herbicides or other plant treatment using spectral data to detect changes in a plant following the treatment. Illustrative embodiments involve one or more of formulation of a mathematical index algorithm based on the spectral data, generation of a time-varying, index array representing a plant response curve indicative of the plant health following the herbicide treatment, and computation of parametric values for a mathematical function that fits the plant response curve. Additionally, using multiple herbicide treatments having different herbicide dosages, the present invention provides an approach to generate a dose-response curve for the given herbicide(s) and target plant population.

Benefits and features of the present invention in various embodiments include one or more of the following:
a) The flexibility to select spectral data from wavelength regions of the electromagnetic spectrum that are sensitive to the mode of action for the given herbicide treatment on a specific plant population;
b) The capability to acquire spectral information from outside of the range of human vision, such as in the ultraviolet or infrared regions of the electromagnetic spectrum, providing expanded or aided analysis capability beyond that of human inspectors using only unaided visible examination;
c) The capability to precisely analyze narrow-band spectral data even within the visible spectral band available to human inspectors;
d) The ability to shorten the duration of many testing protocols from many weeks to hours or days via a knowledge of plant responses and parameter estimation techniques;
e) The effective increase in the capacity of testing facilities without an actual physical expansion, resulting from the shortening of testing protocols;
f) Methods and systems that are readily automated, providing measurement accuracy and repeatability, as well as the reduction of labor costs associated with human inspectors;
g) The flexibility to use varying types of spectral data acquisition systems that include, but are not limited to, a single point source, such as a spectrometer, and spectral imaging systems that are capable of acquiring million of spectral data pixels from within their field of view, providing the capability to analyze plant targets ranging from a leaf segment to an entire crop field;
h) The capacity to apply image processing techniques to acquired spectral images providing a broad range of analysis capability;
i) A convenient mounting design providing ease of application, such as on a test fixture, lab bench, green house track, farm equipment, handheld, pole, drone, or manned aircraft.

In one aspect the present invention relates to a spectral imaging system to acquire spectral data to characterize a response of at least one plant to a herbicide treatment, said system comprising: a) one or more image capture elements, said one or more image capture elements having the capability to capture a plurality of spectral images for a common scene, said spectral images each associated with a wavelength region of the electromagnetic spectrum such that the spectral images comprise spectral information indicative of the response of the at least one plant to the herbicide treatment; and (b) at least one controller comprising: (i) program instructions that cause the one or more image capture elements to capture a plurality of spectral images at each of two or more sampling times; and (ii) program instructions that transfer at least a portion of the spectral information, acquired at each of two or more sampling times, to a processor for analysis.

In another aspect, the present invention relates to a method of characterizing a response of at least one plant subjected to a herbicide treatment, comprising the steps of: a) providing a spectral data set comprising at least first and second spectral data samples for the at least one plant subjected to a herbicide treatment wherein: (i) the first and second spectral data samples are acquired from the at least one plant from at least first and second different spectral sampling events, respectively, occurring at least at first and second different sampling times during a time window in which the herbicide treatment is acting on the at least one plant; and (ii) the spectral data samples include spectral information associated with two or more pre-selected wavelength regions of the electromagnetic spectrum such that the spectral information associated with the two or more pre-selected wavelength regions is indicative of the response of the at least one plant to the herbicide treatment over time; and b) using information comprising the spectral information associated with the two or more pre-selected wavelength regions of the electromagnetic spectrum from at least the first and second spectral data samples to provide information indicative of the response of the at least one plant to the herbicide treatment as a function of time.

In another aspect, the present invention relates to a method of determining a dose-response characteristic for a plant population subjected to a herbicide treatment regime, comprising the steps of: a) providing a first spectral data set comprising at least first and second spectral data samples for a first plant population portion of the plant population subjected to the herbicide treatment at a first dosage, wherein: (i) the first and second spectral data samples of the first treatment are acquired from the first plant population portion from at least first and second different corresponding spectral sampling events, respectively, occurring at first and second different corresponding sampling times during a time window in which the first herbicide treatment is acting on the first plant population portion; and (ii) the spectral data samples include spectral information associated with two or more pre-selected wavelength regions of the electromagnetic spectrum such that the spectral information included in the spectral data samples is indicative of the response of the first plant population to the first herbicide treatment over time; b) providing a second spectral data set comprising at least first and second spectral data samples for a second plant population portion of the plant population subjected to the herbicide treatment at a second dosage, wherein: (i) the first and second spectral data samples of the second treatment are acquired from the second plant population portion from at least first and second different corresponding spectral sampling events, respectively, occurring at first and second different corresponding sampling times during a time window in which the second herbicide treatment is acting on the second plant population portion; and (ii) the spectral data samples include spectral information associated with two or more pre-selected wavelength regions of the electromagnetic spectrum such that the spectral information associated with two or more pre-selected wavelength regions is indicative of the response of the second plant population portion to the second herbicide treatment over time; and c) using information comprising the spectral information in the first and second spectral data sets to provide information indicative of the response of at least a portion of the plant population to the dosage of the herbicide treatment.

In another aspect, the present invention relates to a method to determine a time varying response of at least one plant to a plant treatment, comprising the steps of: a) providing a treated plant that has been treated with at least one plant treatment agent; b) at a first event in time, capturing a first portion of spectral data from the treated plant; c) using the first spectral data portion to compute a first index value for the first event that is indicative of a plant characteristic of the treated plant at the time of the first event, wherein the first spectral data portion is associated with at least one pre-selected wavelength band, and wherein the plant characteristic has a time varying response to the plant treatment; d) at a second event in time, capturing a second portion of spectral data from the treated plant; e) using the second spectral data portion to compute a second index value for the second event that is indicative of the plant characteristic of the treated plant at the time of the second event, wherein the second spectral data portion is associated with at least one pre-selected wavelength band; and f) using information including the first and second index values to provide information indicative of an impact of the plant treatment on the at least one plant.

In another aspect, the present invention relates to a spectral analysis system for evaluating a response of at least one plant to a herbicide treatment, comprising: a) an imaging system that comprises at least one image capture element, configured to capture at least two spectrally filtered images, wherein each spectrally filtered image is associated with a unique, pre-selected wavelength band of the electromagnetic spectrum; and b) a computer system comprising: (i) a memory coupled to the imaging system in a manner effective to store spectrally filtered images captured by the imaging system; (ii) program instructions that cause at least one image capturing element to capture spectral information comprising independent, spectrally filtered images at the unique, pre-selected wavelength bands at least at the first and second spectral sampling events; and (iii) program instructions that use information comprising the spectral information to evaluate the response of at least one plant to a herbicide treatment over time.

In another aspect, the present invention relates to a method for providing a system for evaluating a response of at least one plant to a herbicide treatment, comprising: a) providing spectral information for the plant; b) using the spectral information to associate a plurality of bandwidth portions of the electromagnetic spectrum with spectral characteristics of the plant that collectively are indicative of the response of the plant to a herbicide treatment; c) using the selected bandwidth portions to provide a spectral analysis system comprising: (1) an imaging system that comprises at least one image capture element configured to capture at least two spectrally filtered images, wherein each spectrally filtered image is associated with a unique, pre-selected wavelength band of the electromagnetic spectrum; and (2) a computer system comprising: (i) a memory coupled to the imaging system in a manner effective to store spectrally filtered images captured by the imaging system; (ii) program instructions that cause at least the one imaging capturing element to capture spectral information comprising independent, spectrally filtered images at the unique, pre-selected wavelength bands at least at a first and a second spectral sampling event; and (iii) program instructions that use information comprising the spectral information to evaluate the response of at least one plant to a herbicide treatment over time.

In another aspect, the present invention relates to a method of characterizing the impact of a treatment upon at least one plant, comprising the steps of: (a) providing a spectral data set comprising at least first and second spectral data samples for the at least one plant subjected to the treatment wherein: (i) the first and second spectral data samples are acquired from the at least one plant from at least first and second different spectral sampling events, respectively, occurring at least at first and second different sampling times during a time window in which the treatment is acting on the at least one plant; and (ii) the spectral data samples include spectral information associated with two or more pre-selected wavelength regions of the electromagnetic spectrum such that the spectral information associated with the two or more pre-selected wavelength regions is indicative of the response of the at least one plant to the treatment over time; and (b) using information comprising the spectral information associated with the two or more pre-selected wavelength regions of the electromagnetic spectrum from at least the first and second spectral data samples to provide information indicative of the response of the at least one plant to the treatment as a function of time.

In another aspect, the present invention relates to a method of determining a growth characteristic of at least a portion of at least one plant within a scene, comprising the steps of: (a) acquiring a spectral data set from each of two or more wavelength regions of the electromagnetic spectrum within the photosynthesis region wherein: (i) at least one wavelength region is aligned with an absorbance peak associated with at least one photosynthesis-related, plant pigment selected from at least one of chlorophyll-a, chlorophyll-b and carotenoid pigments; and (ii) at least a second wavelength region is not aligned with an absorbance peak associated with at least one photosynthesis-related, plant pigment selected from at least one of chlorophyll-a, chlorophyll-b and carotenoid pigments; (b) using the spectral data sets from the two or more wavelength regions to compute the growth characteristic using at least one of: (i) an average level within the photosynthesis region, derived from one or more of the spectral data sets; and (ii) a difference between two spectral data sets, wherein one set is aligned with a pigment absorbance peak and another set is not aligned with a pigment absorbance peak; and (c) using the computed growth characteristic to provide information indicative of a plant growth characteristic within the scene.

BRIEF DESCRIPTION OF THE DRAWINGS

FIG. 20 shows schematics of output images indicating Growth Index changes over the test period.

DETAILED DESCRIPTION

The present invention provides spectral analysis systems and methods for characterizing a plant response. Spectral analysis systems generally involve capturing spectral information from one or more portions of the electromagnetic spectrum. For reference, it is often convenient to divide the span of the electromagnetic spectrum into the following electromagnetic radiation or light bands:

ultraviolet (UV) band from 100 nm to 400 nm;
visible (VIS) band from 400 to 700 nm; and
infrared (IR) band from 700 to 14,000 nm.

The ultraviolet band may be divided into the following sub-bands:

ultraviolet C (UVC) band from 100 to 280 nm;
ultraviolet B (UVB) band from 280 to 315 nm; and
ultraviolet A (UVA) band from 315 to 400 nm.

The infrared band may be divided into the following sub-bands:

near infrared (NIR) band from 700 to 1500 nm;
short-wave infrared (SWIR) band from 1500 to 3000 nm;
mid-wave infrared (MWIR) band from 3000 to 5000 nm; and
long-wave infrared (LWIR) band from 5000 to 14,000 nm.

The present invention may use spectral information of any wavelength region(s) in the electromagnetic spectrum. However, preferred embodiments comprise the use of reflection, transmission or fluorescence in the range of about 350 nm to 3000 nm. Portions of the electromagnetic spectrum having wavelengths shorter than this range, such as UVC (100-280 nm) and UVB (280-315 nm) bands, may be harmful to both plants and animals. Additionally, since solar illumination in UVC and UVB bands is low and further reduced by atmospheric filtering, outdoor operation using lower wavelength bands may require expensive illumination sources. Wavelengths longer than the preferred range, such as MWIR (3000-5000 nm) and LWIR (5000-14,000 nm) bands, are regions of the electromagnetic spectrum typically dominated by emissive energy, often dependent upon the temperature and emissivity of a surface. Thus, any reflectance, transmittance, or fluorescence measurements in these longer wavelength regions may be a function of both the plant chemistry of interest and emissions due to varying surface temperatures and surface emissivities. Thus, measurement processes and algorithms in these longer wavelength regions may be complicated by the need to compensate for emissive components minimally related to the desired plant chemistry.

Figure 1:
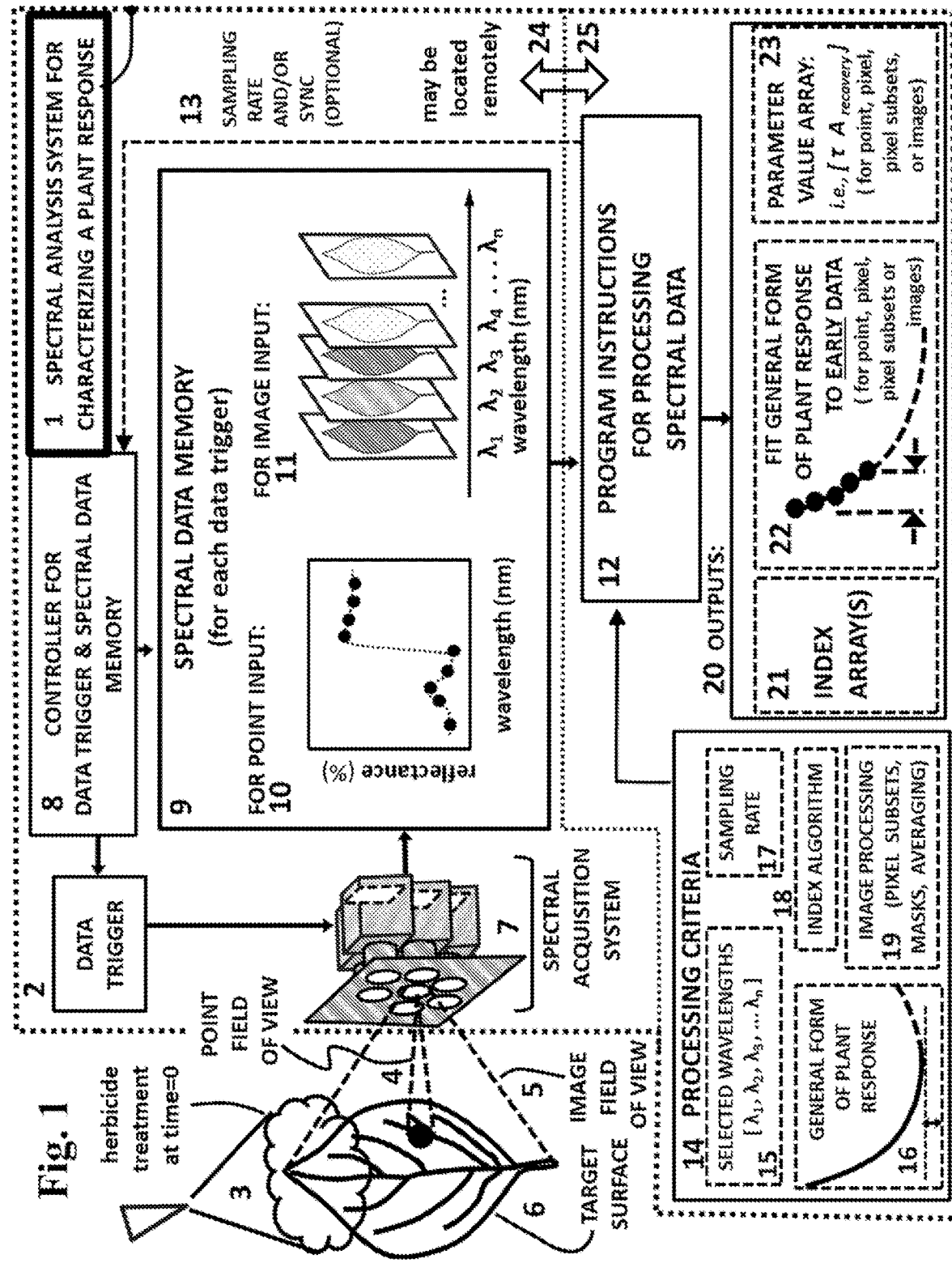
FIG. 1 shows a spectral analysis system for characterizing a plant response.

FIG. 1 illustrates a representative embodiment of a spectral analysis system 1 of the present invention. In this illustration, a spectral analysis system 1 is described to characterize a plant response. FIG. 1 shows a target surface 6 within a field of view (4, 5) treated with a herbicide treatment 3. The target surface 6 may represent a surface of a plant leaf, the entire plant, a population of plants, a crop field, a number of crop fields, any surface within a vegetative scene, or any portion thereof. The time, t, represents the time that has passed since the herbicide treatment 3 was administered to the target surface 6 at t=0. More specifically, this embodiment illustrates the function of the present invention for characterizing a plant response to a herbicide treatment 3 for any vegetative target surface 6 within the field of view (4, 5). While a treatment of one or more herbicides is used to illustrate the function and advantages of the present invention, it is recognized that the present invention may be used to characterize a plant response to a treatment with any number of different agents that impact the health of the plant. The expected impact on plant health may be negative, as in the case of a herbicide treatment, or positive, as in the case of a fertilizer, fungicide or irrigation treatment. Such characterizations of a plant response also take into account additives in the agent, such as surfactants, adjuvants or modifiers.

Spectral acquisition systems 7 which may be used with the present system 1 (FIG. 1) may include any acquisition system that acquires spectral data from one or more target surfaces such as a target surface 6 of a plant. However, these systems may often be categorized into two groups, namely spectral point input systems, such as a spectrometer, and spectral imaging systems. The point source input, as from a spectrometer, has a narrow field of view 4, resulting in an analysis region on the target surface 6 of a plant that resembles a spot. The imaging input has a wider field of view 5 which may encompass a larger portion of a leaf, an entire leaf, a portion of a plant, the entire plant, a portion of a crop field, or even an entire crop field depending on the optical system used.

It is helpful to first review the processing for the point input system embodiments of acquisition system 7 and then recognize that the spectral imaging embodiments of spectral acquisition system 7 may be described as a system comprised of an array of points, such that each pixel in an imaging system may be treated similar to a point in the point acquisition system. As an example, a 10 Megapixel imaging system contains 10 million 'points' and the calculations may be conducted via multi-dimensional, matrix mathematics. Additionally, it is valuable to recognize that the system 1 of FIG. 1 with an imaging input includes the grouping together of any number of pixels into subsets of the image. Examples of these subsets include, but are not limited to an average, a median, a weighted function, a filtered function or a mathematical formula. These subsets may include masking to include or exclude various pixels based on a calculation of their value and/or spatial position.

In FIG. 1, for the case when the spectral acquisition system 7 is a spectral point input, such as a spectrometer, the field of view 4 is small and represents a spot on the target surface 6. While still noninvasive, a point acquisition system typically is located very close to the target surface or perhaps it includes additional options such as a fiber optic component to provide greater convenience by separating the surface from the optical spectrometer hardware (such as 2 to 6 feet of separation). The data trigger 2 determines when the spectral acquisition system 7 acquires a spectral data sample 10 and stores it in spectral data memory 9. As an example, each data trigger 2 initiates the acquisition of a complete set of spectral data, a spectral data sample, that is stored in spectral data memory 9. The form of each spectral data sample varies with the type of spectral acquisition system. For a spectral point input, the resulting spectral data 10 is an array of spectral data, such as a reflectance spectrum, at one or more wavelength regions of the electromagnetic spectrum. For a spectral imaging input, the resulting spectral data 11 is a set of one or more spectral image(s) at selected wavelength regions of the electromagnetic spectrum.

A representative plot 10 of such a spectral data array is shown in FIG. 1. A controller 8 controls the data trigger 2 and the acquisition of spectral data from the spectral acquisition system 7 into spectral data memory 9. The controller 8 establishes the sampling rate of the data trigger 2 via sensor input (not shown), manual setting (not shown), or program instructions 12. The program instructions 12 determine the processing steps conducted on the spectral data 10. The processing criteria 14 serve as the basis for the processing operations conducted by the program instructions 12. The selected wavelengths 15 determine the regions of the electromagnetic spectrum that are used to compute an index algorithm 18 and the outputs 20. The index algorithm 18 is the mathematical formula that converts the spectral data 10 into an index value that is indicative of the plant response at the time that the spectral data was acquired. An accumulation of index values over time forms an output index array 21. The sampling rate 17 may be optionally provided from the processing criteria 14 to the program instructions 12 and then to the controller 8. The time-varying index array 21 may be fitted to the general form of the plant response 16 and the resulting output parameter values 23 may be provided as a characterization of the plant response 1.

Within the program instructions 12, the selected wavelength regions 15 are pre-associated with regions of the electromagnetic spectrum that are sensitive to the mode of action of the herbicide treatment 3 for the specific target surface 6 of a plant. This wavelength selection process may be based on knowledge of plant physiology for the specific plant population and the herbicide mode of action, or alternatively, it may be based on empirical spectral data following a herbicide treatment. The spectral data 10 at the selected wavelengths 15 provide the input to the program instructions 12 where the index algorithm 18 is applied. The index algorithm 18, operating on the spectral data 10, provides the time-varying, index array 21, which is an indication of the time-varying plant response 22 to the herbicide treatment 3. By fitting the early index array values (data points in 22) to the general form of the plant response 16, the parameter values 23 may be determined which mathematically characterize the plant response 22 to the herbicide treatment 3.

In FIG. 1, for the case in which the spectral acquisition system 7 is a spectral imaging input, such as with a spectral imaging system, the field of view 5 is larger and may encompass one or more target surfaces 6 representing a plant leaf, the entire plant, a population of plants, a crop field, a number of crop fields or any vegetative scene. The data trigger 2 determines when the spectral acquisition system 7 acquires a spectral data sample 11 and stores it in spectral data memory 9. For a spectral imaging input, as may be acquired using a spectral imaging system, the resulting spectral data 11 is a three-dimensional array of spectral data, such as reflectance, with an entire image acquired at each selected wavelength regions of the electromagnetic spectrum.

A representative plot 11 of such a spectral imaging data array is shown in FIG. 1. A controller 8 controls the data trigger 2 and the acquisition of spectral data from the spectral acquisition system 7 into spectral data memory 9. The controller 8 establishes the sampling rate of the data trigger 2 via sensor input (not shown), manual setting (not shown), or program instructions 12. The program instructions 12 determine the processing steps conducted on the spectral data 11. The processing criteria 14 serve as the basis for the processing operations conducted by the program instructions 12. The selected wavelengths 15 determine the regions of the electromagnetic spectrum that are used to acquire spectral images and to compute an index algorithm 18 and the outputs 20. The index algorithm 18 is the mathematical formula that converts the spectral data 11 into an index value array that is indicative of the plant response at the time that the spectral data was acquired. An accumulation of index values over time forms an output index array 21. The sampling rate 17 may be optionally provided from the processing criteria 14 to the program instructions 12 and then to the controller 8. The time-varying index array 21 may be fitted to the general form of the plant response 16 and the resulting output parameter values 23 may be provided as a characterization of the plant response 1. For the spectral imaging input, the index value array contains a two-dimensional, image array, at each sampling time, corresponding to a spatial representation of the index value for the portion of the plant within the field of view 5.

After fitting the general form of the plant response 16 to the index array 21, an array of parameter values 23 may be computed. This array of parameter values 23 represents a spatial set of parameters for each pixel within the field of view. For the spectral imaging input, the processing criteria 14 also contains image processing criteria 19 which determines image processing operations to be conducted on the spectral imaging data, such as the selection of pixel subsets, grouping of pixel data, masking, averaging, filtering, noise reduction, and other mathematical operations which may be used to enhance the accuracy and definition of the imaging outputs. With imaging input, the plant response for any portion or region of the plant may be determined.

For more preferred reproductions of the plant response, the sampling rate 17 (the reciprocal of the sampling interval) may be chosen by a suitable criteria, such as to be at least twice the highest frequency present in the plant response as determined by the signal processing, Nyquist criteria. Sampling intervals for plant responses may vary from short periods, such as periods on the scale of seconds to minutes, e.g., 10 minute intervals, to longer intervals of one or more hours or days.

Within the program instruction 12, the selected wavelength regions of the electromagnetic spectrum 15 are pre-associated with changes in plant spectra 11 resulting from the herbicide treatment 3. The spectral data 11 at the selected wavelengths 15 provide the input to the program instructions 12 where the index algorithm 18 is applied. The index algorithm 18, operating on the spectral data 11, provides the time-varying, index array 21, which is an indication of the time-varying plant response 22 to the herbicide treatment 3. For spectral imaging data 11, each time-varying index element 21 is an index image indicating the changing spectra for each portion of the plant 6 within the field of view 5. This provides a powerful tool to observe how various portions of the plant 6 may respond differently to the herbicide treatment 3. It also may serve as an indicator of non-uniformities in the herbicide spray equipment.

By fitting the early index array values (data points in 22) to the general form of the plant response 16, the parameter values 23 may be determined which mathematically characterize the plant response 22 to the herbicide treatment 3. For an imaging input 11, the resulting parameter value array 23 is an image array of parameter values indicative of the plant response 22 to the herbicide treatment 3 for each portion of the plant 6 within the field of view 5.

For the various types of spectral acquisition systems 7 shown in FIG. 1, such as a point input or a spectral imaging input, multiple spectral data samples may be acquired by repeating the output from the data trigger of block 2. The frequency of these outputs impacts the data sampling rate. Each data trigger output 2 causes the spectral acquisition system 7 to acquire a new, independent spectral data sample (10, 11). While the composition of the spectral data sample (10, 11) may vary with the type of acquisition system 7, the timing of the data sample is controlled by the timing of the data trigger output 2. Similar data trigger 2 operation is shown in FIGS. 2, 4, 11, 12, and 17. The data trigger output may also be referred to as a sampling trigger 36 for each sampling event, i, as indicated in FIGS. 2, 4, 12, 17. In some embodiments (not shown) spectral data acquisitions may be initialized by data triggers generated internally by the spectral acquisition system 7.

For various types of spectral acquisition systems 7 shown in FIG. 1 (such as a point input or a spectral imaging input), the spectral analysis system 1 may be divided into two parts, 24 and 25. If divided, the parts in block 24 may be located near the target surface 6 in order to optically acquire the spectral data 11, while block 25 may be located in the same or in a remote location for processing of the data on a remote computing device such as, but not limited to, a laptop computer, desktop computer, smart phone, cloud processing system, or remote server system. Communications between the two blocks (24, 25) may be achieved by any number of standards known to those skilled in the art, such as wireless or wired standards.

For both the spectral point input 10 and the spectral imaging input 11, the corresponding index array value(s) 21 may be computed in a suitable manner such as via one of the following two illustrative processing strategies:

a) Compute the index value(s) 21 after each spectral data sample (10 or 11) is acquired and before the next spectral data sample (10 or 11) is acquired; and/or b) Accumulate the spectral data samples (10 or 11) in memory 9 and compute the index values 21 after all spectral data samples (10 or 11) have cumulatively been acquired.

A characteristic of strategy a) is that, since computations may be conducted before the next spectral data sample is acquired, a measure of the accuracy of the curve fit may be computed following each data acquisition. When the accuracy is within acceptable limits, the sampling may be discontinued, resulting in a measurement that is of a desired accuracy, completed within the shortest test period possible.

A characteristic of strategy b) is that it can be less computationally intensive by accumulating a predetermined number of data samples and then computing the parameter values based on the accumulated samples.

While the present invention as illustrated in FIG. 1 is similar in principle for either spectral point inputs or spectral imaging inputs, the data available from a spectral imaging system 11 provide a much greater wealth of information as well as additional analysis capability. With the spectral imaging input 11, the present invention may apply a wealth of image processing tools to the selection and computation of index values 21. For example, with the spectral imaging input 11, index values 21 may be computed for a single pixel, all pixels, a grouping of pixels, an averaging or filtered group of pixels, a grouping of pixels where regions of the field of view 5 are masked out of the computation, selected regions of the field of view 5 based on a mathematical criteria, or selected regions of the field of view 5 based on spatial and/or geographic locations. The analysis may encompass a portion of a leaf, an entire leaf, a plant, a crop field or any region of vegetation within the field of view. With spectral imaging input 11, the present invention may provide an image mask 19 or mask algorithm 19 to exclude background substances such as soil or non-target plant species from being considered in the analysis. Additionally, an imaging system may compute outputs 20 for each pixel in the image, all pixels in the image, a grouping of pixels (by plant, spatial region, geographic area or other criteria), and/or averages or filtering of pixels (median filter, edge filter, low-pass filter or other image filtering criteria). Image processing methods, known to those skilled in the art, may be applied to the images at numerous stages in the processing, such as at the stages of the acquired spectral images 11, the images corresponding to index values 21, the images corresponding to the fit to the plant response curve 22, or the parameter array values 23, where matrix array values may be treated as images for processing.

In representative embodiments of system 1 shown in FIG. 1, the present invention provides a method of remotely and noninvasively characterizing a plant response in outputs 20 following a treatment with one or more herbicides 3, comprising the steps of:
  a) Selecting wavelength regions of the electromagnetic spectrum 15 that are sensitive to specific physiological changes in the health of a plant 6 under test;
  b) Applying a treatment of a known herbicide dosage 3 to the plant(s) 6 under test;
  c) Acquiring multiple samples (10 or 11) of the changing spectral data (10 or 11) from the selected wavelength regions 15 within a time window following the herbicide treatment 3, wherein, the sampled spectral data 9 is related to at least a spatial portion of the target plant 6;
  d) Deriving a mathematical index algorithm or formula 18, based on the changing spectral data (10 or 11), such that the time-varying index array 21 is indicative of a plant response 22 to the herbicide treatment 3;
  e) Determining parameter values 23 that mathematically characterize the time-varying index array 21, indicative of the plant response; and
  f) Using the determined parameter values 23 as a measure of the plant response 22 to the herbicide treatment 3.

The present invention uses light to noninvasively and remotely interrogate the chemistry of the target surface 6 following a herbicide treatment 3. More precisely, the present invention may use one or more bands of the electromagnetic spectrum 15, within and/or outside of the visible range of the electromagnetic spectrum, to interrogate the chemistry of the target surface 6 in order to determine a plant response indicative of changes in plant health following a herbicide treatment 3. This approach provides a reliable indication of changes in plant physiology, significantly more sensitive than human vision. Additionally, the present invention provides an approach which may be characterized as convenient, rapid, and repeatable. In representative embodiments, the invention allows consistent analysis and accuracy, unaffected by variations encountered with human observers, such as differences in the human visual response between individuals or differing degrees training.

Figure 2:
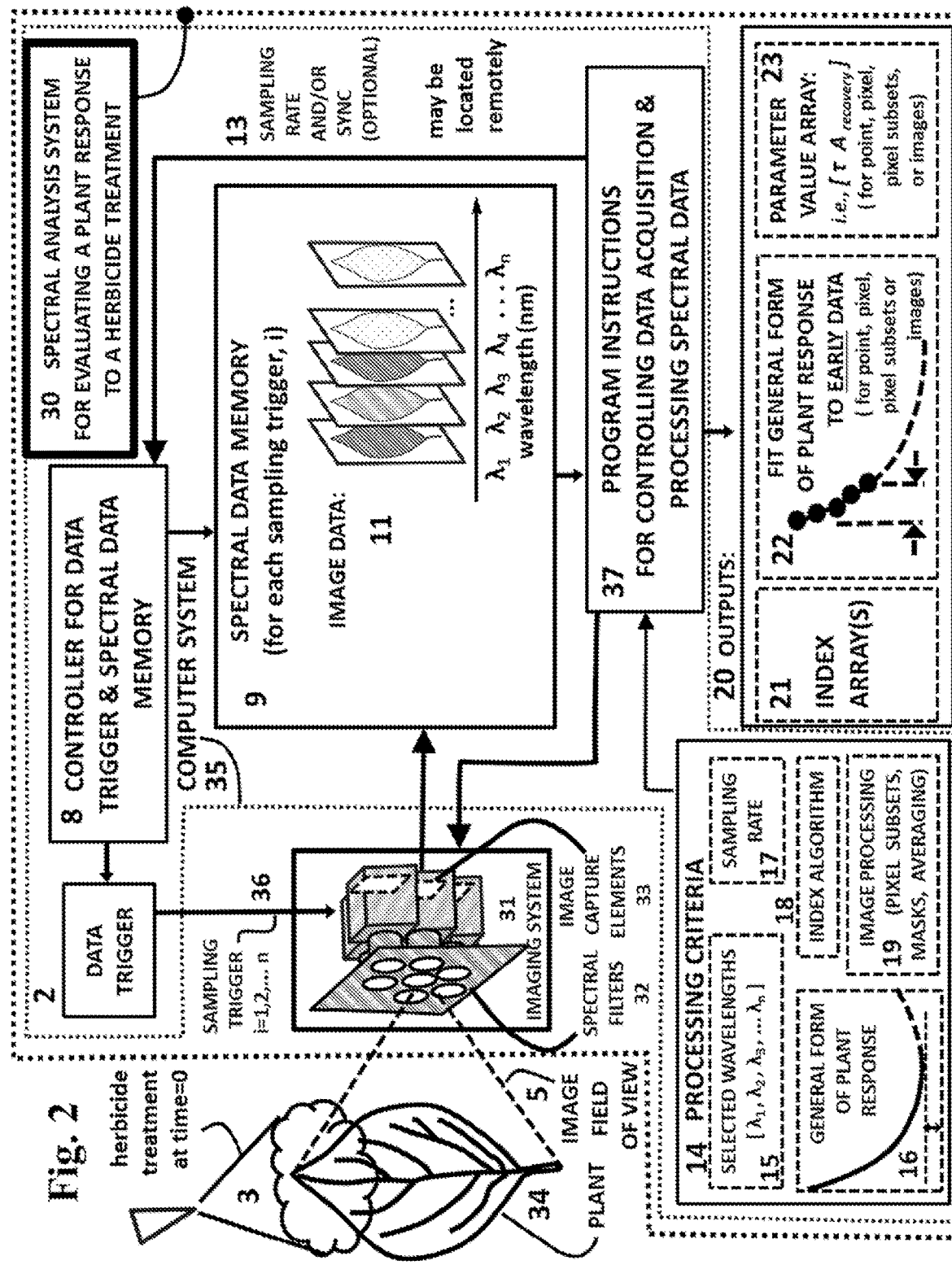
FIG. 2 shows spectral analysis system for evaluating a plant response to a herbicide treatment.

FIG. 2 illustrates a specific preferred version of the spectral acquisition system 7 of FIG. 1 to asses the impact of a herbicide treatment 3 upon a plant population comprising one or more plants, or portions thereof, represented by plant 34. System 30 uses an imaging system 31 as a spectral acquisition system (see spectral acquisition system 7 of FIG. 1). FIG. 2 also illustrates additional details, such as program instructions 37 that control data acquisition and also processing of the spectral data, a sampling trigger 36, and a computer system 35. The imaging system 31 has spectral filters 32 that filter the image information of the scene 5 that is focused on the corresponding image capture elements 33. While the imaging system 31 as shown in FIG. 2 illustrates a spectral filter array 32 and an image capture array 33 alternative imaging systems may also be used, such as, an image capture element used with a filter wheel, a hyperspectral imaging system, an imaging sensor having filter elements deposited on the image sensor substrate, and a multispectral imaging camera having electronically-tuned filter element(s), hereinafter referred to as "other spectral imaging systems".

In the illustration of FIG. 2, each spectral filter element 32, and each corresponding spectrally filtered image 11, is associated with a unique, pre-selected wavelength band of the electromagnetic spectrum as designated by the selected wavelengths 15 of the processing criteria 14. The program instructions 37 control the data acquisition sampling rate of the imaging system either via direct communication (blocks 37 to 31) or via the controller 8, data trigger 2, and sampling trigger 36. Program instructions 37 also process the spectral data to achieve the outputs 20 as described previously. The computer system 35, which includes the spectral data memory 9, storing the spectral image data 11 corresponding to the spectral filter elements 32, and program instructions 37 that cause one or more image capture elements to capture spectral information indicated by the spectral image data 11. The program instructions 37 use the spectral image data 11 at the unique, pre-associated wavelength regions 15, to compute index arrays for each sampling time, i 36. This index computation uses the index algorithm 18, which is formulated to be sensitive to the changing spectral characteristics of the target plant 34 over time, due to the herbicide treatment 3.

The computer system 35 (FIG. 2) is shown to be one single unit. This embodiment alternatively includes the distribution of the computer system 35, the imaging system 31 and the outputs 20 over multiple locations, located together or remotely. In the case where the parts are located remotely, the data may be processed on a remote computing device such as, but not limited to, a laptop computer, desktop computer, smart phone, cloud processing system, or remote server system. Communication between parts may be achieved using any number of standards known to those skilled in the art such as wireless or wired standards. Examples include WiFi, Bluetooth, Ethernet and proprietary standards.

In representative embodiments of system 30 (FIG. 2), the present invention provides a spectral analysis system 30 for evaluating a response of at least one plant 34 to a herbicide treatment 3, comprising:
  a) an imaging system 31 that comprises at least one image capture element 33, configured to capture at least two spectrally filtered images 11, wherein each spectrally filtered image is associated with a unique, pre-selected wavelength band of the electromagnetic spectrum 15; and
  b) a computer system 35 comprising:
    (i) a memory 9 coupled to the imaging system 31 in a manner effective to store spectrally filtered images 11 captured by the imaging system 31;
    (ii) program instructions 37 that cause at least one image capturing element 33 to capture spectral information comprising independent, spectrally filtered images 11 at the unique, pre-selected wavelength bands 15 at least at the first and second spectral sampling events 36; and
    (iii) program instructions 37 that use information comprising the spectral information 9 to evaluate the response of at least one plant 34 to a herbicide treatment 3 over time.

Figure 3:
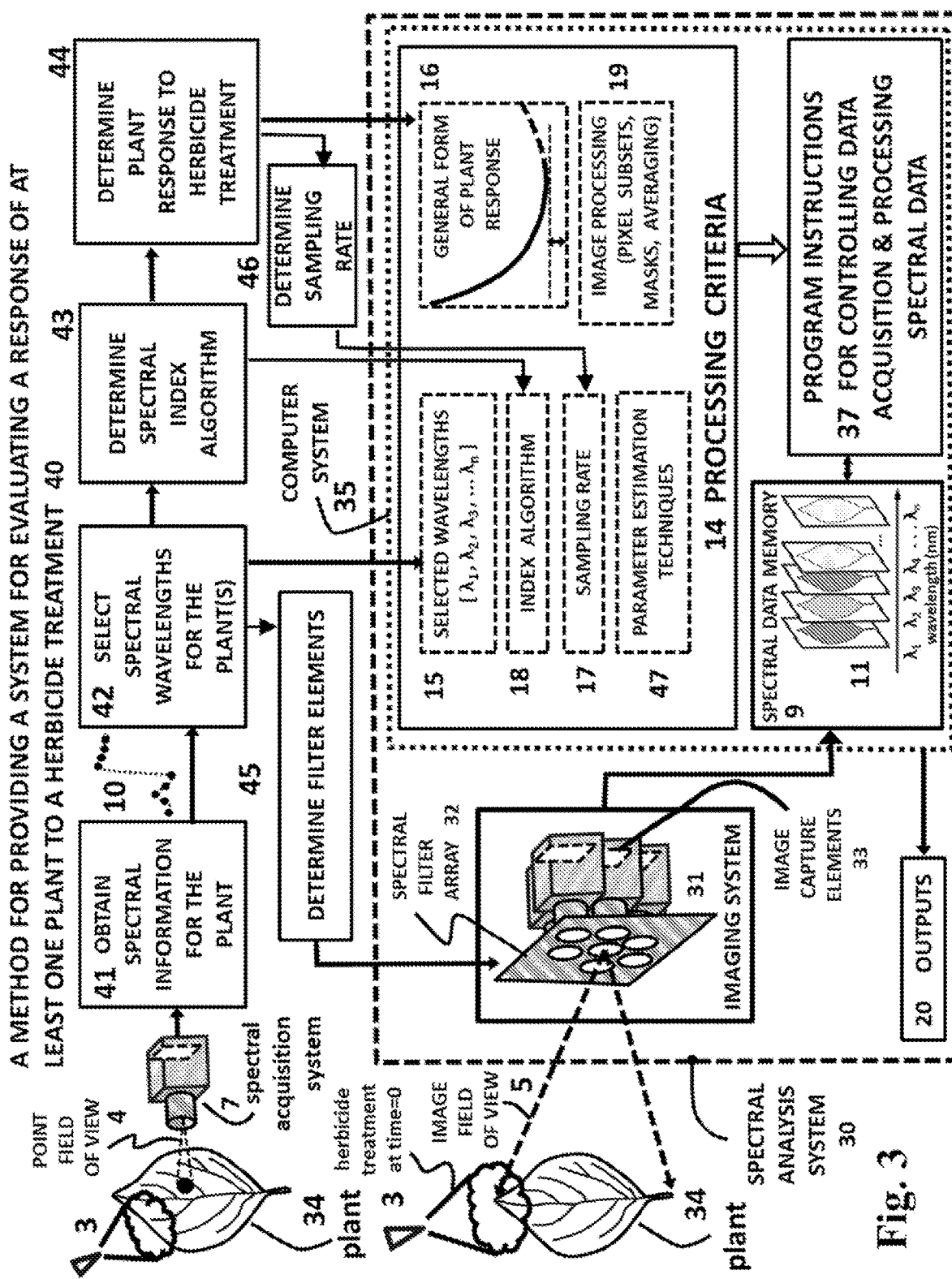
FIG. 3 shows a method for providing a system for evaluating a response of at least one plant to a herbicide treatment.

FIG. 3 illustrates a method 40 for evaluating a response of at least one plant 34 to a herbicide treatment 3 via a representative mode of practice of the present invention. The method of FIG. 3 provides illustrative processing criteria 14, which may be used, in full or in part, in representative system and method embodiments illustrated in FIGS. 1, 2, 4, 11, 12, 14, and 17. Spectral information 10 for a plant 34 is obtained in step 41 via a spectral acquisition system 7. In the case where the spectral acquisition system 7 is a spectrometer, the field of view 4 is small on the surface of the plant 34. In step 42, the spectral information 10 is used to select wavelength regions of the electromagnetic spectrum that change following an application of a herbicide treatment 3. The selected wavelength regions chosen in step 42 may become part of the processing criteria 14 and may also be used to specify the elements of the spectral filter array 32. The imaging system 31 is comprised of the spectral filter array 32 and image capture elements 33. While the imaging system 31 as shown in FIG. 3 uses a spectral filter array 32 and an image capture array 33, the present invention also includes the use of "other spectral imaging systems". The computer system 35 is comprised of processing criteria 14, spectral data memory 9, and program instructions 37 for controlling data acquisition and processing of the spectral data. Outputs 20 are provided from the computer system 35 as a result of the program instructions 37 operating on the spectral data 11. FIG. 3 illustrates an example of a method for generating the processing criteria 14 used within the spectral analysis system 30 of FIG. 2. The spectral sampling events of the system of FIG. 3 (not shown) are controlled by program instructions 37 similar to that of FIG. 2.

As shown in FIG. 3, the selected wavelength regions of step 42 are used to determine spectral filter elements in step 45 for the spectral filter array 32 of the imaging system 31. The selected wavelength regions chosen in step 42 are also criteria 15 within the processing criteria 14 within the computer system 35. A spectral index algorithm 18 is determined in step 43 from the selected wavelengths chosen in step 42 and the spectral data 10 for the plant 34 following a herbicide treatment 3. This index algorithm 18 becomes part of the processing criteria 14. Using the index algorithm determined in step 43 and provided to index algorithm portion 18 of the processing criteria 14, the general form of the plant response to the herbicide treatment may be determined in step 44 and used as a general form of the plant response 16 within the processing criteria 14. The sampling rate 17 may be determined from the plant response via steps 44 and 46. In Step 44 the plant response to the herbicide treatment is determined and may be used as the general form of the plant response 16. The shape of the plant response permits the determination of the sampling rate or frequency, such that the sampling frequency (rate) may meet the Nyquist criteria of signal processing theory (at least twice the highest frequency component present in the plant response). Once the general form of the plant response 16 is determine, parameter estimation techniques 47 may be selected. Image processing criteria 19 are selected based upon the plant population, the content within field of view 34 (plants, fields, soil, etc.) of the imaging system 31, and the desired outputs 20.

In representative modes of practicing the method 40 as illustrated in FIG. 3, the present inventions provides a method for providing a system for evaluating a response of at least one plant to a herbicide treatment 40, comprising:
  a) providing spectral information for the plant (41,10);
  b) using the spectral information 10 to associate a plurality of bandwidth portions of the electromagnetic spectrum (42,15) with spectral characteristics of the plant 34 that collectively are indicative of the response of the plant 44 to a herbicide treatment 3;
  c) using the selected bandwidth portions (42,15) to provide a spectral analysis system 30 comprising:
    (1) an imaging system 31 that comprises at least one image capture element 33 configured to capture at least two spectrally filtered images 11, wherein each spectrally filtered image 11 is associated with a unique, pre-selected wavelength band of the electromagnetic spectrum 15; and
    (2) a computer system 35 comprising:
      (i) a memory 9 coupled to the imaging system 31 in a manner effective to store spectrally filtered images 11 captured by the imaging system 31;
      (ii) program instructions 37 that cause at least the one imaging capturing element 33 to capture spectral information (9, 11) comprising independent, spectrally filtered images 11 at the unique, pre-selected wavelength bands 15 at least at a first and a second spectral sampling event (FIGS. 2-2, 36); and
      (iii) program instructions 37 that use information comprising the spectral information (9, 11) to evaluate the response of at least one plant 34 to a herbicide treatment 3 over time.

Figure 4:
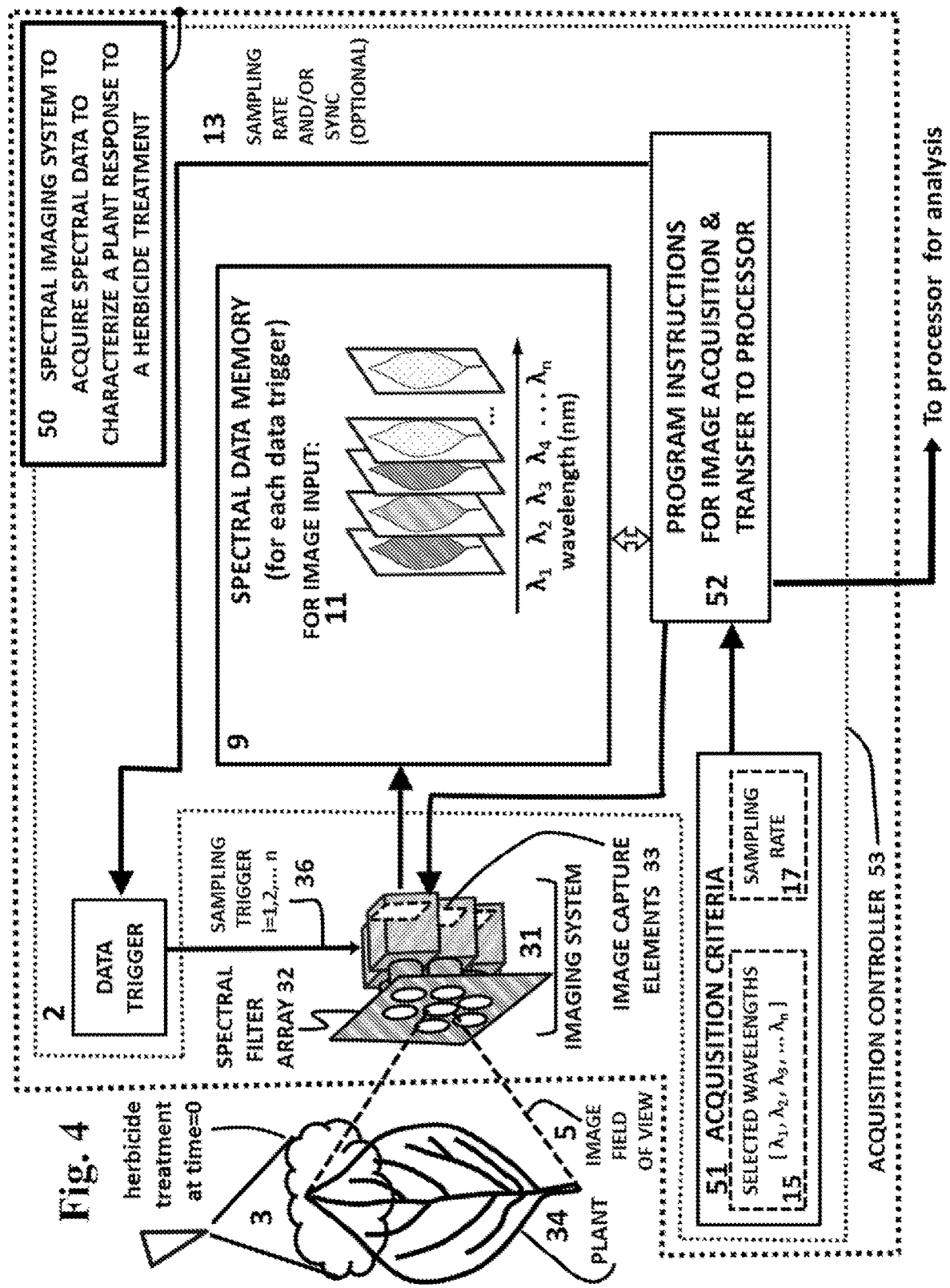
FIG. 4 shows a spectral imaging system to acquire spectral data to characterize a plant response to a herbicide treatment.

FIG. 4 illustrates a representative spectral imaging system 50 of the present invention to acquire spectral data to characterize the impact of a herbicide treatment 3 on one or more plants represented by plant 34. System 50 is a variation of a portion of system 1 illustrated in FIG. 1. System 50 uses a spectral imaging system 31 as the spectral acquisition system 7 (FIG. 1) and the acquisition criteria 51 in place of the processing criteria 14 (FIG. 1). The spectral imaging system 50 of FIG. 4 may be located remotely from the spectral processor 25 (FIG. 1) or in close proximity to the spectral processor 25 (FIG. 1). The ability to separate the various functions of the present invention, such as the spectral input (FIG. 4, 50 and FIG. 1, 24) and the analysis of the data (FIG. 1, 24), and locate them either locally and/or remotely is a useful feature in the design of a product based on this invention.

In the embodiment of FIG. 4 an imaging system 31, capable of acquiring spectral data 11, is coupled with and controlled by an acquisition controller 53. In this configuration, spectral imaging data 11 are acquired by an imaging system 31 capable of acquiring spectral images 11 from specific wavelength regions of the electromagnetic spectrum 15 at specific sampling times 36 sufficient to indicate a plant 34 response to a herbicide treatment 3. While the imaging system 31 is shown to have a spectral filter array 32 and an image capture array 33, the present invention also anticipates any number of other spectral imaging systems as an input, such as an image capture element used with a filter wheel, a hyperspectral imaging system, an imaging sensor having filter elements deposited on the sensor substrate, or a multispectral imaging camera having electronically-tuned filter element(s). The acquisition criteria 51, a subset of the processing criteria 14 (FIGS. 1, 2 and 3), contain the selected wavelength regions of the electromagnetic spectrum 15 and the sampling rate 17 to acquire samples of the spectral data over time. While a 'sampling rate' implies a uniform sampling interval, the present invention may also acquire data samples at non-uniform intervals, as defined in the acquisition criteria 51. The acquisition criteria 51 serves as input to the program instructions 52, controlling image acquisition directly or through the data trigger 2. The program instructions 52 also regulate transfer of at least a portion of the spectral data 11 to the (spectral) processor for analysis.

In representative embodiments, the present invention provides a spectral imaging system 50 (FIG. 4) to acquire spectral data 11 to characterize a response of at least one plant 34 to a herbicide treatment 3, said system comprising:
  a) one or more image capture elements 33, said one or more image capture elements 33 having the capability to capture a plurality of spectral images 11 for a common scene 5, said spectral images 11 each associated with a wavelength region of the electromagnetic spectrum 15 such that the spectral images 11 comprise spectral information indicative of the response of the at least one plant 34 to the herbicide treatment 3; and b) at least one controller 53 comprising:
        (i) program instructions 52 that cause the one or more image capture elements 33 to capture a plurality of spectral images 11 at each of two or more sampling times 36; and
        (ii) program instructions 52 that transfer at least a portion of the spectral information 11, acquired at each of two or more sampling times 36, to a processor for analysis.

In such embodiments, the sampling times may be automatically triggered at predetermined sampling times, manually initiated, or triggered by an external source or event, or combinations of these. Spectral information may be processed locally such as within a camera system including the image capture elements or remotely, such as by being transmitted to an external processor in a desktop computer, smartphone, laptop, or other suitable processing device.

While FIG. 4 illustrates a representative embodiment of a spectral acquisition system 50 which may be located remotely from the spectral processor 25 (FIG. 1), the spectral acquisition system may also be located in close proximity to the functional blocks that are processing spectral data, such as is illustrated in block 25 in FIG. 1 and block 37 in FIGS. 2 and 3. Additionally, the present invention anticipates any distribution or grouping of components in close or remote proximity to each other.

The present invention provides sensitive detection of a plant response via spectral wavelength selection and plant physiology. FIGS. 1, 2, 3, 4, 11, 12 and 17 show illustrative modes of implementing principles of the present invention. As used herein, unless otherwise expressly noted, the term "present invention" refers to any embodiments and modes of practice, including but not limited to these illustrative embodiments. Various features and advantages of the present invention that are useful in any modes of practice including but not limited to these embodiments will now be described.

The present invention provides a sensitive indication of a plant response following application of an herbicide treatment that is more sensitive than an unaided human observer. The present invention can be used as an alternative to human observation or can be used in combination with human observation or other techniques to make those techniques even more effective.

Figure 5:
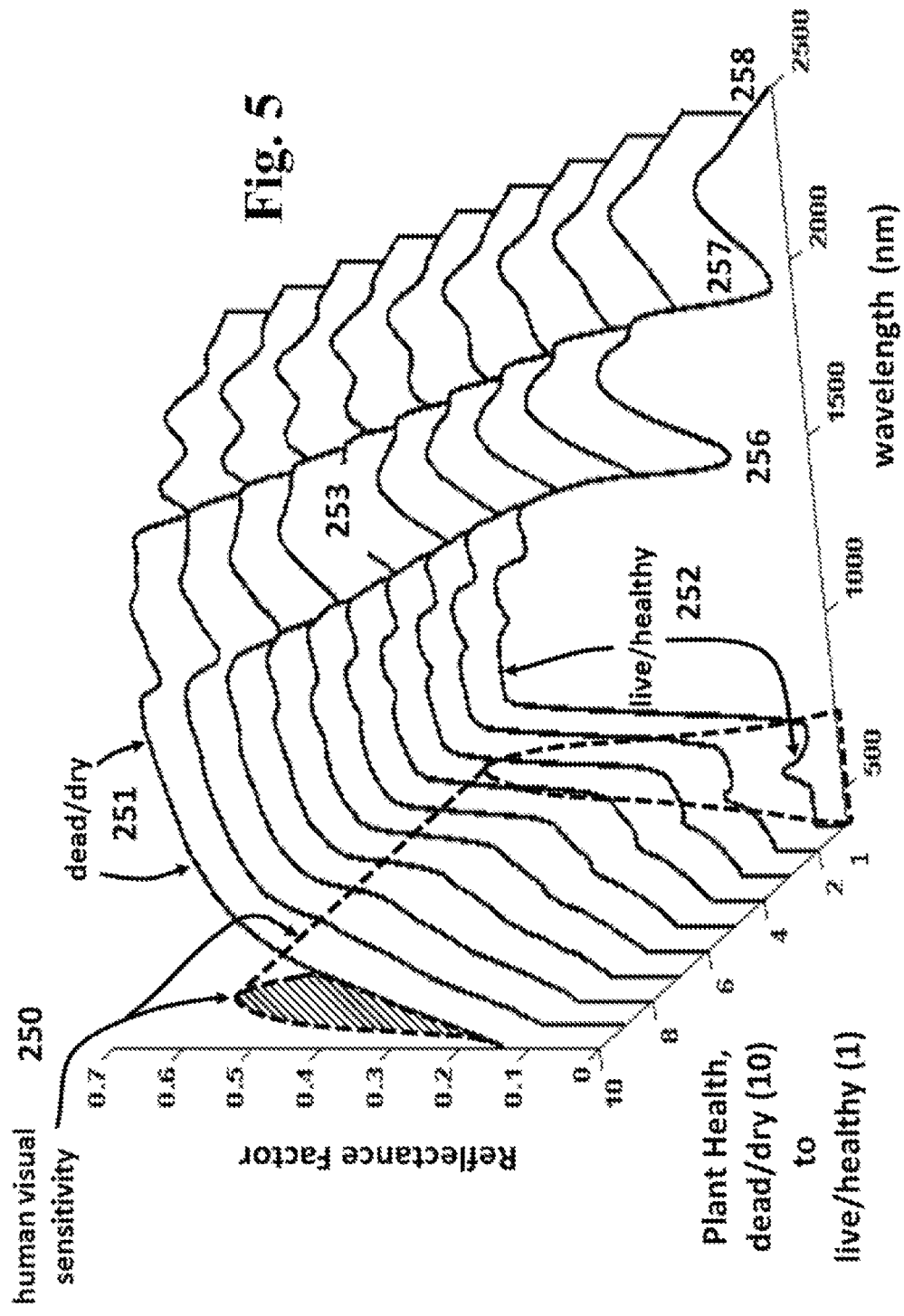
FIG. 5 presents a family of data showing spectral changes for vegetation ranging from live/healthy to dead/dry, including the narrow range of human vision.

FIG. 5 illustrates spectral data corresponding to ten plant health conditions ranging from live/healthy to dead/dry over the spectral range of 400 nm to 2500 nm. Similar data also is presented in Harris Geospatial Solutions, Non-Photosynthetic Vegetation, http://www.harrisgeospatial.com/docs/NonPhotosyntheticVegetation.html (Apr. 3, 2018) in the context of teaching the change in canopy reflectance as vegetation varies from live and healthy to a dead, dry or senescent condition. The spectral sensitivity of unaided human vision is shown within the spectral range of approximately 450 nm to 650 nm. These data may be used to illustrates typical traits of plant spectra that are useful to determine the wavelength selection 15 (FIGS. 1, 2, 3, 4, 11, 12, 14, 17) and the index algorithm 18 (FIGS. 1, 2, 3, 11, 12, 17).

In practicing the present invention, spectral changes are used as an indication of changing plant health. Spectral changes, occurring with variations in plant health such as from live/healthy 252 to dead/dry 251 (FIG. 5), appear both inside and outside of the narrow sensitivity range of unaided human vision 250. Examples of these changes for plant health progressing from live/healthy 252 to dead/dry 251 include the disappearance of the narrow reflective peak at approximately 550 nm, the loss of the steep slope (often referred to as the 'red edge') at approximately 680 nm to 760 nm, and the reflectance minimums at approximately 1500 nm and 1900 nm. Additionally, the present invention is capable of analyzing narrow bandwidths within the range of human vision, providing greater analytical powers than that of unaided human vision. The spectral minima near 1490, 1940, and 2500 nm (256, 257, 258) in the shortwave infrared (SWIR) region are due to water absorption and may be used as part of the present invention to serve as an indicator of the moisture content of the plant.

In illustrative embodiments, the present invention detects a plant response by taking into account spectral changes in various regions of the electromagnetic spectrum, such as wavelength bands including one or more of 350-1000 nm, 400-700 nm, 400-1000 nm, 350-2500 nm, 700-2500 nm or other advantageous regions.

Since much of the spectral changes due to plant condition are outside of the range of human vision, a device that takes this broader spectrum of information into account can be more sensitive and accurate than an unaided human observer. Even within the range of human vision, spectral analysis using principles of the invention is more sensitive and accurate. A preferred embodiment of the present invention uses economical, silicon imaging sensor technology, having a spectral sensitivity range of approximately 400-1000 nm, still substantially greater than human vision. Additionally, by automating the calculation of a plant response based on repeatable, mathematical algorithms, illustrative embodiments of the present invention removes variability common to unaided human observations such as the degree of training and fatigue.

Additionally, having the ability to mathematically calculate and precisely monitor changes in various narrowband regions of the spectrum provides sensitivity to plant changes that is not available with other approaches.

The present invention also provides the ability to use spectral information that is indicative of physiological parameter(s) affected by the herbicide under test. As an example, glyphosate is known to affect photosynthesis directly or indirectly by blocking the shikimate pathway. Numerous labs have observed a decrease in photosynthesis and growth following application of glyphosate. Marcelo P. Gome, Elise Smedbol, Annie Chalifour, Louise Henault-Ethier, Michel Labrecque, Laurent Lepage, Marc Lucotte and Philippe Juneau, Alteration of Plant Physiology by Glyphosate and Its By-Product Aminomethylphosphonic Acid: an Overview, Journal of Experimental Botany, Vol. 65, No. 17, pp. 4691-4703, 2014, doi:10.1093/jxb/eru269 Advance Access publication 19 Jul. 2014; Barry J. Brecke And William B. Duke, Effect of Glyphosate on Intact Bean Plants and Isolated Cells, Plant Physiol. (1980) 66, 656-659. Thus, to detect a plant response due to a herbicide such as glyphosate, the spectral components used by the present invention are selected to be sensitive to those plant characteristics affected by the herbicide, such as in this glyphosate example, chlorophyll function and plant growth.

Figure 6:
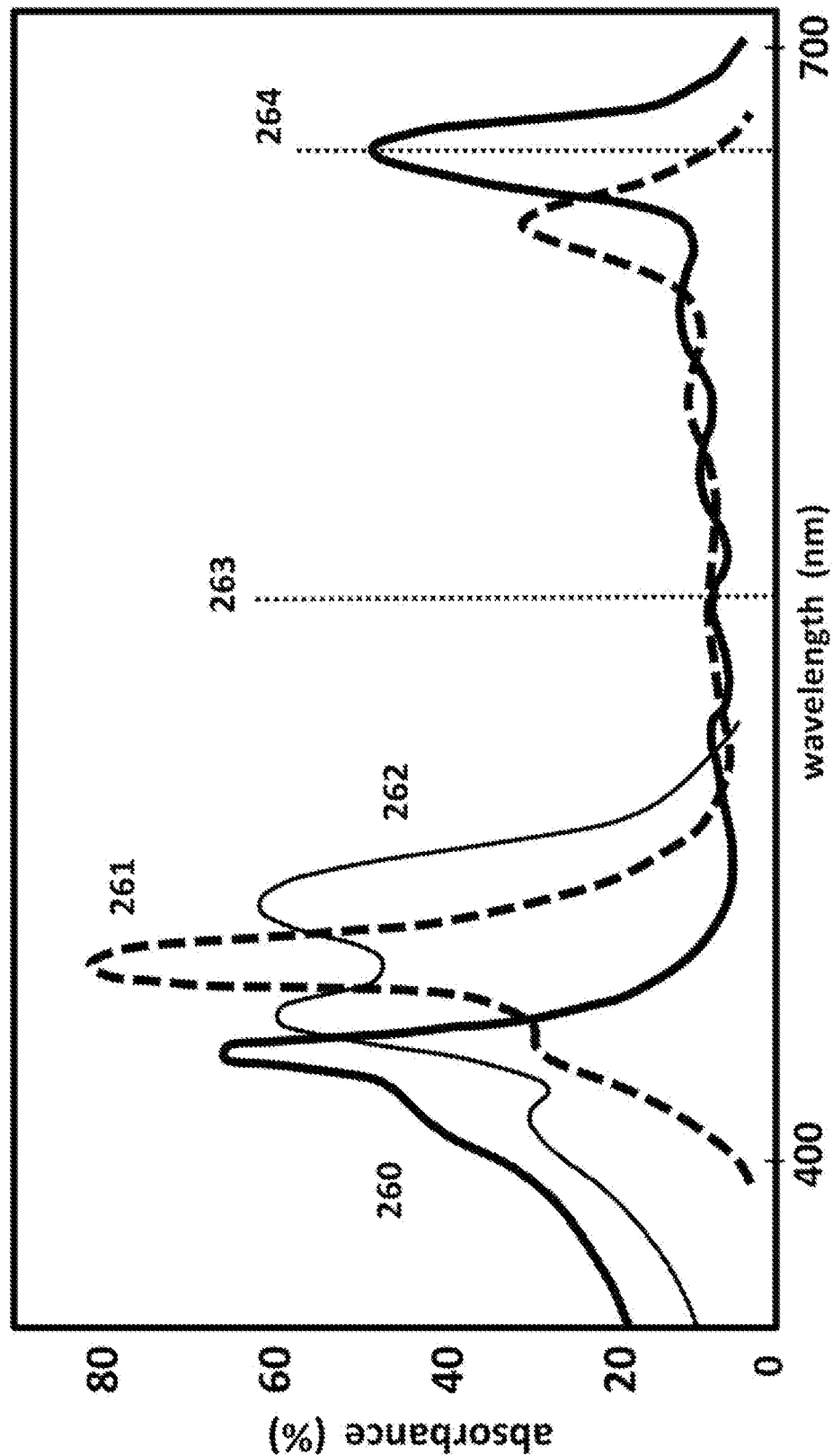
FIG. 6 shows spectral data for common pigments found in plants.

FIG. 6 illustrates spectral absorbance data for common plant pigments. Similar data also is presented in Marsha Ellis, "Photosynthesis, Chapter 7", http://slideplayer.com/slide/7522471/ (Apr. 3, 2018) in the context of teaching the principles of photosynthesis in plants. These data are useful to determine the wavelength selection 15 (FIGS. 1, 2, 3, 4, 11, 12, 14, 17) and the index algorithm 18 (FIGS. 1, 2, 3, 11, 12, 17). In connection with practicing the present invention, FIG. 6 shows representative absorbance spectra of pigments commonly associated with photosynthesis in plants, such as chlorophyll-a 260, chlorophyll-b 261, and carotenoids 262. In this illustrative context, as an example, wavelength, $\lambda_1$ 263, is selected to represent a spectral region that has lesser absorbance due to chlorophyll, while $\lambda_2$ 264 is selected as a wavelength having maximum absorbance by chlorophyll-a 260, a pigment dominating photosynthesis and highly sensitive to any damage due to a glyphosate application.

As an example, in order to detect a plant response to the glyphosate treatment, it is advantageous to detect changes in photosynthesis efficiency and plant growth. Since the concentration of chlorophyll-a 260 is highly correlated with both photosynthesis and growth, a narrow passband around a wavelength, $\lambda_2$ 264, (FIG. 6) falling in the region of high chlorophyll-a 260 absorbance, is selected to be used as part of a Growth Index. Another narrow passband around a wavelength, 263, is selected as a reference to fall in a region of the spectrum where there is lesser absorbance by either chlorophyll-a 260 or chlorophyll-b 261 and thus is minimally affected by changes in either photosynthesis or growth.

Figure 7:
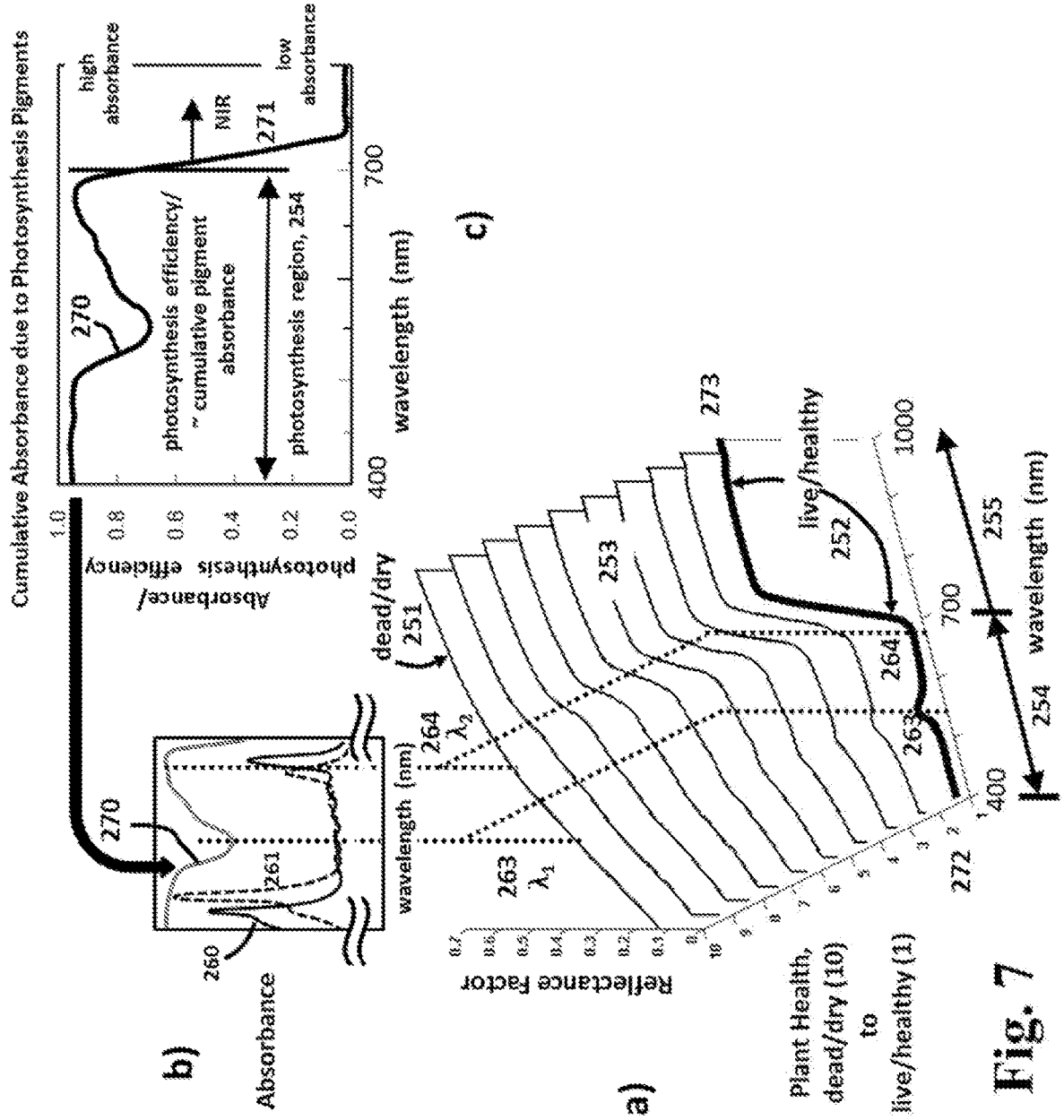
FIG. 7 shows examples of wavelength selection based on spectral data and plant physiology.

The present invention may use a spectral acquisition system to acquire spectral data based on the spectral interrelationships illustrated in FIG. 7 to determine plant health and plant growth. FIG. 7(*a*) shows the interrelationships between the reflectance spectra for plant health from live/healthy to dead/dry plants, (b) the absorbance spectra for common plant pigments in growing plants, and (c) the absorbance spectrum for plant pigments and the efficiency for photosynthesis in live, growing plants. FIG. 7*a*) illustrates a portion of the spectral data from FIG. 5 for ten plant health conditions ranging from live/healthy to dead/dry over the spectral range of 400 nm to 1000 nm. Data from Harris Geospatial Solutions, Non-Photosynthetic Vegetation, http://www.harrisgeospatial.com/docs/NonPhotosyntheticVegetation.html (Apr. 3, 2018). Additionally, FIG. 7*b*) shows the chlorophyll absorbance data from FIG. 6 aligned with the data from FIG. 7*a*) according to wavelength. See similar data presented in Marsha Ellis, "Photosynthesis, Chapter 7", http://slideplayer.com/slide/7522471/, (Apr. 3, 2018) in the context of teaching the principles of photosynthesis in plants. These aligned data may be used to show a representative example of wavelength selection used by the present invention to detect plant condition as indicated on a family of data 251, 252, 253 representing a transition of plant health from live/healthy 252 to dead/dry 251. Wavelength, $\lambda_1$263, is selected to represent a spectral region that has lesser absorbance due to chlorophyll 260, 261, while $\lambda_2$ 264 is selected as a wavelength having maximum absorbance by chlorophyll-a 260 and chlorophyll-b 264, pigments active in photosynthesis and highly indicative of any plant damage. After selecting Growth Index wavelength bands based on pigment absorbance spectra, as shown in FIG. 6, it is advantageous to examine where those same wavelength bands fall on the family of spectral reflectance data representing the graded transition from live/healthy 252 to dead/dry 251 plants as shown in FIG. 7*a*). It is noteworthy to point out the near infrared region of the data 255 in FIG. 7*a*) may be inverted for some plant species, with the live/healthy data 252 exhibiting the higher reflectance and the dead/dry 251 data exhibiting lower reflectance. However, the relative reflectance at wavelength regions, $\lambda_1$263 and $\lambda_2$ 264, remains consistent with those shown in FIG. 7*a*). Notice that near $\lambda_2$ 264, chlorophyll-a absorbance 260 is high and therefore, the reflectance is low for live/healthy plants 252. However, the chlorophyll-a absorbance 260 reduces quickly as the plant health deteriorates allowing the reflectance to increase 251. While both 263 and 264 reflectance increase with decaying plant health, the relative reflectance increase for $\lambda_2$ 264 is much greater.

FIG. 7*c*) illustrates the photosynthesis region of the electromagnetic spectrum 254 (also referred to as the action spectrum for photosynthesis) where the efficiency of photosynthesis 270 is high. In plants, the cumulative absorbance spectrum, that spectral response representing the absorbance of all plant pigments involved in photosynthesis (270, 271), is very similar to the efficiency of photosynthesis both within and outside of the photosynthesis region. For the purposes of this explanation, these two entities will be treated as the same spectrum since the subtle differences are not material to an understanding of the operation of the present invention.

As shown in FIG. 7*c*), the primary spectral region for photosynthesis 254, is approximately 400-700 nm, where the efficiency of photosynthesis 270 and the cumulative absorbance of plant pigments associated with photosynthesis is also high 270. Outside of this spectral range, in the NIR region 271, both photosynthesis and pigment absorbance are low. In terms of reflectance characteristics for healthy, growing plants, reflectance is low within the photosynthesis region (FIG. 7*a*, 254) and high in the NIR region (FIG. 7*a*, 255). As shown in 7 *a*), the reflectance increases within the photosynthesis region 254 with the degradation of plant health, 252 to 251. In the absorbance domain, an increase in reflectance indicates a decrease in absorbance and a corresponding decrease in photosynthesis efficiency within the photosynthesis region 254. The absorbance spectrum 270 (similar to photosynthesis efficiency) in FIG. 7*b*) and *c*) may be estimated from the reflectance curves in FIG. 7*a*) as follows: Absorbance spectrum ~log (1/R), where R is a scaled version of the reflectance spectra of FIG. 7*a*).

The bandwidth of each filter component within the spectral acquisition system 7 (FIG. 1, 11, 12, 14, 17) or the imaging system 31 (FIGS. 2, 3, 4) impacts the ability of the system to detect changes in spectral data indicative of the changes in the plant response. The bandwidth desirably matches the spectral characteristics that are being observed, providing a sensitive and selective indication of the changing plant response. As an example, the chlorophyll-a absorbance peak 264 (FIG. 6) is approximately 20 nm wide. Therefore, a bandpass filter response with bandwidth of 20 nm for one element of the spectral filter array 32 (FIGS. 2, 3, 4), with one element of the selected wavelength array 15 (FIGS. 2, 3, 4) centered at the peak 264 wavelength of chlorophyll-a absorbance, would be an advantageous choice for detecting plant changes affecting chlorophyll-a changes. Advantageous bandwidths may include bandwidths from 5 nm to 100 nm, preferably 5 nm to 50 nm. Selecting a bandwidth may involve considering the spectral response of the plant under investigation. For example, in some applications of the present invention a narrow bandwidth, such as 10-25 nm, has been found to accurately reproduce plant changes in the 350-700 nm region of the spectra, accurately tracking changes in chlorophyll and other pigmentation. Accordingly, using bandwidths of 10 nm to 25 nm are preferred in the wavelength region from 350 nm to 700 nm. Larger bandwidths may be used in the near infrared portion of the plant spectra, since the plant response is typically more constant in the 750-970 nm region. Larger bandwidths, e.g. up to about 50 nm, or up to about 100 nm, or even up to about 200 nm or even larger could be used, if desired, but may be less sensitive to plant responses than shorter bandwidths. A narrow bandwidth, such as 10-25 nm, is advantageous if seeking information regarding water absorbance near 980 nm.

As one risk factor to consider in selecting a bandwidth, a bandwidth that is overly wide averages the desired spectral region that is changing due to the plant response with adjacent regions that may be unrelated to the plant response, thus reducing the sensitivity of the data. Any algorithm that is based on spectral data with overly wide bandwidths may be either more insensitive to the sought-after plant changes than is desired or perhaps might even be unduly correlated to changes other than the intended change, i.e., a loss of selectivity to the desired changes. An algorithm based on properly selected, narrowband, spectral data is likely to be sensitive, selective and accurate in reproducing the desired plant changes.

In illustrative embodiments of the present invention, the bandwidths of the spectral data are selected to be matched to the spectral changes resulting from a changing plant response. Narrowband spectral data, such as, 10-25 nm in the 350-700 nm region of the plant spectrum, provides the ability to track changes in chlorophyll and other pigments of the plant response. Somewhat wider bandwidths, such as 25 nm to 200 nm, may be used in the near infrared (NIR) region, 750-970 nm, to detect some changes, such as in plant canopy and cellular structures. However, in this region narrow bandwidths also provide accurate reproduction of these changes. Note that narrow bandwidths may be more desired in the NIR to provide sensitivity to water absorption around 980 nm. Thus, in most regions of the spectrum, narrowband spectral data provides the preferred input to create the sensitive and accurate algorithm(s) desired to track plant response.

While it is advantageous to select a narrow bandwidth to provide the desired sensitivity and selectivity, there is also benefit in using a slightly wider bandwidth in some modes of practice. A wider bandwidth lets in more light energy and permits operation at lower light/illumination levels. Thus the present invention benefits from optimizing the tradeoff between narrow bandwidth for sensitivity and selectivity and a slightly wider bandwidth that provides improved low-light performance.

When a plant is treated with a herbicide, varying degrees of a plant response may occur. If the plant is highly susceptible to the herbicide, injury begins shortly after treatment and progresses until plant death ensues. This is spectrally illustrated by a transition from the spectral live/healthy curve 252 (FIG. 5) to the dry/dead curve 251. Exemplary action includes absorption of the herbicide into the plant, transport to the active site of the herbicide within the plant and progression to plant death. If the plant is moderately susceptible to the herbicide, injury may begin upon absorption into the plant, but the speed with which the injury progresses is slower and may or may not result in plant death. If the plant is highly resistant to the herbicide, minimal injury (if any) to the plant occurs and the plant may fully recover from the herbicide treatment. Spectrally, this latter action may be illustrated by a transition from the live/healthy data 252 (FIG. 7, plant health level 1) to an adjacent data, plant health level 2, and then a return to the live-healthy data 252 again.

Applications of the present invention relate to the detection and/or measurement of a plant response following a treatment with one or more herbicides. This invention includes the detection and/or measurement of herbicide resistance or susceptibility via acquisition of spectral data and analysis from a leaf or any other anatomical portion of a plant. The present invention may be used to assess a plant response following a treatment with one or more herbicides on a target plant, such as a weed, a crop, a genetically-modified organism (GMO), a non-genetically modified organism (non-GMO), a tree, a shrub, a lawn, or any other type of vegetation. Additionally, the present invention may be applied to assessing a plant response when a herbicide treatment is applied to a seed, bulb, runner, or seed tuber before or during germination or sprouting. This invention has application in plant breeding, plant breeding quality assurance, the determination of an effective herbicide dosage, the identification of a resistant weed in a crop field, or any other application where a herbicide treatment is applied, intentionally or by accident, to a plant, seed, bulb, runner, or seed tuber.

In some embodiments, the practice of the present invention considers the herbicide mode of action. The present invention is likely to be most sensitive and selective to the plant response, following a given herbicide treatment, if the selected wavelength regions 15 (FIGS. 1, 2, 3, 4, 11, 12, 14, 17), filter bandwidths, and index algorithm 18 (FIGS. 1, 2, 3, 11, 12, 17) are sensitive to the anticipated mode of action of the herbicide(s) on the target plant. The term, mode of action, refers to the manner in which the herbicide(s) attacks the health of the target plant, such as via absorption of the herbicide by the plant, transport within the plant, and the stages leading to plant injury or death.

Examples of various modes of action for herbicides include plant growth regulators (PGR), amino acid biosynthesis inhibitors, fatty acid biosynthesis inhibitors, seedling growth inhibitors, photosynthesis inhibitors (mobile and non-mobile), cell membrane disrupters, pigment inhibitors, and nitrogen-metabolism disrupters (phosphorylated amino acid). Penn State Extension, Herbicides, Penn State College of Agricultural Sciences, http://extension.psu.edu/pests/weeds/control/introduction-to-weeds-and-herbicides/herbicides, 2017.

As an example, an amino acid biosynthesis inhibitor, such as glyphosate, works by interfering with one or more key enzymes that catalyze the production of a specific amino acid in the plant. When a key amino acid is not produced, the plant's metabolic processes begin to shut down. Plants that are sensitive to such a herbicide stop growth almost immediately, seedlings may die in 2-4 days, with established perennials dying in 2-4 weeks. Thus, since growth stops early following a treatment with this type of herbicide, it is advantageous to select wavelengths that correspond to portions of the electromagnetic spectrum that change with a reduction in plant growth. Additionally, it is valuable to choose an algorithm that is mathematically sensitive to this change in spectral data.

As an additional example, a plant growth regulator (PGR), such as dicamba, upsets the normal growth of plants, with rapidly dividing leaf vein cells, white cells between veins ceasing to divide, an increase in water content, an increase in respiration rate, and a marked decrease in photosynthesis. Thus, since a decrease in photosynthesis is a symptom of this type of herbicide, it is advantageous to select wavelengths that correspond to portions of the electromagnetic spectrum that change with a reduction in photosynthesis. Additionally, it is valuable to choose an algorithm that is mathematically sensitive to this change in spectral data. Selecting spectral data that is sensitive to two or more symptoms of a herbicide mode of action is likely to provide an even more sensitive and accurate indication.

One embodiment of the present invention selects wavelengths or regions of the electromagnetic spectrum that are sensitive to changes in plant characteristics that are directly affected by a designated mode of action characteristic of the one or more chosen herbicide(s). These spectral data are incorporated into a mathematical formula, algorithm or index that is, in turn, sensitive to the selected wavelength regions.

The present invention involves the acquisition of spectral data. The present invention includes the data acquisition of spectral information from any number of systems, instruments or devices 7 (FIG. 1, 11, 12, 14, 17) or 31 (FIGS. 2, 3, 4). This invention may utilize spectral data that is reflected from a target surface 6 (FIG. 1), transmitted through a target surface 6, emitted from a target surface 6 or exhibits fluorescence from a target surface 6. For determining a plant response to one or more herbicides, such as is useful as an indication of herbicide resistance or susceptibility, the target surface 6 is any anatomical surface on the desired plant or crop. A typical target surface 6 of the present invention is the leaf surface 34 (FIGS. 2, 3, 4, 11, 12, 17) of a plant or the canopy of a crop 34.

Examples of spectral acquisition systems 7 (FIG. 1), of the present invention include, but are not limited to the following: spectrometers, spectrophotometers, cameras with filter wheels, hyperspectral imaging systems, multispectral camera systems, camera systems with electronically tunable filters, camera systems having multiple filter elements incorporated into the imaging sensor, color cameras, and selective spectral imaging systems utilizing filter arrays and camera arrays such as described in U.S. Pat. No. 9,551,616. In other words, any spectral acquisition system that provides spectral information in a desired wavelength region may serve as an input for the present invention. Spectral sensitivity of such spectral acquisition systems may include but are not limited to wavelength ranges of 400-1000 nm, 350-1000 nm, 350-2500 nm, 400-700 nm, and 700-2500 nm.

In order to accurately determine the plant response curve 310, 313 (FIG. 10) associated with the herbicide treatment 3 (FIGS. 1, 2, 3, 4, 11, 12) and 121, 122, 123 (FIG. 14), preferred modes of practice of the present invention may adhere to the Nyquist criteria (at least twice the frequency of the highest frequency component present) which governs the minimum sampling rate 17 (FIGS. 1, 2, 3, 4) and 81 (FIGS. 11, 12, 17) useful to accurately reconstruct the signal, in this case, the plant response curve following the herbicide treatment. Additionally, when using the parametric characterization methods of the present invention in a shortened time window, it is advantageous to sample the rapidly changing portion of the plant response curve at a rate sufficiently fast to accurately fit the parameterized curve to the acquired data.

Embodiments of the invention may include generation of an index algorithm. In the practice of the present invention, the selection of an index algorithm 18 (FIGS. 1, 2, 3, 11, 12, 17) to be used to detect and/or measure a plant response to a herbicide treatment for a leaf, plant or crop may be based on a number of factors. The index algorithm 18 may include a ratio, difference, sum, ratio of differences, ratio of sums, ratio of a sum and a difference, a mathematical formula, eigenvector(s), basis function(s), least squares analysis, principle component analysis, a matched filter, neural networks, cross-correlation, multivariate analysis, or numerous classification methods.

A preferred embodiment of the present invention uses spectral data from wavelength regions of the electromagnetic spectrum 15 (FIGS. 1, 2, 3, 4, 11, 12, 14, 17) that exhibit change as a plant response progresses following a herbicide treatment. Additionally, it may be advantageous to select wavelengths 15 whose change is associated with the herbicide mode of action. This strategy provides an early indication of herbicide effect as well as a sensitive and accurate indication of plant response to the herbicide treatment 3 (FIGS. 1, 2, 3, 4, 11, 12).

In one embodiment of the present invention, a mathematical index algorithm 15 (FIGS. 1, 2, 3, 4, 11, 12, 14, 17) is used to transform the spectral data into a scalar index value at a given point in time. This scalar value may be derived from a spectral data vector 10 (FIGS. 1, 3) 293 (FIG. 8) acquired via a point acquisition system or it may be a scalar value derived from a grouping of pixels acquired via a spectral imaging acquisition system 31 (FIGS. 2, 3, 4). The accumulation of scalar index values over time represents the time-varying plant response 21 (FIGS. 1, 2), 87 (FIG. 11), 97 (FIG. 12).

In another embodiment of the present invention, a mathematical index algorithm 15 (FIGS. 1, 2, 3, 4, 11, 12, 14, 17) is used to transform the spectral data 11(FIG. 1, 2, 3, 4, 11) acquired by an imaging system into a matrix or image of index values representing pixels derived from the images of the scene. The accumulation of matrix or image index values over time represents the time-varying plant response with each point in time represented by an index image, such that the plant response for any portion of the plant may be observed.

In another embodiment of the present invention, the plant response curve may be represented by one or more of the following functions: exponential 310, 313 (FIG. 10), linear, quadratic, cubic, trigonometric, parabolic, elliptical, or any other function that can be represented as a mathematical expression.

In another embodiment of the present invention, the plant response curve 310, 313 (FIG. 10) is formed from spectral data representing a single spatial location 4 (FIGS. 1, 3, 11, 12, 14, 17) on the leaf, plant, or crop.

In another embodiment of the present invention, the plant response curve 310, 313 (FIG. 10) is formed from spectral data 10 or 11 (FIG. 1) representing at least a portion of a vegetative area 6 (FIG. 1) within a field of view 4, 5 (FIG. 1).

In another embodiment of the present invention, the plant response curve 22 (FIGS. 1, 2), 87 (FIG. 11), 97 (FIGS. 12, 17) is formed from spectral data that represents at least a portion of a leaf, plant or crop via an average, median, filter or weighted function.

In another embodiment of the present invention, spectral information is used to differentiate vegetative subject matter from non-vegetative subject matter (soil, wood, litter, etc.) prior to inclusion of the vegetative portion of the field of view into any calculation resulting in a plant response curve.

In another embodiment of the present invention, spectral information is used to form an image mask that includes vegetative portions of the field of view and excludes non-vegetative portions of the field of view, in order to provide an output, such as a plant response curve, that is based on target vegetation and not background substances such as soil.

In another embodiment of the present invention, spectral information is used to form an image mask that includes a specific type of vegetation, such as a specific crop plant or a specific weed variety, and excludes portions of the field of view unrelated to the desired target vegetation, in order to provide a plant response curve that is based on target vegetation and not background substances, such as soil or undesired vegetation varieties.

The spatial analysis region, that region within the spatial field of view 5 (FIGS. 1, 2, 3, 4, 11, 12, 14, 17) of the acquisition system of the present invention, may vary with the desired target plant(s) and the chosen spectral data acquisition system 7 (FIG. 1).

In one embodiment of the present invention, the acquired spectral data is an array of data values 10 (FIGS. 1, 3), as might be acquired by a spectrometer, representing different wavelength bands, corresponding to a single spatial point 4 (FIGS. 1, 3) on the surface of the target plant.

Figure 8:
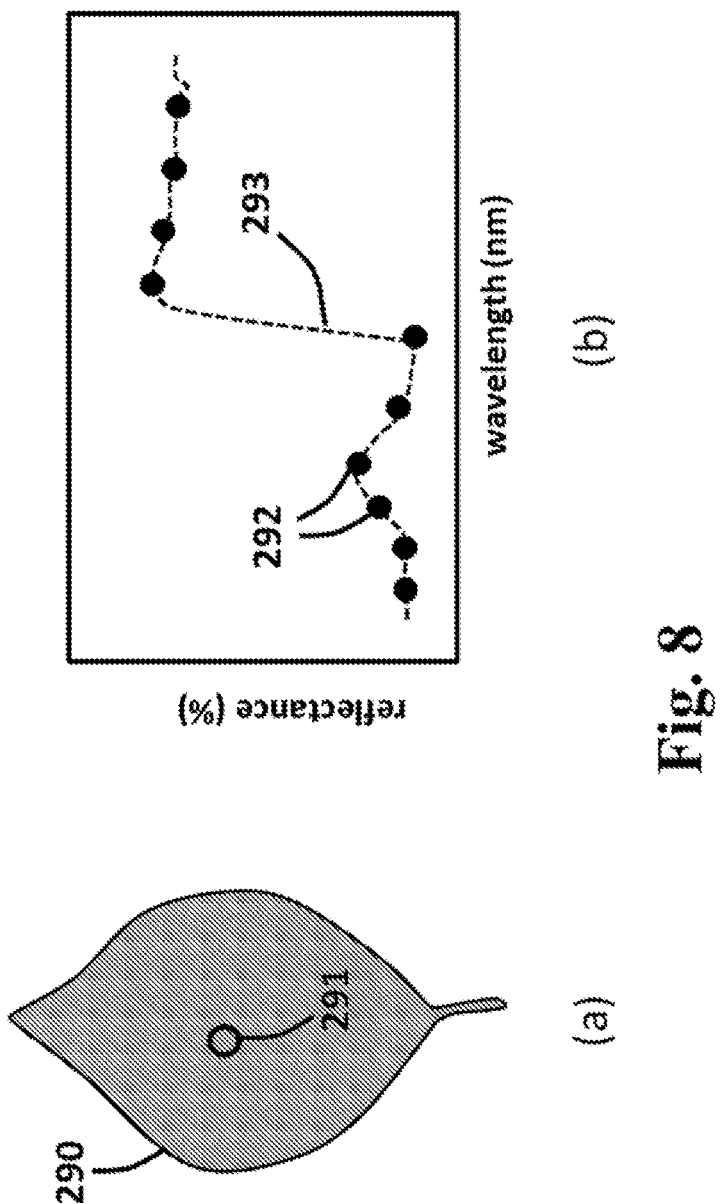
FIG. 8 shows spectral data from a point spectral analysis system, such as a spectrometer.

FIG. 8 illustrates a typical input for a point input acquisition system 4 (FIGS. 1, 3, 11, 12, 14, 17) with input data 10. In greater detail, FIG. 8 shows a two-dimensional array of continuous spectral data 293 representing the reflectance acquired at various wavelengths for a single spatial spot 291 on a leaf surface 290. Typically, the array 293 is not continuous, but rather discretely sampled at a wavelength resolution, such as approximately 0.2 nm, 1.0 nm, 1.5 nm, 2 nm, or 3 nm. The illustrated reflectance spectrum 293 of the spatial spot 291 is comprised of reflectance values for each wavelength in the range of wavelengths. Reflectance values at selected wavelengths 292 may be used to characterize the health of the plant and its changing condition following a herbicide treatment.

Figure 9:
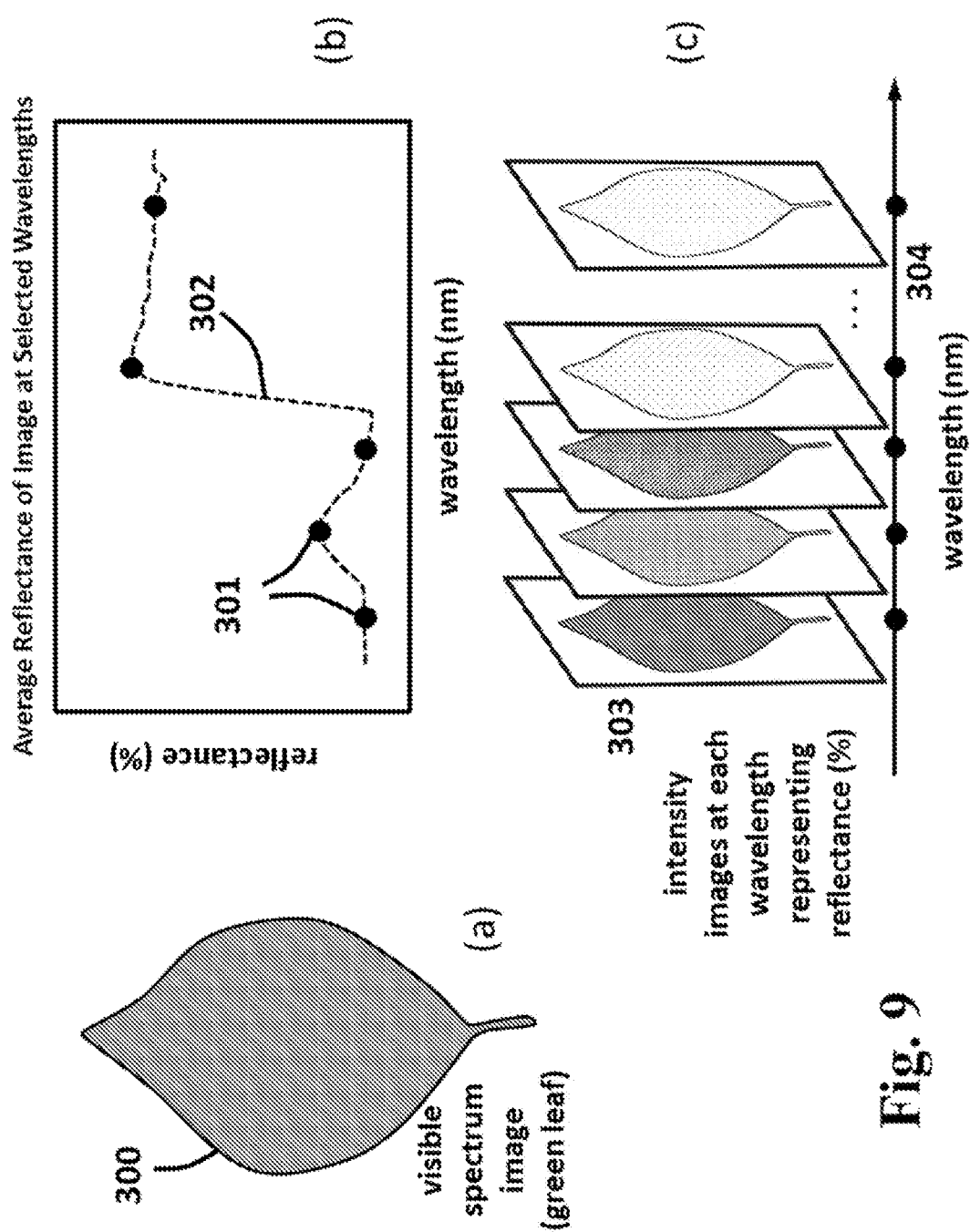
FIG. 9 shows a three-dimensional array of spectral data from a spectral imaging system, including intensity images at selected wavelengths.

FIG. 9 illustrates a typical input for a spectral imaging input acquisition system 7 (FIGS. 1, 11, 12, 14, 17) and 31 (FIG. 2, 3, 4) with input data 11. In greater detail, FIG. 9 shows a three-dimensional array of spectral data 303 as would be acquired using a spectral imaging system of the present invention. FIG. 9(*a*) shows a visible image of a leaf 300, such as might be captured using a common visible spectrum camera. FIG. 9(*b*) shows a plot of average reflectance 301 of the leaf surface 300 at each selected wavelength (301, 304). The spectral curve 302 represents the reflectance spectrum for a uniform leaf. While shown as an average for the entire leaf in this illustration, for a leaf having non-uniform spectral characteristics, each pixel or group of pixels in the spectral image may have a different spectrum 302 from that shown in (b). FIG. 9(*c*) shows intensity images representing the spatial reflectance of the leaf surface 300 at each wavelength 304. While shown for a leaf of uniform reflectance in this illustration, non-uniform leaf targets would yield non-uniform spectral images 303 at each wavelength 304. At each selected wavelength 304 a spatial image is acquired representing the reflectance of the target surface (leaf) for each pixel or group of pixels in the spatial image. In this example, the acquired spectral data 303 of the present invention is a three-dimensional data volume of spectral information with one dimension representing the spectral information (reflectance, transmission, emission or fluorescence) at different wavelengths and the remaining two dimensions representing intensity images indicative of the spatial distribution of the spectral information. Entire plants, crops or fields may be imaged in this manner. For a sampled system, a data set as illustrated in FIG. 9 is acquired for each data trigger 2 (FIGS. 1 and 2).

The present invention may involve parametric characterization of the plant response to one or more herbicides. By sampling the spectral data at intervals following a herbicide treatment of the target plant and transforming these spectral data into an index, indicative of the health of the plant at each sampled time, plant response data may be generated that indicates the changing health of the plant following a treatment with one or more herbicides. Mathematical parameters may, in turn, be determined that characterize a mathematical function that fits these plant response data. The mathematical parameters provide a quantitative, accurate and repeatable measure of the plant response to the herbicide treatment.

In one embodiment of the present invention, with reference to FIG. 1, a method of determining the herbicide resistance of a target plant is provided via a determination of mathematical parameter values characterizing the plant response following a treatment with one or more herbicides, comprising the following steps:

a) the target plant 6 is treated with one or more herbicides 3;

b) spectral data (10, 11) from preselected wavelength regions of the electromagnetic spectrum 15, associated with at least one spatial position (4, 5) containing plant information, is acquired at sampled time intervals 2 following the herbicide treatment 3;

c) a time-varying array of index values 21 is computed for each spatial position (4, 5) provided by the spectral data acquisition system 7 by transforming the spectral data (10, 11) into an index value or index matrix 21 (depending on the acquisition system used) via an index algorithm or formula 18;

d) optionally, for data from an imaging acquisition system, image processing may be applied to each data matrix 11 at a given sampling time 2;

e) optionally, for data from an imaging acquisition system, an image mask may be applied at various sampling times 2 to include or exclude data corresponding to selected criteria;

f) the time-varying, plant response data 22 are represented by a mathematical function 22 using curve fitting methods known to those skilled in the art of statistics, signal and image processing;

g) the plant response 22 to the herbicide treatment 3 is measured by the parameter values 23 characterizing the fitted mathematical function characterizing the plant response data.

The spectral data 9 acquired at each sampling time 2 may represent a single, localized spatial position on the target plant 4 (such as would be provided by a spectrometer), or these spectral data acquired at each sampling time 2 may represent multiple spectral images 11 (such as would be provided by a spectral imaging system) at selected wavelength regions of the electromagnetic spectrum 15. In the case of the latter imaging system, each pixel or group of pixels (i.e., if averaged or filtered in some manner) would be similar to the localized single spatial location. (See FIGS. 8 and 9 for types of spectral data arrays.)

Figure 10:
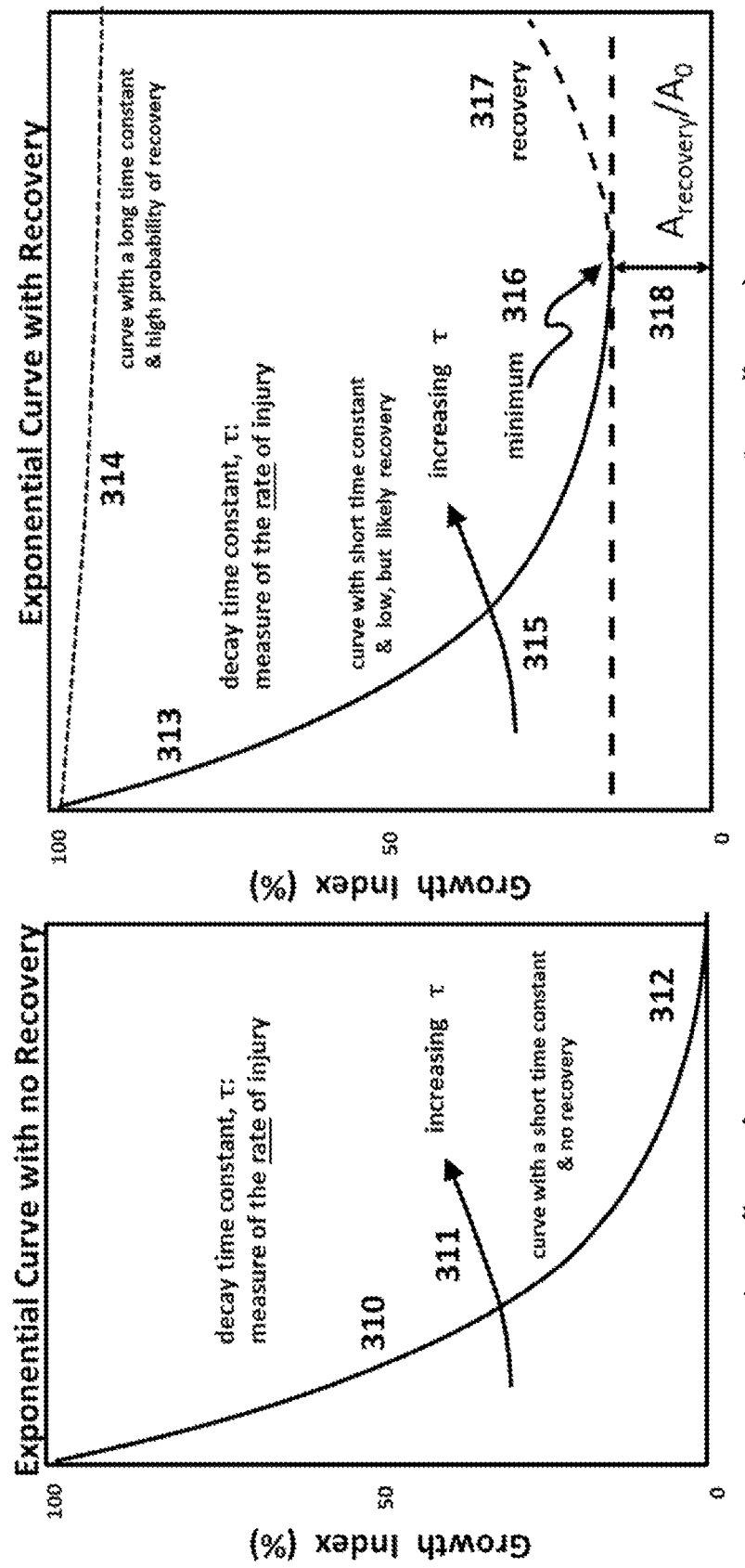
FIG. 10 shows examples of time-varying curves representative of plant responses following a herbicide treatment.

The graphs of FIG. 10 show examples of time-varying curves (310, 313 and 314), representative of possible plant responses following a herbicide treatment 3 (FIGS. 1, 2, 3, 4, 11, 12), obtained by computing an index array 21 (FIGS. 1, 2), 87 (FIG. 11), 97 (FIG. 12), 120 (FIG. 14) based on acquired spectral data using an index algorithm 18 (FIGS. 1, 2, 3, 11, 12, 17). In these examples, the function takes the shape of a decaying exponential curve (310 and 313). FIG. 10 (left) shows an example of a plant response where the herbicide treatment completely kills the plant indicated by response 310 decaying to zero (312) over time. The decay time constant, r, for the plant response, serves as an indicator of the rate of injury, with a short time constant indicating a more severe injury occurring in a shorter time. Since the decay of the curve 312 drops completely to 0%, the eradication is complete. FIG. 10 (right) shows an example of a plant response 313 for a herbicide treatment that did not completely kill the plant, indicated by the minimum of the curve 316, which did not reach 0%, indicating the eradication was incomplete. The dotted line at the top of the graph (right) 314 shows another plant response indicating a plant highly resistant to the herbicide treatment, characterized by a slow rate of decay and a large recovery offset, indicative of a high probability of plant recovery.

Equation 1 describes, $f_1(t)$, a general form of a plant response 16 (FIGS. 1, 2, 3), 310 (FIG. 10). The general form, $f_1(t)$, representing a time-varying plant response indicative of changing plant health following a herbicide treatment that was derived from spectral data. This form of a plant response is characterized as an exponential decay with parameters, $\tau$ and $A_0$, the decay time constant and initial amplitude, respectively. The curve of Equation 1 decays to zeros indicative of plant injury and death following treatment with the herbicide, as shown in FIG. 10 (left) 310.

For the original data, $A_0$ may be any value depending on the units of the spectral data. In the original acquired data, the initial value at time zero is $A_0$. Upon normalization, the initial value becomes 100% (or 1.00). The time constant, $\tau$, establishes the rate of decay. FIG. 10 (left) 310 shows a Growth Index resulting in plant death, modeled by $f_1(t)$, a decaying exponential, that reaches zero 312, as described mathematically by Equation 1, $$f_1(t) = [A_0] e^{-\left(\frac{t}{\tau}\right)} \quad \text{(Eqn. 1)}$$

Where $f_1(t)$ is a general form of a plant response; $A_0$ is the amplitude of this index at time=0; t is time (typically in hours or days); and $\tau$ is the time constant governing the decay rate (typically in hours or days).

Equation 2 describes $f_2(t)$, a normalized general form of a plant response, which may be achieved by normalizing with respect to $A_0$, as shown in FIG. 10 (left). This result is obtained by dividing the right side of Equation 1 by $A_0$ to obtain a normalized maximum value of 100% or unity. This example is shown in Equation 2 for $A_{recovery}=0$, indicating that the curve decays to zero. For non-zero values of $A_{recovery}$ Equation 2 describes the exponential response with recovery as shown in FIG. 10 (right) 313. In this example, the plant is injured, but recovers following the herbicide treatment. The decay rate is governed by the time constant, $\tau$. The normalized initial amplitude is 100%. The normalized value of $A_{recovery}$, $A_{recovery}/A_0$, is an indication of the likelihood that the plant will recover. $A_{recovery}/A_0=0$ is an indication of plant death. $A_{recovery}/A_0$ greater than an empirically determined threshold, is an indication that the plant is likely to recover.

$$f_2(t) = 100 \left[ \left[ \frac{(A_0 - A_{recovery})}{A_0} \right] e^{-\left(\frac{t}{\tau}\right)} + \frac{A_{recovery}}{A_0} \right] (\%) \quad \text{(Eqn. 2)}$$

In one embodiment of the present invention, a measure of herbicide resistance is obtained by transforming spectral data into an plant response curve via an index algorithm, deriving an array of index values, fitting the plant response data to a mathematical function, such as an exponential function, and determining parameters of the mathematical function that provide a measure of the herbicide resistance of the target vegetation and herbicide.

In another embodiment of the present invention, the measure of herbicide resistance includes modeling the plant response with an exponential function having parameter values comprising a time constant, indicative of the speed at which the herbicide attacks the vegetation, and a recovery offset, indicative of a probability of vegetative recovery. This embodiment includes the possibility of a non-zero, recovery offset value, $A_{recovery}$, indicating that vegetative recovery following the herbicide treatment is likely.

The present invention may provide early detection of the plant response via parameter estimation. The representation of the plant response by a mathematical function permits the present invention to determine the full-duration plant response using spectral data acquired during the early portion of the response, shortening the time typically required for such tests. Once the plant response curve has been established for a given herbicide and plant population over the full time window sufficient to verify repeatability and accuracy, it then becomes possible to know the entire response based on a shortened, early observation window. As an example, even though an entire plant response may require 28 days to fully develop, it becomes possible to determine the curve parameters during the first 24 hours. Thus, for example, an experiment that previously required 28 days to complete, may now be conducted in 24 hours. This provides a significant savings in time and resources. As a precaution, care may be taken in the initial determination of the plant response to assure that it is repeatable and accurate.

In one embodiment of the present invention, a mathematical, time-varying function is fitted to a time-varying index array derived from sampled spectral data, where the sampled spectral data is indicative of the plant response following a herbicide treatment. By using index data from a shortened, early observation window, and parameter estimation techniques the present invention may accurately characterize the entire plant response curve using only the early data, thus avoiding the need to complete the full, lengthy protocol. This provides a significant savings in time and resources while still achieving repeatability and accuracy in the measurement of a plant response to a herbicide treatment.

In another embodiment of the present invention, a mathematical, time-varying function is fitted to the spectral data indicative of a plant response due to herbicide treatment, such that data from any portion of the total observation window may be used to accurately estimate parameters defining the entire response curve.

In another embodiment, a method is used to empirically determine the index algorithm to transform the spectral data into an accurate plant response curve, comprising the following:

a) Determine the process for growing the plant(s) and applying the herbicide treatment (i.e., plant age, herbicide dosage, time of treatment, and duration of data collection);

b) Acquire a family of spectral curves, such as with a spectrometer, obtained at specific time intervals;

c) Use the family of spectral curves in conjunction with a knowledge of plant physiology to select wavelength regions of the electromagnetic spectrum that demonstrate changes in plant health as a result of the herbicide treatment;

d) Generate a proposed index algorithm, utilizing the selected wavelength regions, to convert spectral data to an array of index values.

e) Examine the resulting array of index values to determine the effectiveness of the proposed index algorithm;

f) Modify the proposed index algorithm to improve accuracy and repeatability as desired;

g) Iterate steps (a) through (f) until the results meet desired accuracy and repeatability criteria.

Figure 11:
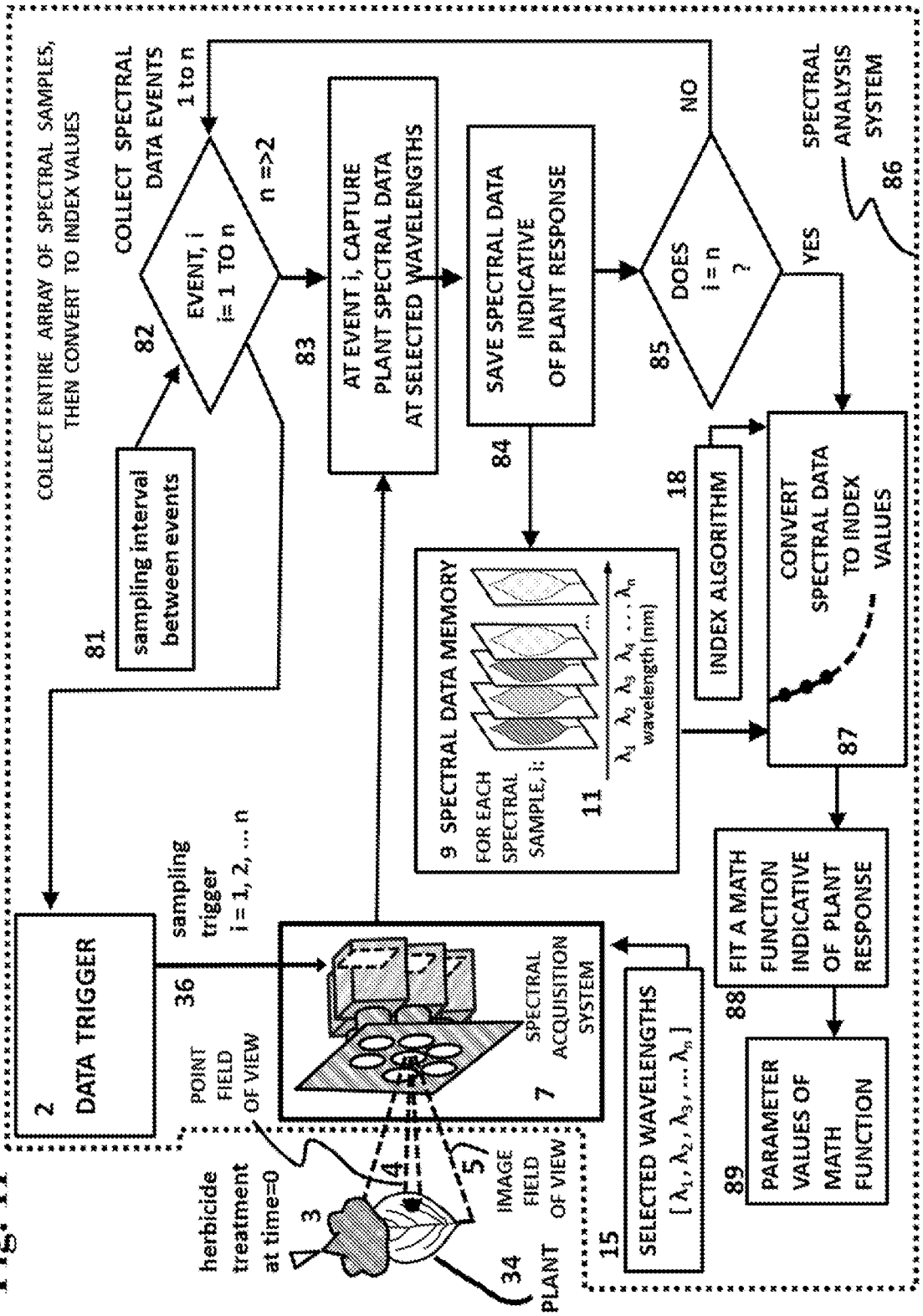
FIG. 11 shows a method of characterizing a response of a plant subjected to a herbicide treatment, using steps that convert spectral data to index values as a whole set.
Figure 12:
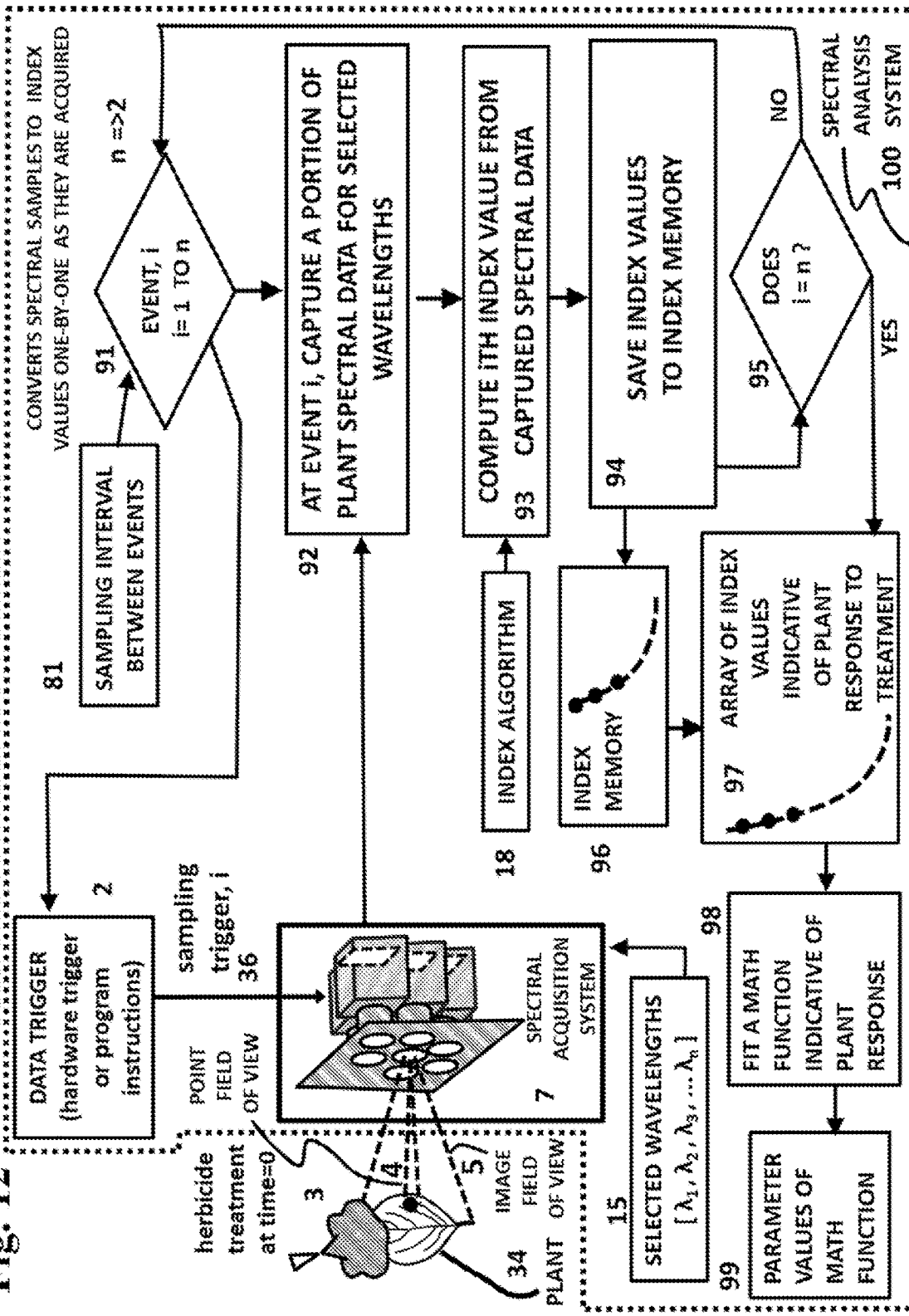
FIG. 12 shows a method of characterizing a response of a plant subjected to a herbicide treatment, using steps that convert spectral data to index values as individual samples.

FIG. 11 illustrates a method of the present invention for characterizing a response of at least one plant subjected to a herbicide treatment 80. The method of FIG. 11 shows an embodiment of the program instructions for processing spectral data 12 in FIG. 1. This particular embodiment accumulates an entire set of spectral data samples 11 in spectral data memory 9 prior to computing index values 87 indicative of the plant response to the herbicide treatment 3.

In the method of FIG. 11, a plant 34 is subjected to a herbicide treatment 3 and spectral data is acquired and analyzed by spectral analysis system 86. Spectral data set 9 is provided from a time window following the herbicide treatment 3 via a spectral acquisition system 7. The spectral data set 9 is comprised of accumulated spectral data samples 11 acquired at different sampling times, i, as indicated in steps 82, 83, 84, and 85. The event count is indicated by i, where i=1, 2, ... n, with i being at least 2 events and n being the total number of sampling events. The sampling events are initiated via step 82 and the data trigger 2 which initializes the data acquisition within the spectral acquisition system 7. The spectral acquisition system 7 may be a point acquisition system, such as a spectrometer, or a spectral imaging system. The counter, i, is incremented in each pass through step 82. In step 83, for each event, spectral data is captured at selected wavelengths 15. In step 84 the spectral data samples 11 are saved to spectral data memory 9. Step 85 checks to determine if all events, n, have been completed. If not, control is passed to step 82, the event counter, i, is incremented and steps 82-85 repeat until n data samples have been acquired.

Upon acquisition of n data samples 11, index values are computed for the entire set of data samples 9 using the chosen index algorithm 18 to form a time-varying array of index values 87 indicative of the plant response to the herbicide treatment 3. Then a math function, having the general form of the plant response 16 (FIGS. 1, 2, and 3), is fitted to the index array determined in step 87. In step 88 the general form of the plant response 16 is fit to the index values from step 87 and the resulting parameter values, associated with the fit of the math function to the data are output to block 89.

In representative embodiments illustrated in FIG. 11, the present inventions provides a method of characterizing a response of at least one plant subjected to a herbicide treatment 80, comprising the steps of:
a) providing a spectral data set 9 comprising at least first and second spectral data samples 11 for the at least one plant 34 subjected to a herbicide treatment 3 wherein:
 (i) the first and second spectral data samples 11 are acquired (82-85) from the at least one plant 34 from at least first and second different spectral sampling events 82, respectively, occurring at least at first and second different sampling times 2 during a time window in which the herbicide treatment 3 is acting on the at least one plant 34; and
 (ii) the spectral data samples 11 include spectral information 9 associated with two or more pre-selected wavelength regions of the electromagnetic spectrum 15 such that the spectral information 9 associated with the two or more pre-selected wavelength regions 15 is indicative of the response 87 of the at least one plant 34 to the herbicide treatment 3 over time; and
b) using information comprising the spectral information 9 associated with the two or more pre-selected wavelength regions of the electromagnetic spectrum 15 from at least the first and second spectral data samples 11 to provide information indicative of the response 88 of the at least one plant 34 to the herbicide treatment 3 as a function of time.

FIG. 12 illustrates a method of the present invention for characterizing a response of at least one plant 34 subjected to a herbicide treatment 3 with spectral data acquired and analyzed via the spectral analysis system 100. The method of FIG. 12 shows another embodiment of the program instructions for analyzing spectral data 10, 11 (FIG. 1). This particular embodiment calculates index values in step 93 one-by-one as the spectral data is acquired in step 92 rather than waiting until all data samples have been captured, as in FIG. 11. Functional blocks are similar to FIG. 11. If desired, the accumulation of the index values with each additional event in step 97, the fitting of the general form 16 (FIGS. 1, 2, 3) of the plant response to the data in step 98, and the output of the parameter values 99, may be included within the loop of steps 91-95. This modification permits an evaluation of the fit accuracy while the data is still being acquired. In this example, once sufficient fit accuracy is achieved, sampling may be discontinued.

Parameter estimation techniques are useful in the practice of the present invention. An example of a parameter estimation technique, as may be embodied in the program instructions 12 of FIG. 1, is presented below. When the plant response function is a decaying exponential function that decays to zero (no recovery offset), such as in FIG. 10 (left) and Equation 1, then a simple parameter estimation techniques becomes available involving the application of the natural logarithm to the data.

$$\ln(f_1(t)) = \ln\left\{[A_0]e^{-\left(\frac{t}{\tau}\right)}\right\} = -\left(\frac{1}{\tau}\right)t + \ln(A_0) \quad \text{(Eqn. 3)}$$

The right side of this equation has been put in the linear form of y=m x+b, where $$m = -\left(\frac{1}{\tau}\right) \quad \text{(Eqn. 4)}$$

and $$b = \ln(A_0)$$

These values can be readily determined from data using a linear regression solution.

When the plant response function has a non-zero recovery term, $A_{recovery}$, as shown in FIG. 10 (right) and Equation 2, then the linear regression approach, using the simple natural logarithm solution, described above, no longer holds. With a non-zero recovery term, methods employing differential equation solutions become a viable approach. In any case, once a mathematical function and its parameters are found to describe the plant response function based on the full observation window, a viable method to determine the same parameters of the function from a shortened, more efficient, observation window can be determined. The mathematical solutions for these varying functions are evident to those skilled in the art.

Understanding the minimum time between herbicide treatment and detection of the plant response is useful in the practice of the present invention. In the practice of the present invention it is useful to understand the advantages and limitations of using parameter estimation and curve fitting methods to determine the complete plant response using a shorter sampling period, such as is presented in blocks 12 and 22 of FIG. 1. An advantage of the present invention is that it significantly shortens the time to analyze the plant response 22 following a herbicide treatment 3. The limit of shortening the sampling period is dependent upon the plant physiology that establishes a minimum time between a herbicide treatment and the plant reaction to that herbicide treatment. The shortest time between treatment and the onset of a plant response to that treatment is herein referred to as a minimum response time for a plant and herbicide interaction.

As one example, a minimum response time may include the time for a threshold treatment dosage, that dosage of a herbicide treatment sufficient to cause a plant response, to be absorbed by the plant, transported to the region of the plant affected by the active treatment ingredient(s), and the time required for that dosage to have an effect on the plant. In another example, the minimum response time may not include transport time if the treatment dosage is absorbed directly into the appropriate region of the plant that is affected by the treatment. The minimum response time may be viewed as the time required for plant treatment to have a physiological effect on the plant. In these examples, the present invention is unlikely to achieve a measure of a plant response prior to the plant reacting to the herbicide treatment. From a measurement perspective, it is advantageous that the minimum response time is often short. For example, according to Nandula, Vijay K., Vencill, William K., Herbicide Absorption and Translocation in Plants using Radioisotopes, Weed Science, 2015, Special Issue: 140-151 (Nandula), present radioisotope data showing the absorption rate of glyphosate applied to waterhemp (weed). These data indicate that a significant amount of glyphosate is absorbed after only 5-10 hours and a majority of the absorption has occurred within 24 hours. Since these data are expressed as a percentage of the applied dosage, it follows that a larger dosage causes a threshold dosage to be absorbed earlier than a smaller dosage. Once a threshold amount of the herbicide, sufficient to cause a plant response, has been absorbed it becomes possible to detect the early stages of injury to the plant.

From the Nandula data, it is reasonable to anticipate detection of a noticeable plant response 5-10 hours following application of the herbicide treatment with a significant plant response observed within 10-20 hours. Thus, since the present invention provides a sensitive indication of a plant response and additionally provides parameter estimation techniques that permit the complete response curve to be determined from the early samples, it follows that in many cases the present invention may provide the complete plant response curve in a shorter time period, such as a matter of hours, rather than the 21-28 days or longer that are typically required for many conventional testing methods.

Shortened test protocols provide commercial value. The rapid determination of a plant response to an agent that impacts the health of the plant provides a commercially useful advantage for testing facilities, such as greenhouses and laboratories. A long test protocol typically requires a greater time to complete a given number of tests, and since the testing facility typically houses the test plants throughout the duration of each test, a long protocol may require a greater capacity or space within the testing facility. Conversely, a short test protocol permits more tests to be conducted within a time frame and less space (capacity) for the same number of tests. Thus, the present invention may be used as an alternative to existing test protocols or in combination with existing test protocols to optimize or better manage test programs and the capacity of testing facilities. As an example regarding the capacity of a test facility, by reducing the duration of a test protocol throughout a facility to 10% of a previous test duration is equivalent to increasing the space (capacity) of the facility by a factor of 10 without a building program to expand the size of the physical facility. Similarly, a reduction of test duration to 33% of a previous duration corresponds to a tripling of space (capacity). Likewise, a reduction of test durations to 50% yields a doubling of effective facility capacity. Additionally, the effective increase in testing capacity permits more tests to be conducted in parallel. The cumulative effect of shortening test protocols is to reduce the time from conception to market introduction for a new plant line or variety. There is significant commercial value in the shorter testing protocols provided by illustrative embodiments of the present invention.

Figure 13:
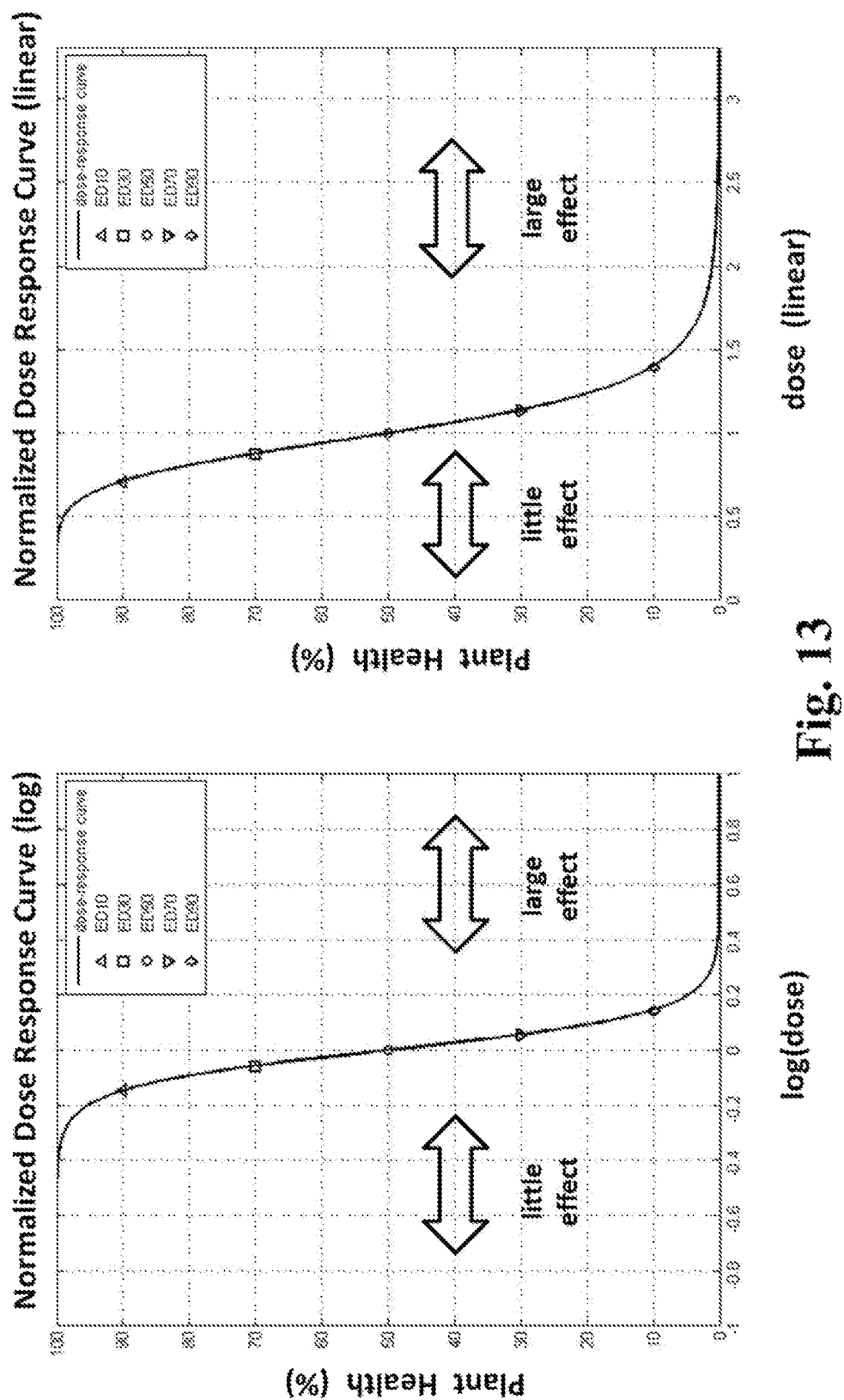
FIG. 13 shows normalized dose-response curves.

Generation of a Dose-Response Curve is useful in the practice of the present invention. The efficacy of herbicides is governed by many factors, such as plant species, plant development, light, temperature, humidity, soil moisture and precipitation. Commonly, these factors are represented by a dose-response curve which indicates plant health as a function of the herbicide dosage under various conditions. A typical dose-response curve is illustrated in FIG. 13 with both a logarithmic x-axis (left) and a linear x-axis (right). In both graphs, a low dosage yields little herbicide effect (nearly 100% plant health) while a high dosage yields a large herbicide effect (near 0% plant health).

An advantage of the present invention is that it provides a shorter test cycle for characterizing the plant response to a herbicide treatment regime than typical, state-of-the art approaches. Once the general form of the mathematical function used to fit the plant response curve (such as a decaying exponential) is determined for a given herbicide-plant type combination, the mathematical parameters may be computed in a shorter time than is typically required for the entire plant response to progress to completion. As an example, empirical data indicates that the mathematical parameters characterizing a plant response may be determined in a time period as short as 10-24 hours after an herbicide treatment. Conventional methods typically require 14-28 days to complete such a test. A shorter test cycle provides advantages in capacity for test facilities, shortens development cycles for plant breeders, and permits farmers to promptly respond to weed populations in their fields.

In one embodiment, the present invention provides a method for determining a dose-response curve for a test population of plants treated with one or more herbicides, comprising the steps of:
  a) dividing the test population of plants into multiple test groups, each group having similar plants;
  b) treating each test group with a different dosage of a herbicide(s);
  c) acquiring multiple samples of spectral data, each sample representing at least a portion of a test plant within a test group, at varying times within a window of time following each herbicide treatment;
  d) using the sampled spectral data to generate a family of plant response curves, each plant response curve corresponding to a different treatment dosage of the herbicide(s); and
  e) using the family of plant response curves and the corresponding different treatment dosages of herbicide(s) to determine a dose-response curve representative of the herbicide(s) effect on the test population of plants.

The shorter test cycle of the present invention also provides an advantage for determining a dose-response curve. When various herbicide dose tests are conducted in parallel, the entire dose-response curve may be computed immediately following the completion of the test, empirically determined to be 10-24 hours. The shorter test cycle also permits test facilities to alternatively conserve space by sequentially conducting tests for 3-4 different herbicide dosages and still complete the tests within several days.

In another embodiment, the present invention provides strategies to determine a dose-response curve in a shortened observation window (time) using parameter estimation techniques to determine one or more of the plant response curves used in the computation of the dose-response curve.

While the health of the plant, the corresponding spectral data, and the corresponding mathematical index values are all described as 'changing' or 'time-varying' in the descriptions herein, it is hereby recognized that no change or minimal change is also a possible result, simply indicating that the herbicide(s) had little to no effect on the test plant(s) during a given time window. This potential result is also included as part of the present invention.

While a treatment with a known herbicide dosage is described herein, it is recognized that the 'known herbicide dosage' may be zero, such as for a control protocol, and this potential condition is also included as part of the present invention.

Figure 14:
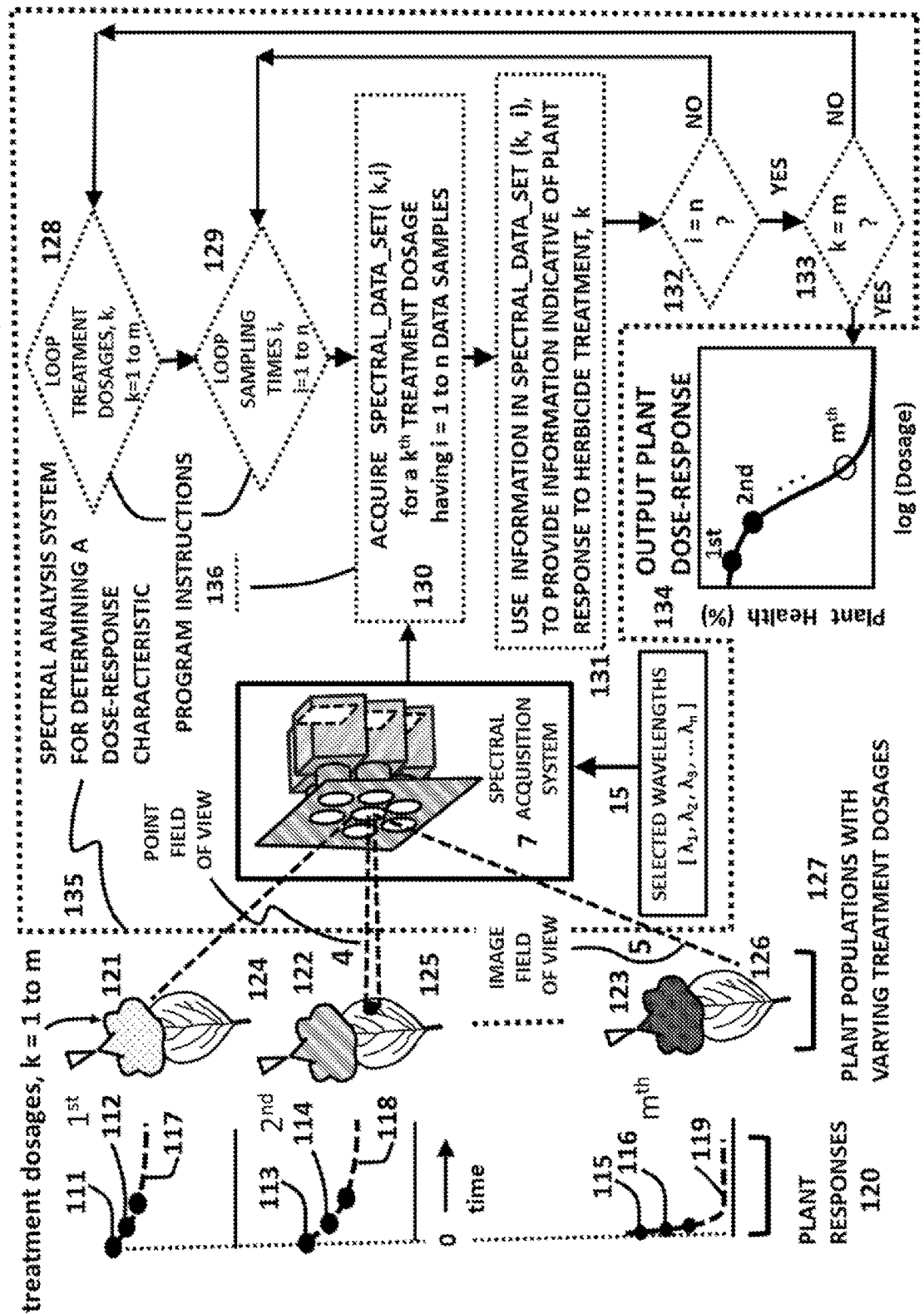
FIG. 14 shows a method of determining a dose-response characteristic for a plant population subjected to a herbicide treatment regime.

FIG. 14 illustrates a method of the present invention to determine a dose-response characteristic for a plant population subjected to a herbicide treatment regime 110. To compute a dose-response characteristic as described below, the method of FIG. 14 uses a spectral analysis system 135, which is a modification of similar embodiments of the present invention, such as 1 (FIG. 1) and 30 (FIG. 2). The preferred modifications are largely related to the program instructions 136 which compute the plant responses for each dosage, similar to 12 (FIG. 1) or 37 (FIG. 2), and also the output dose-response curve 134.

In the method of FIG. 14, the plant population is first divided into m groups, each representative of the plant population, where m is at least 2. Each plant group (124, 125, 126) is subjected to a different dosage of herbicide treatment (121, 122, 123) at time=0. A spectral data set is acquired in step 130 with, i=1 to n, for spectral data samples from each herbicide treatment dosage, k=1 to m. The sampled spectral data is acquired over time to observe the time-varying plant responses to the different dosages of herbicide treatment. A first spectral data sample is acquired in step 130 from each plant group (124, 125, 126) at a first sampling time, i=1, and converted into an index value (or index matrix for an imaging system), (111, 113, 115). A second spectral data sample is acquired from each plant group at a second sampling time, i=2, and converted into an index value (or index matrix), (112, 114, 116). Additional spectral data samples are acquired and converted into corresponding index values until n spectral data samples have been acquired via step 130 and converted to index values (i=1, 2, . . . n) via step 131. The array of index values (such as 111, 112, . . . ) for each plant group forms a plant response (117, 118, 119) for that plant group, respectively. Since each plant group, from the same population of plants, received a different dosage of herbicide treatment, the corresponding plant response of index values represents a plant response for each dosage of herbicide treatment, such as plant response 117 for dosage 121, plant response 118 for dosage 122, etc.

Parameter values associated with each plant response curve (117, 118, 119) for the different plant groups (124, 125, 126), such as are presented in FIGS. 1, 2, 11, and 12, may be used to characterize the plant response to a given herbicide dosage. These parameter values, associated with the plant response of each plant group, may be plotted as a function of the dosage (typically the logarithm of the dosage) to yield the dose-response curve as indicated in output block 134. One such parameter, illustrated in FIG. 10 for a decaying exponential plant response, is the parameter, $A_{recovery}$ 318. Plotting the $A_{recovery}$ values (or normalized values, $A_{recovery}/A_0$) for the plant responses as a function of the corresponding logarithm of the dosage for each plant group yields a dose-response curve, such as is illustrated in output block 134.

As a practical matter, an imaging system may be positioned such that all plant groups (124, 125, 126), treated with different herbicide treatment dosages (121, 122, 123) are within the same image field of view 5. In this configuration, the spectral data set acquired in step 130 may be acquired from all plant groups (124, 125, 126) simultaneously. (Image processing methods may be used to separate the spectral data within an image and assign it to the appropriate plant group.) When a point spectral acquisition system with a narrow field of view 4 is used (such as a spectrometer), the acquisition system may be physically moved to acquire the spectral data samples (point or spot) from each plant group in turn.

While protocols have been described herein for various sequences of acquiring spectral data from plant populations having different dosages of herbicide treatment, the present invention also includes variations of these procedural sequences using similar spectral analysis principles to generate dose-response curves from spectral data.

The relationship between the time-varying index values, derived via the method of FIG. 14, and the dosage of the herbicide treatment may be further described with reference to FIG. 15.

Figure 15:
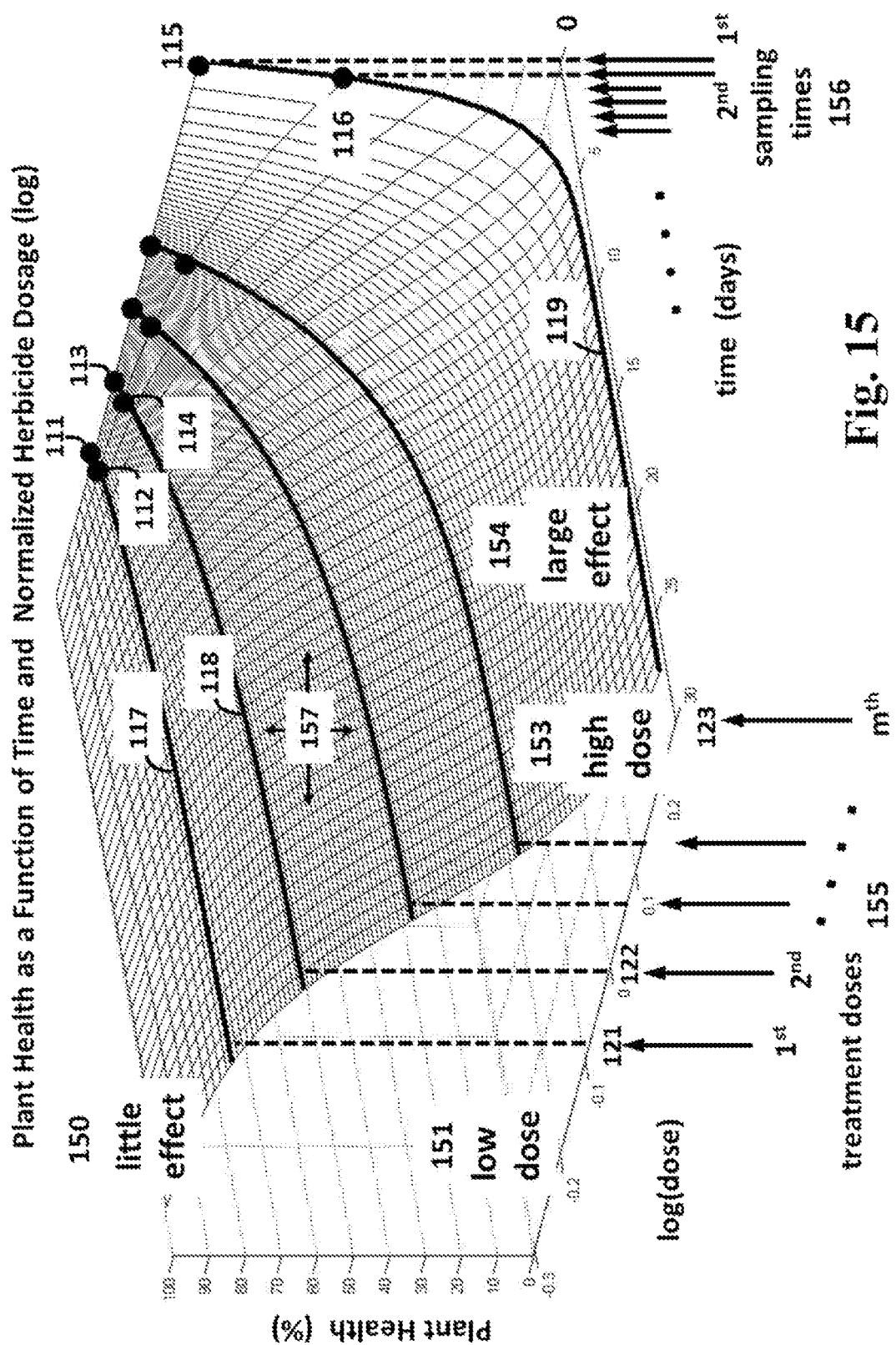
FIG. 15 shows a three-dimensional dose-response surface with plant health as a function of the dosage of a herbicide treatment and time.

FIG. 15 represents the time-varying plant response for different dosages of herbicide treatment as may be determined via the methods of FIG. 14. The axes of this graph are plant health (%), log(dosage) of the herbicide treatment, and time. Plant health is expressed as a percentage ranging from a healthy plant, 100%, to a dead plant, 0%. As time increases, the effect of a given dosage of herbicide treatment becomes apparent with a decrease in plant health. The steady-state, end value of plant heath for large time is a measure of the herbicide effect and may be used to generate a two-dimensional, dose-response curve.

With reference to FIG. 15, low dosages 151 have little effect 150 on plant health (~100%). High dosages 153 have a large effect on plant health 154 (— 0%). With reference to FIG. 14, the plant response for the first treatment dosage on the first group of plants is represented by 117 in both FIGS. 14 and 15. Similarly, the plant responses for the second and treatment dosages are shown by plant responses 118 and 119, respectively. The desired dose-response curve is evident on the edge of the response curve for time equal to 28 days. The circles (111, 112, 113, 114, 115, and 116) represent index values corresponding to the first two spectral data samples for respective dosage levels 155. Additional data samples (not shown on the response surface) may be acquired at times indicated by the sampling time arrows 156.

A key advantage of the present invention is that by knowing the general form of the time-varying plant response 16 (FIGS. 1, 2, and 3) from empirical reference data, parameter estimation techniques may be used to determine the full plant responses (117, 118, 119) from early samples (such as 111, 112, 113, 114, 115, 116) acquired at early sampling times 156. This reduces the time to determine dose-response curve from 28 days to 10-20 hours or perhaps a few days, depending on the desired precision. Additionally, by conducting tests at several dosages, the entire surface of FIG. 15 may be modeled, yielding not only the dose-response curve, but also the time-responses (i.e., decay time constant, T) at each of the treatment dosages.

In representative embodiments as illustrated in FIGS. 14 and 15, the present invention provides a method of determining a dose-response characteristic (FIG. 14, 134, FIG. 15, 157) for a plant population subjected to a herbicide treatment regime (121, 122, 123), comprising the steps of:

a) providing a first spectral data set (130, k=1) comprising at least first and second spectral data samples (130, i=1, 2, k=1) for a first plant population portion 124 of the plant population subjected to the herbicide treatment at a first dosage 121, wherein:
  (i) the first and second spectral data samples (111, 112) of the first treatment 121 are acquired from the first plant population portion 124 from at least first and second different corresponding spectral sampling events (111, 112), respectively, occurring at first and second different corresponding sampling times 130 (i=1, 2) during a time window in which the first herbicide treatment 121 is acting on the first plant population portion 124; and
  (ii) the spectral data samples, i, include spectral information 130 associated with two or more pre-selected wavelength regions of the electromagnetic spectrum 15 such that the spectral information 131 included in the spectral data samples 130 is indicative of the response of the first plant population 124 to the first herbicide treatment 121 over time;

b) providing a second spectral data set (130, k=2) comprising at least first and second spectral data samples (130, i=1, 2, k=2) for a second plant population portion 125 of the plant population subjected to the herbicide treatment at a second dosage 122, wherein:
  (i) the first and second spectral data samples (113, 114) of the second treatment 122 are acquired from the second plant population portion 125 from at least first and second different corresponding spectral sampling events (113, 114) respectively, occurring at first and second different corresponding sampling times 130 (i=1, 2, k=2) during a time window in which the second herbicide treatment 122 is acting on the second plant population portion 125; and
  (ii) the spectral data samples, i, include spectral information 130 associated with two or more pre-selected wavelength regions of the electromagnetic spectrum 15 such that the spectral information associated with two or more pre-selected wavelength regions 15 is indicative of the response of the second plant population portion 125 to the second herbicide treatment 122 over time; and c) using information comprising the spectral information in the first and second spectral data sets (k=1 to m, i=1 to n) to provide information indicative of the response of at least a portion of the plant population to the dosage of the herbicide treatment.

Figure 16:
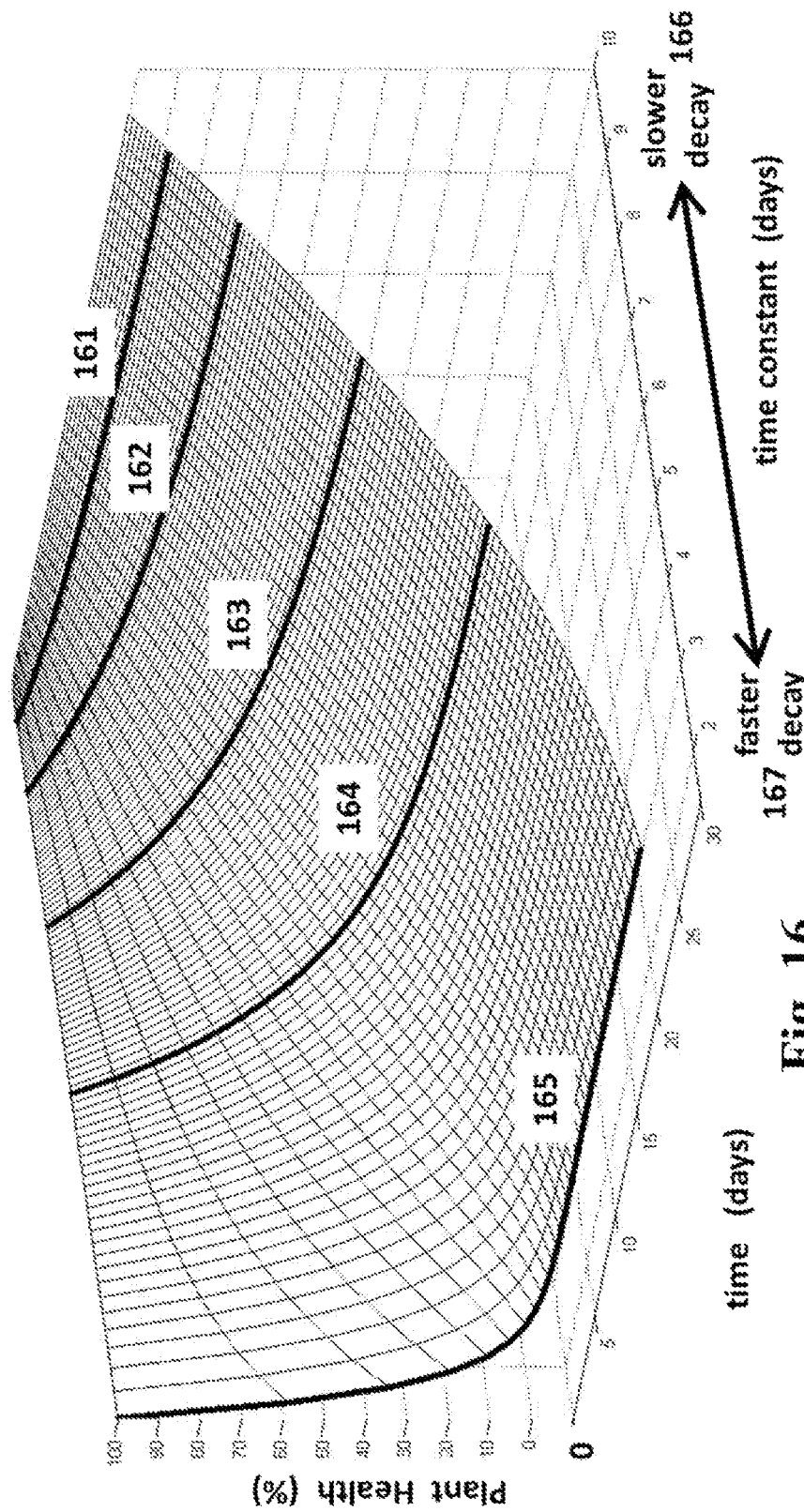
FIG. 16 shows plant health as a function of time and time constant.

FIG. 16 illustrates one exemplary insight that may be gained from the value of the decay time constant, τ, one of the parameters illustrated in FIG. 15. The decay time constant parameter, τ, provides a measure of the time required for the herbicide dosage to take effect.

As illustrated in FIG. 16, a long time constant 166 having a larger value of τ is characteristic of a slow-acting response (161, 162) to the herbicide treatment. Conversely, a short time constant 167 having a small value of τ is characteristic of a fast-acting response (164, 165) to the herbicide treatment. Thus the value of the time constant, τ, is indicative of the speed with which the herbicide treatment attacks the plant population. This type of information is valuable for testing new plant varieties, studying herbicide modes of action, determining weed resistance to herbicides, and even making judgements regarding the timing of herbicide applications before impending rain storms. Additionally, this parameter may be useful to plant physiologists, as a noninvasive and remote indicator of the time typically required for a given treatment dosage to take effect, the absorption rate, the dosage transport time within the plant, and/or other time related effects associated with a given treatment and plant population.

While the present invention has been demonstrated to detect a plant response curve that resembles a decaying exponential function with increasing time for a herbicide treatment regime, the present invention may also be used to detect plant responses for other treatment agents. The general form of a plant response curve due to a various treatment agent and plant population may best be established empirically. While various herbicide treatments would be expected to generate decaying plant responses, their shape and rate of decay is likely to differ with herbicide formula, plant population and environmental conditions. Treatment agents such as fungicides, fertilizers and growth agents would be expected to enhance plant health resulting in an increasing curve value following application. The principles of the present invention may be used to generate dos-response curves for treatment agents other than herbicides as well. With the vast number of plant populations, treatment agents and conditions to be tested, the convenience, automation, and precision of this invention makes it a powerful measurement tool.

Positioning and aiming the system of the present invention may be accomplished using principles for positioning and aiming described in U.S. Pat. No. 9,551,616. Applying those principles to the present invention, positioning and aiming may be accomplished in a variety of ways, including one or more of securing the invention within or on an aerial apparatus such as a commercial aircraft, private aircraft, glider, satellite, spacecraft, unmanned aerial vehicle, remote control aircraft, drone, blimp, lighter than air aircraft, manned balloon, weather balloon, projectile, rocket, personal air vehicle, paraglider, kite, or extraterrestrial aircraft; attaching the invention to a flying animal such as a bird or bat; placing the invention in the possession of a skydiver deployed over the crop; attachment to a pole, building, greenhouse, hill, mountain, tree, crane, bridge, overpass, or other permanent, semi-permanent, or temporary structure; attachment to a water tower, cell phone tower, or electrical tower; photographic tripod, mechanical fixture or similar apparatus; handheld or attached to a human; attached to a person via a mechanism, such as a head strap or chest strap; attached to or held by an animal; attached to or held by a robot; attached to a ground-based equipment such as a car, tractor, combine, harvester, plow, irrigation apparatus, spraying system or remote control vehicle; and positioning the invention in any manner that, at least temporarily, enables the target plant(s) to be within the field of view of the present invention.

In representative embodiments, the present invention is mounted in an elevated position to assess a response of a target plant following a treatment with one or more herbicides.

In representative embodiments, the present invention is mounted in an elevated position to assess the herbicide resistance of a target subject in a field, such as weeds in a crop field, the crop in the field, or simultaneously, both weeds and crops in a field. In another embodiment, the present invention is used to assess the herbicide resistance of a target subject, such as one or more plants, in a location, such as a greenhouse, laboratory or other testing facility.

The present invention samples spectral data following a treatment with one or more herbicides. The sampling time interval for acquiring these data has been described herein as periodic or regular. It is hereby recognized that the present invention encompasses any type of sampling interval that may be desired to acquire the spectral data, such as but not limited to, a regular interval, a periodic interval, an irregular interval, or a random interval.

In representative embodiments, the present invention provides automation methods and systems to automate the measurement of a plant response following a treatment with one or more herbicides. Having a computer, processor or controller as part of the system, the present invention provides program instructions to automate various operations in the data acquisition and analysis of the target plant response.

In representative embodiments, the present invention provides program instructions to automate at least one of the following operations of the present invention:
 a) the acquisition of spectral data;
 b) multiple acquisitions of spectral data following a plant treatment with a treatment agent;
 c) multiple acquisitions of spectral data at regular time intervals;
 d) multiple acquisitions of spectral data at irregular time intervals;
 e) a computation of an index value based on the acquired spectral data;
 f) a computation of an array of index values based on spectral data;
 g) a computation of mathematical parameters that fit an array of index values to characterize a plant response;
 h) a computation of plant resistance to the herbicide(s) based on the computed mathematical parameters;
 i) a computation of a dose-response curve derived from a family of plant response curves; and
 j) any computation described herein.

An advantage of the present invention is that automation of one or more of the above described operations provides a system that is convenient to use and may reduce the labor costs associated with the measurement of herbicide resistance, plant responses, or dose-response curves associated with treatment agents.

The principles of the present invention are useful for plant treatments other than herbicides. While the present invention has largely been described in terms of determining a plant response to a herbicide treatment, this invention may also be applied to indicate a plant response to many different types of plant treatments and plant treatment agents. The present invention is applied to treatments other than herbicide(s) by choosing appropriate wavelength regions of the electromagnetic spectrum, selecting an index algorithm that is sensitive to the plant response for the given type of plant treatment, and choosing a mathematical function representing a general form of the plant response appropriate for the selected plant population and treatment. The mathematical function and associated parameters, used to fit the plant response, are chosen according to the shape of the plant response for the given type of plant treatment. These additional plant treatments may include any type of treatment administered to a given plant or plant population that impacts the condition of a plant in a manner that can be detected using spectral sensors and/or spectral imaging. Such additional treatments may be manmade or of natural origin. Examples of such additional plant treatments include, but are not limited to, fungicide treatments, fertilizer treatments, water treatments (irrigation, rain or drought), light treatments (artificial or natural), humidity treatments (high or low), soil treatments (chemical or mechanical), pest infestations, diseases and temperature treatments (controlled or natural).

The flexibility of the present invention provides for the adaptation of wavelength regions, index algorithms and mathematical functions to fit the type of plant response resulting from any number of different types of plant treatments. Thus, the present invention becomes a powerful tool to quantitatively describe a plant response and corresponding dose-response curve for any number of different types of plant treatments.

Figure 17:
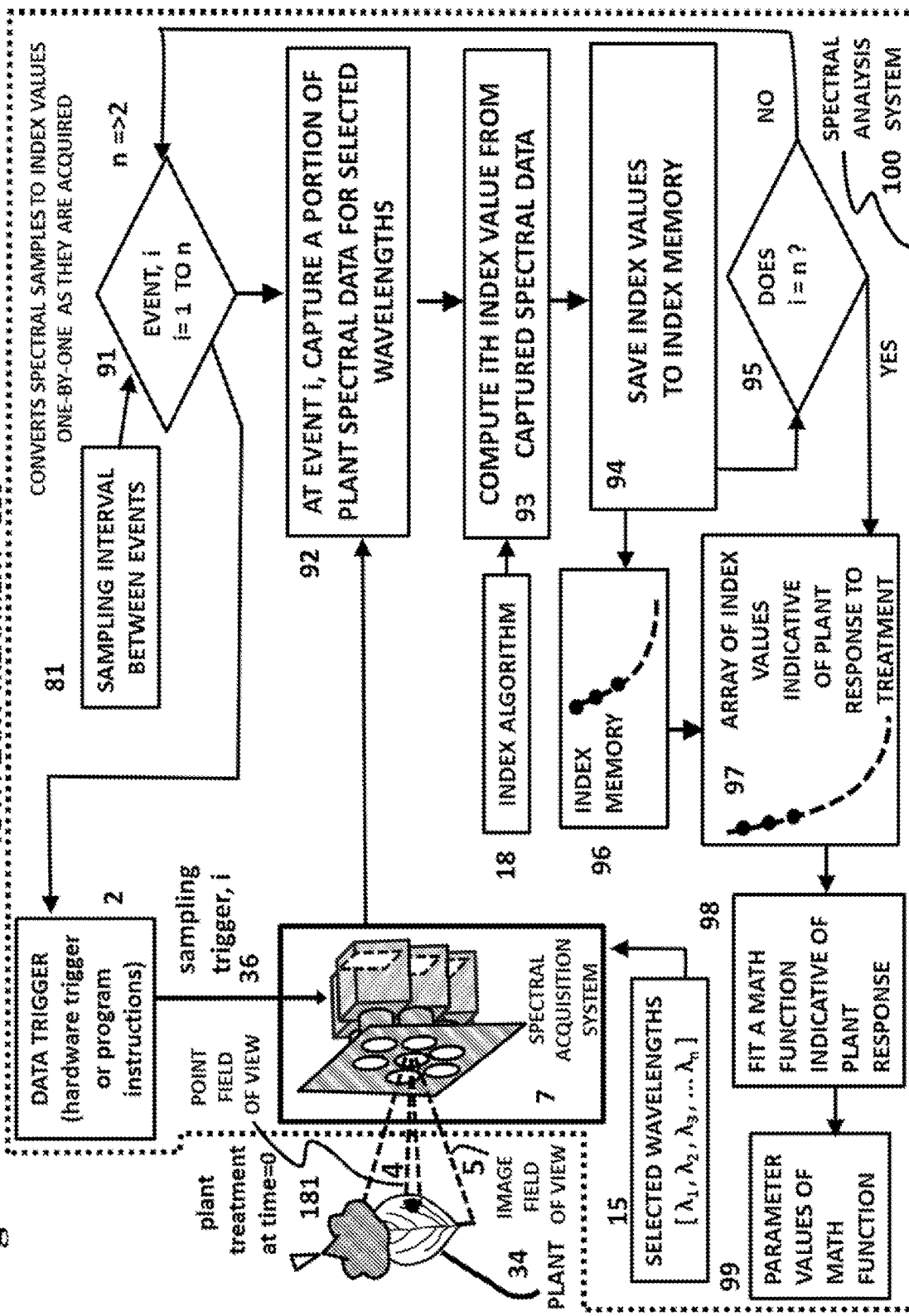
FIG. 17 illustrates a method to determine a time-varying response to a plant treatment.

FIG. 17 illustrates a method of the present invention for characterizing a response of at least one plant 34 subjected to a plant treatment agent 181 (180). The method of FIG. 17 is similar to the method illustrated in FIG. 12 for herbicide treatments. Additionally, methods and systems presented in FIGS. 1, 2, 3, 4, 11, 12, 14, and 15 may be readily adapted for plant treatment agents beyond herbicides, such as, but not limited to, fertilizers, fungicides, pesticides, irrigation, and growth agents. The particular embodiment of FIG. 17 calculates index values in step 93 one-by-one as the spectral data is acquired in step 92 rather than waiting until all data samples have been captured, as in FIG. 11, though functional blocks are similar to FIG. 11. If desired, the accumulation of the index values with each additional event 97, the fit of a math function in step 98, and the output of parameter values 99 via a fitting of the general form of the plant response to the data in step 98 may be included within the loop with steps 91-95. This modification permits an evaluation of the fit accuracy while the data is still being acquired. Once sufficient fit accuracy is achieved sampling may be discontinued.

The method of FIG. 17 may be modified to accumulate spectral data and then convert these data to index values as a complete set similar to that shown for the herbicide treatment of FIG. 11.

In representative embodiments as illustrated in FIG. 17, the present invention provides a method to determine a time varying response of at least one plant to a plant treatment 180, comprising the steps of:
 a) providing a treated plant 34 that has been treated with at least one plant treatment agent 181;
 b) at a first event in time (i=1), capturing a first portion of spectral data 92 from the treated plant 34;
 c) using the first spectral data portion (92, i=1) to compute a first index value (93, i=1) for the first event (91, i=1) that is indicative of a plant characteristic of the treated plant 34 at the time of the first event (91, i=1), wherein the first spectral data portion (92, i=1) is associated with at least one pre-selected wavelength band 15, and wherein the plant characteristic has a time varying response 97 to the plant treatment 181;

d) at a second event in time (91, i=2), capturing a second portion of spectral data (92, i=2) from the treated plant 34;

e) using the second spectral data portion (92, i=2) to compute a second index value (93, i=2) for the second event (91, i=2) that is indicative of the plant characteristic of the treated plant 34 at the time of the second event (91, i=2), wherein the second spectral data portion (92, i=2) is associated with at least one pre-selected wavelength band 15; and f) using information including the first and second index values 93 (i=1, 2) to provide information indicative of an impact of the plant treatment 97 on the at least one plant 34.

In another aspect, as illustrated in FIG. 17, the present invention relates to a method of characterizing the impact of a treatment 181 upon at least one plant 34, comprising the steps of:

(a) providing a spectral data set (accumulation of spectral data in memory from 92, not shown) comprising at least first and second spectral data samples (92, i=1, 2) for the at least one plant 34 subjected to the treatment 181 wherein:

(i) the first and second spectral data samples (92, i=1, 2) are acquired from the at least one plant 34 from at least first and second different spectral sampling events (91, i=1,2), respectively, occurring at least at first and second different sampling times (36, i=1,2) during a time window in which the treatment 181 is acting on the at least one plant 34; and (ii) the spectral data samples 92 include spectral information associated with two or more pre-selected wavelength regions of the electromagnetic spectrum 15 such that the spectral information 92 associated with the two or more pre-selected wavelength regions 15 is indicative of the response 97 of the at least one plant 34 to the treatment 181 over time; and (b) using information comprising the spectral information 92 associated with the two or more pre-selected wavelength regions of the electromagnetic spectrum 15 from at least the first and second spectral data samples (92, i=1,2) to provide information indicative of the response 97 of the at least one plant 34 to the treatment 181 as a function of time.

A presently preferred embodiment of the present invention uses a spectral imaging system comprising a spectral filter array and an image capture array, as described in U.S. Pat. No. 9,551,616, fully incorporated herein by reference in its entirety for all purposes, to acquire spectral data and then, using systems and methods of the present invention, characterize time-varying spectral changes associated with a plant response following application of a herbicide treatment. Example 1 illustrates the creation of a Growth Index, the result of an index algorithm indicating plant health based on the detection of the levels of new growth in a plant. Example 2 applies this Growth Index to determine a plant response to a herbicide treatment and also presents methods to generate a dose-response curve.

Example 1— Generating a Growth Index from an Index Algorithm

In Example 1, the present invention acquires spectral information, via a spectral imaging system that is sensitive to selected wavelength regions. Each wavelength region has a bandwidth chosen to provide selective spectral information indicative of advantageous plant physiology. This spectral information is used within an index algorithm to provide a sensitive indication of plant growth. The output of this index algorithm may in turn be used to provide image information indicative of the presence and/or level of plant growth within the field of view of the spectral imaging system.

As shown in FIG. 7*c* (270, 271), the efficiency of photosynthesis varies with the wavelength of the light illuminating a healthy, growing plant. Higher photosynthesis efficiencies (FIG. 7, 270) occur largely due to a greater absorbance of light by plant pigments associated with photosynthesis (FIG. 7*b*, 260, 261, 270) in healthy, growing plants. Thus, a higher efficiency of photosynthesis is associated with a greater absorbance by plant pigments and also a lower level of reflectance. Therefore, the family of reflectance spectra in FIG. 7 *a*) indicating changes in reflectance that occurs with changes in plant health and growth as plant condition progresses from a live, healthy and growing plant 252 to a dead and dry plant 251, are also indicative of corresponding changes in pigment absorbance and photosynthesis efficiency as described above. Within the photosynthesis region of the electromagnetic spectrum, growing plants also exhibit absorbance peaks, such as for chlorophyll-a 260, chlorophyll-b 261, and carotenoid (FIG. 6, 262) pigments, which results in locally lower reflectance regions, such as near $\lambda_2$ (FIGS. 6 and 7, 264), and locally higher reflectance regions away from the absorbance peaks, such as near $\lambda_1$ (FIGS. 6 and 7, 263). The intensity of these absorbance peaks changes with deteriorating plant health (FIG. 7*a*).

In greater detail, the present invention may acquire spectral data sets from wavelength regions which indicate an average level of reflectance across the photosynthesis region and/or spectral data sets which permit a difference measurement of reflectance indicative of variations in pigment absorbance peaks, such as peaks 264 associated with chlorophyll-a 260, chlorophyll-b 261, or carotenoids 262, and regions not aligned with pigment absorbance peaks 263. The wavelength region near a pigment absorbance peak advantageously has a spectral imaging bandwidth matching the width of the chosen pigment absorbance peak, such as a wavelength region bandwidth of 10 to 25 nm to detect changes in the absorbance band, such as for chlorophyll-a (FIG. 6, 264). The wavelength region selected to be away from pigment absorbance peaks (such as FIG. 6, 263), may be of similar spectral imaging bandwidth or a somewhat wider bandwidth, as long as the bandwidth does not encroach upon an adjacent pigment absorbance peak. These spectral data sets, acquired at one or more sampling times via spectral imaging trigger circuitry, may be used to generate growth data for a single sampling event or for a sequence of sampling events. The acquired spectral data, as described, may be used in an index algorithm to yield an output sensitive to changes in plant growth. The output in plant growth may be displayed as an image showing the presence or level of plant growth within the scene.

In another aspect, the present invention relates to a method of determining a growth characteristic of at least a portion of at least one plant within a scene (such as FIG. 18, 403), comprising the steps of:

(a) acquiring a spectral data set from each of two or more wavelength regions of the electromagnetic spectrum (such as FIG. 7, 263, 264) within the photosynthesis region 254 wherein:

(i) at least one wavelength region (FIG. 6, 264) is aligned with an absorbance peak associated with at least one photosynthesis-related, plant pigment selected from at least one of chlorophyll-a 260, chlorophyll-b 261 and carotenoid pigments 262; and (ii) at least a second wavelength region 263 is not aligned with an absorbance peak associated with at least one photosynthesis-related, plant pigment selected from at least one of chlorophyll-a 260, chlorophyll-b 261 and carotenoid pigments 262;

(b) using the spectral data sets from the two or more wavelength regions to compute the growth characteristic using at least one of:

(i) an average level within the photosynthesis region (FIG. 7, average for spectra 252 through 251 within region 254), derived from one or more of the spectral data sets (263, 264); and (ii) a difference between two spectral data sets, wherein one set is aligned with a pigment absorbance peak 264 and another set is not aligned with a pigment absorbance peak 263; and (c) using the computed growth characteristic to provide information indicative of a plant growth characteristic (FIG. 18, 403, FIG. 20, 420, 421, 422, 423) within the scene.

In mathematical terms, a general form of an algorithm which provides a sensitive indication of plant growth, associated with plant health and photosynthesis, using reflectance spectral data is as follows:

$$\text{Growth Index} = k_1(A)(D) + k_2 \quad \text{(Eqn. 5)}$$

where A is an increasing value associated with a decreasing average reflectance within the photosynthesis region; D is an increasing value associated with a signed difference between a reflectance associated with a wavelength region away from a pigment absorbance peak and a reflectance associated with a wavelength region aligned with a pigment absorbance peak; $k_1$ is a scalar factor to adjust the range of the Growth Index values; and $k_2$ is an offset term to adjust the offset of the Growth Index values. In the formulation of Equation 5, coefficients and offset terms associated with terms A and D may be accounted for within $k_1$ and $k_2$. While the above index algorithm is described in terms of reflectance spectral data, absorbance measurements may also be used, such as by converting absorbance to reflectance units and applying the strategies described herein. In both reflectance and absorbance forms of the index algorithm, scaling and offset may be applied to achieve index values within in a desired index range, such as 0 to 1.0 or −1.0 to 1.0. A linearity factor may also be introduced in order for the index algorithm to be either linear or nonlinear as desired.

In Example 1, an index algorithm using two wavelength regions of the electromagnetic spectrum, $\lambda_1$ and $\lambda_2$, was devised which is mathematically sensitive to changes in growth, chlorophyll absorbance and photosynthesis efficiency. The general form of the Growth Index of Equation 5 was used as shown in Equation 6 and found to yield an excellent indication of new growth when applied to vegetation such as the globe arborvitae of FIG. 18, $$\text{Growth Index} = k_1(A)(D) + k_2 = \frac{[\lambda_1] - [\lambda_2]}{[\lambda_1] + [\lambda_2]} \quad \text{(Eqn. 6)}$$

where terms are defined as:

$$A \sim \frac{1}{\text{average reflectance}} = \frac{1}{\frac{[\lambda_1] + [\lambda_2]}{2}} = \frac{2}{[\lambda_1] + [\lambda_2]}$$

-continued letting $A = \frac{1}{[\lambda_1] + [\lambda_2]}$ $D$ = difference in non-peak & peak reflectance = $[\lambda_1] - [\lambda_2]$ and $k_1 = 1$, $k_2 = 0$;

and where the Growth Index is an image of index values related by Equations 5 and 6, and $[\lambda_1]$ and $[\lambda_2]$, are spectral images, captured by a spectral image acquisition system, centered around wavelengths, $\lambda_1$ and $\lambda_2$, respectively, where $\lambda_2$ is aligned with absorbance peaks for chlorophyll-a and chlorophyll-b, and $\lambda_1$ is within the photosynthesis region, but is not aligned with pigment absorbance peaks. Equations 5 and 6 may also be similarly applied to point source data, such as may be acquired by a spectrometer, in order to determine a Growth Index value for a point on a target plant.

In Example 1, spectral images were acquired at regions of the electromagnetic spectrum around wavelengths, 500, 550, 675 and 800 nm, each having a bandwidth of 10 nm. The family of curves of FIG. 5 was used in conjunction with empirical analyses to determine which of the acquired spectral images would be used to formulate an index algorithm indicative of plant growth. Wavelength regions centered about 550 and 675 nm were chosen to yield a sensitive Growth Index, and are represented by variables $\lambda_1$ and $\lambda_2$ respectively.

Experimental Results

Figure 18:
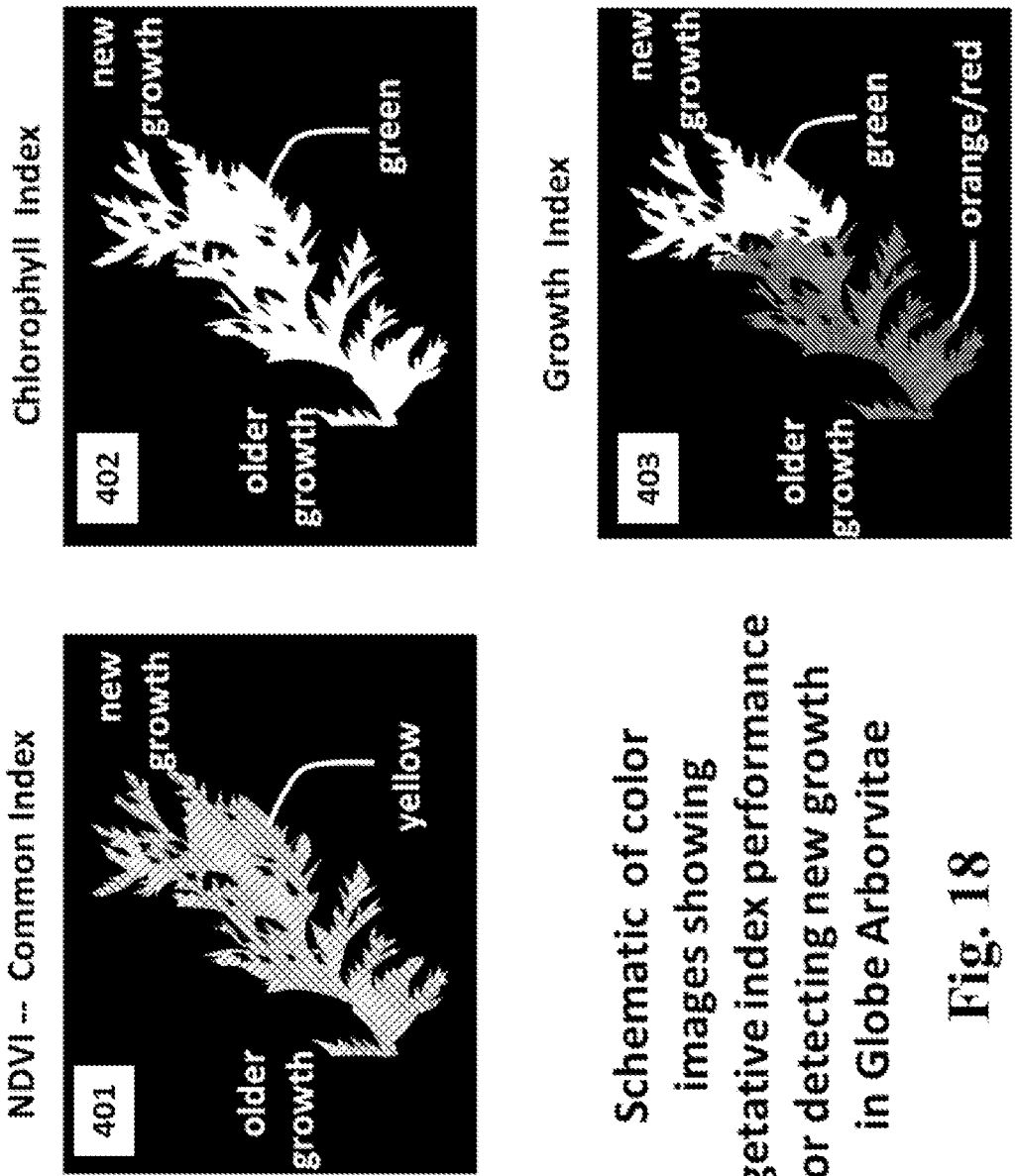
FIG. 18 shows schematics of color images showing vegetative index performance for detecting new growth in Globe Arborvitae.

The Growth Index, as described in Equations 5 and 6, was tested on a branch of Globe Arborvitae. FIG. 18 shows schematics of high-resolution, color images obtained using the Growth Index in comparison to the performance of various vegetative indices. In FIG. 18, NDVI 401, a common vegetative index, shows a nearly uniform level throughout the branch. The Chlorophyll Index 402, a proprietary index sensitive to the presence of chlorophyll, also shows a uniform level throughout the branch. However, the Growth Index image 403, of the present invention, indicates a significantly elevated level near the tip of the branch. Scale 404 is indicative of the resulting color on the corresponding output images (401, 402, 403).

Discussion

Since new growth in evergreens typically occurs near the tips of a branch, an index sensitive to growth would be expected to exhibit higher values at the branch tip[1]. The NDVI index 401 shows near uniform levels throughout the branch, thus providing little indication of growth. The Chlorophyll Index 402, indicates chlorophyll is uniformly distributed throughout the branch, as expected from plant physiology. However, the Growth Index image 403, shows a distinct, elevated value near the tip of the branch, providing a sensitive indicator of new growth.

[1] Department of Forestry, State of Virginia, Forest Facts, How A Tree Grows, http://www.dofvirginia.gov/infopubs/_forest-facts/FF-How-A-Tree-Grows-pub.pdf.

Example 2—Detection of a Plant Response Due to a Glyphosate Treatment

The principles of the present invention are further illustrated by the following example involving the detection of a plant response for an African violet plant following a herbicide treatment with glyphosate. The spectral data acquisition was accomplished via a spectral imaging system comprised of a spectral filter array and an image capture array, as described in U.S. Pat. No. 9,551,616.

Methods

Figure 19:
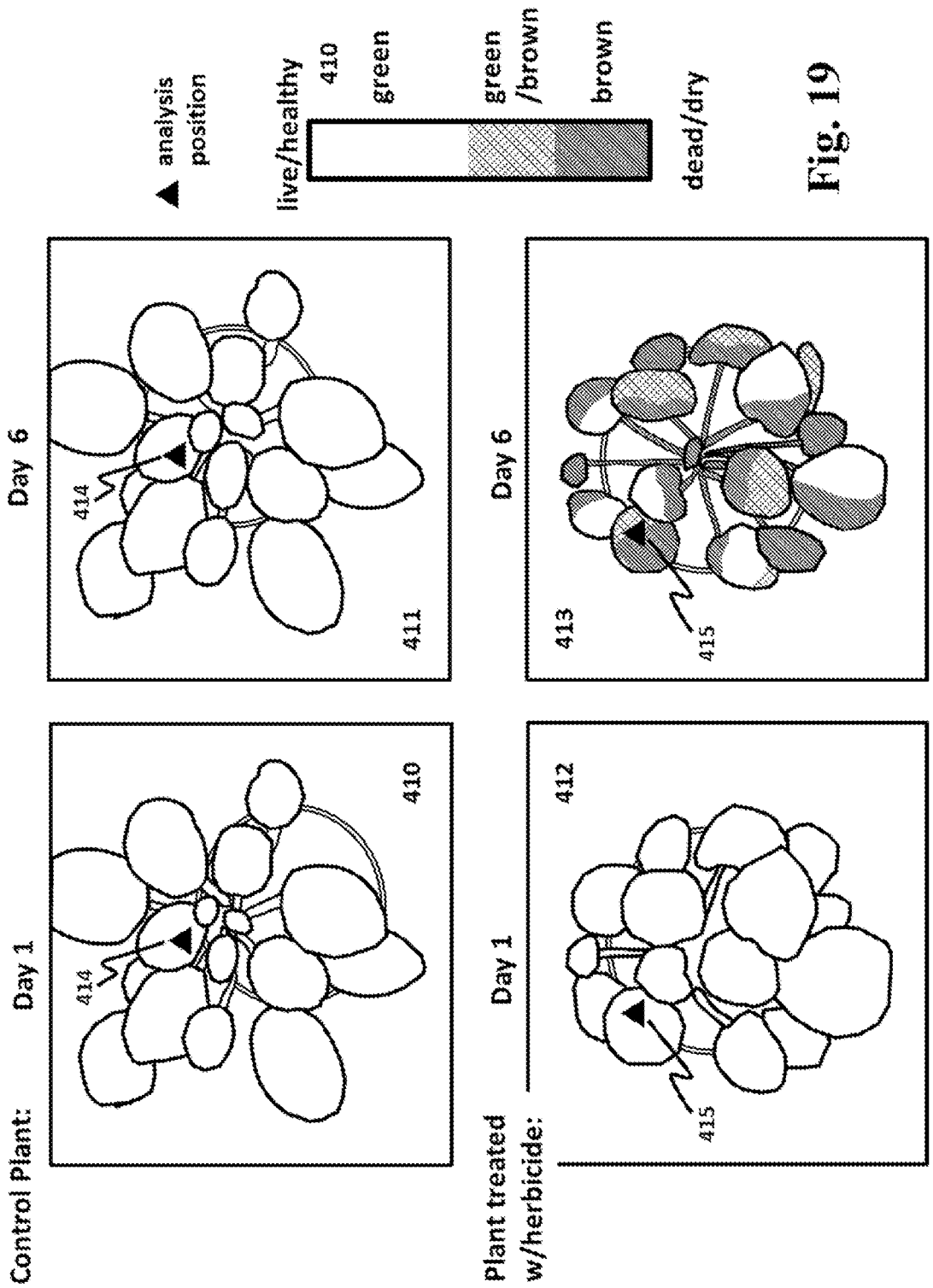
FIG. 19 shows schematics of changes in color, visible-spectrum images of African violet test plants during the test period.

African violet plants were purchased from a local garden store, having been grown under natural sunlight. FIG. 19 shows a schematic representation of color, visible-spectrum images of the African violet test plants. Images 410 and 412 show a control plant 410 and a plant treated with the herbicide 412, glyphosate, on Day 1 of the test. Images 411 and 413 show a representation of the control plant 411 and the glyphosate treated plant 413 on Day 6 of the test. The scale 410 is an indication of the color shading in the schematic representation of the color images. The analysis position is indicated by the triangles, 414 and 415, for the control plant and the herbicide treated plant, respectively.

During the study period all plants were placed under artificial fluorescent lights having a 50% duty cycle during a 24 hour period. Over a five day period the control plant 410 (FIG. 19) was watered alternate days. The test plant 412 was transplanted into dry sand on Day 1 (corresponding to time, t=0) and received no water during the test period. Additionally on Day 1, the test plant 412 was treated with ROUNDUP brand herbicide, a herbicide produced by Monsanto Company which has glyphosate as the active ingredient, at a concentration of 0.96%, sufficient to wet the top of all leaf surfaces (foaming technology). Spectral image data was acquired at approximately the same time each day using a spectral imaging system having a spectral filter array and an image capture array.

Results

Figure 21:
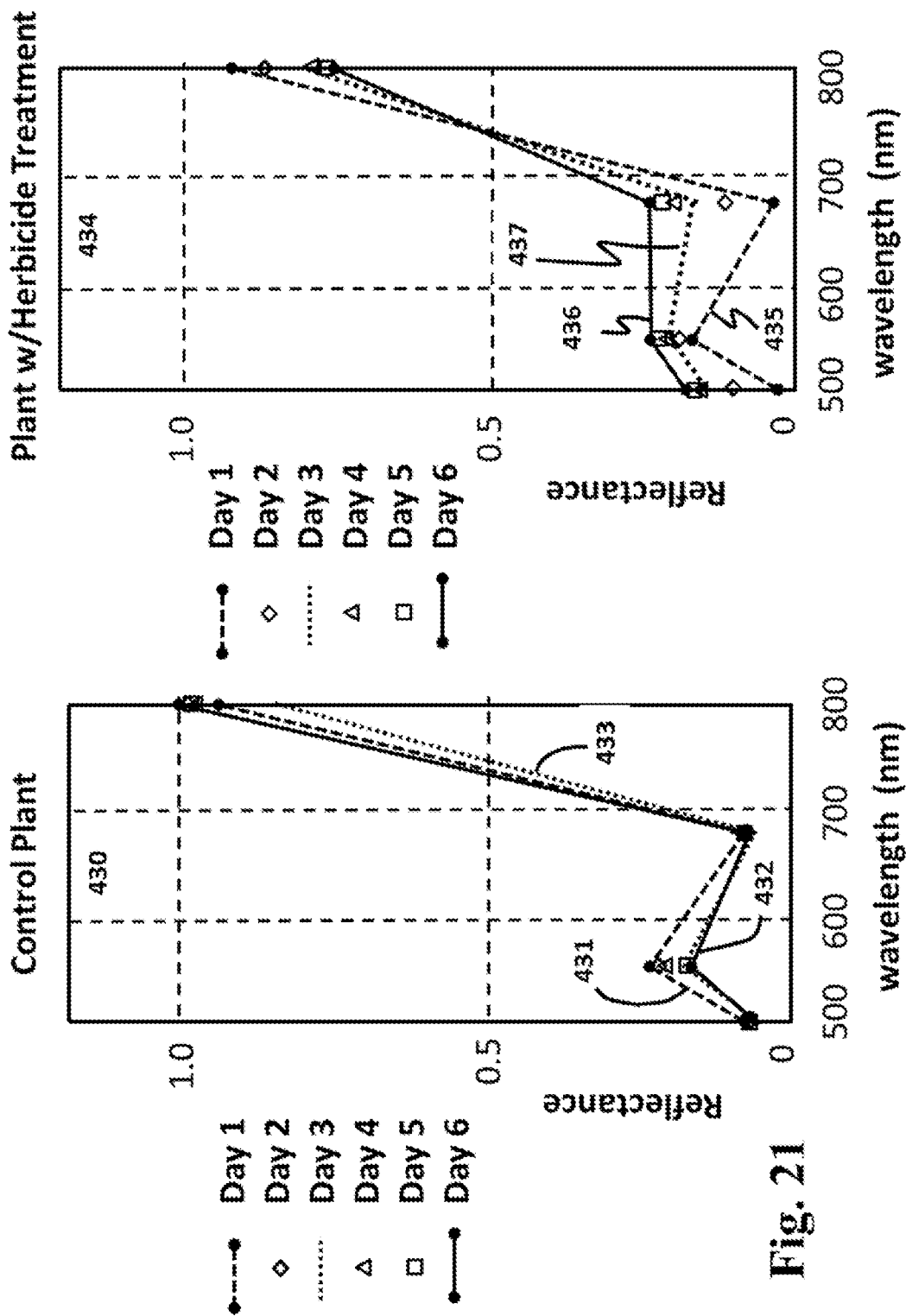
FIG. 21 shows spectral changes over the test period for the control plant and the plant treated with the herbicide.
Figure 22:
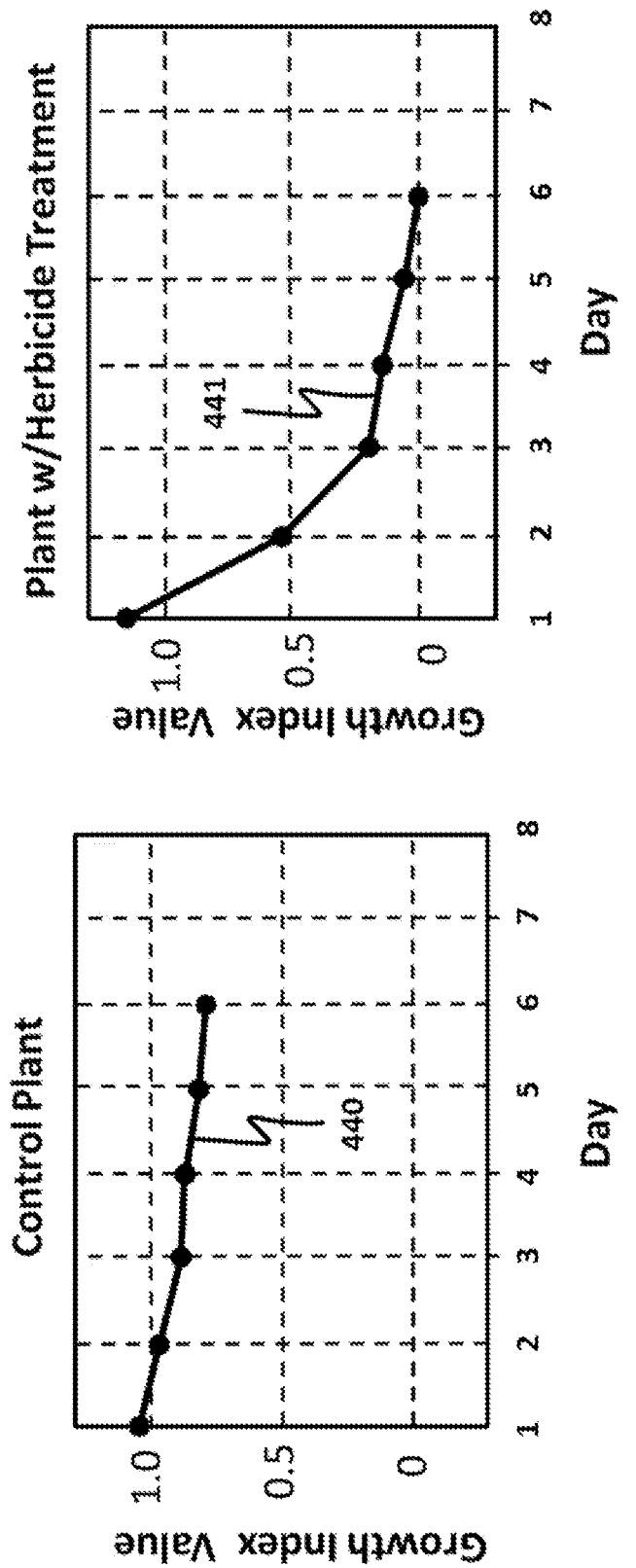
FIG. 22 shows Growth Index changes over the test period for the control plant and the plant treated with the herbicide.

The Growth Index of Equation 6 was applied to spectral images of the African violet plants with results as shown in FIGS. 20, 21 and 22.

FIG. 20 shows schematics of the resulting high-resolution, color images as may be obtained in the output block 20 and the index array images 21 (FIGS. 1, 2, 3), 87 (FIG. 11), 97 (FIG. 12) and 131 (FIG. 14) using spectral imaging acquisition and analysis systems and methods. The plant conditions are indicated by Growth Index images 420, 421, 422 and 423. The color scale 424 is indicative of the plant health, from dead/dry to live/healthy, based on the corresponding Growth Index values. Image 420 shows the Growth Index image of the control plant on Day 1. Image 421 shows the Growth Index image of the control plant on Day 6. Image 422 shows the Growth Index image of the plant treated with glyphosate on Day 1. Image 423 shows the Growth Index image of the plant treated with glyphosate on Day 6.

FIG. 21 shows the changes in spectral data over the test period from Day 1 to Day 6 for the control plant 430 and the plant treated with glyphosate 434. These spectral data are representative of data from a spectral imaging acquisition system 11 (FIGS. 1, 2, 3, 4, 11) using an average of a small group of pixels from a single analysis position 414, 415 (FIGS. 19, 20) for control and treated plants, respectively. For graphical clarity, symbols and lines are shown for days 1, 3, and 6, while only symbols at the corresponding wavelengths are shown for days 2, 4 and 5. The spectral curves from Day 1 (431) to Day 6 (432) show minimal variation, while for the plant treated with glyphosate, the spectral curves from Day 1 (435) to Day 6 (436) vary significantly as the plant proceeds from live/healthy to dead/dry. The curve for the herbicide treated plant on Day 1 (435), prior to treatment, closely resembles the shape of the spectral curve for the healthy control plant (431, 432, 433).

FIG. 22 shows the Growth Index values at the analysis positions (FIGS. 20-414, 415) for the control plant 440 and the plant treated with glyphosate 441. The plant response for the control plant 440, indicated by the Growth Index values, is characterized by a slow, nearly linear decrease over the test period. However, the plant response for the plant treated with glyphosate 441 is characterized by a sharp exponential decay dropping to zero by Day 6.

Discussion

In a comparison of the Growth Index results for the control plant 440 and the plant treated with glyphosate 441 (FIG. 22), it is evident that the Growth Index shows a marked decrease for the glyphosate-treated plant 441 in comparison to the control plant 440 over the test period. Similar degradation is evident in the Growth Index images of FIG. 20. In these images, the control plant exhibits minimal change from Day 1 to Day 6, 420 and 421, respectively. However, the plant treated with glyphosate shows significant degradation in Growth Index, indicative of plant health, from Day 1 (422) to Day 6 (423), progressing from 'live/healthy' to 'dead/dry' (424). A comparison of changes in the unprocessed spectral data of FIG. 21 is also insightful. In the control plant spectral data 430 (FIG. 21) there is minimal change in the spectra over the test period. However, in the spectral data for the plant treated with glyphosate 434 (FIG. 21) the spectra shows considerable differences over the test period. In the graphs of Growth Index in FIG. 22, the control plant curve 440 shows only a slight droop over the test period. This minor degradation is likely due to the change from natural sunlight prior to testing (approximately 15 hours of daylight/24 hours, 62.5%, in June 2016) to artificial fluorescent lighting (50% duty cycle) during the test period. However, the curve of the plant treated with glyphosate 441 shows a marked exponential decay ending in a Growth Index value near 0 on Day 6.

The Growth Index of the present invention quantifies the spectral differences, providing a sensitive indicator of changes in plant health following a treatment with the herbicide, glyphosate.

Diagnostic Capability Based on Curve Parameters

Figure 23:
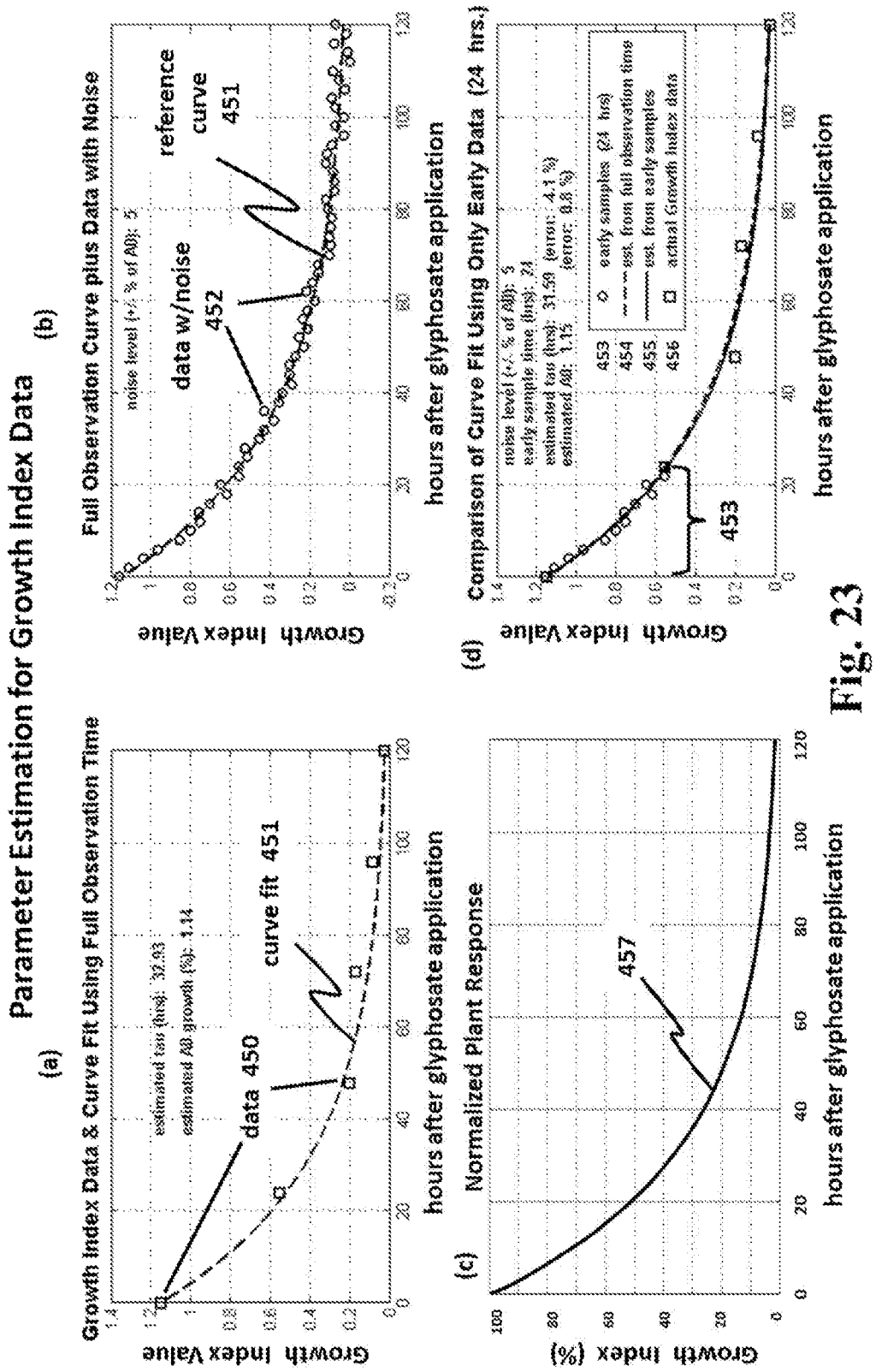
FIG. 23 shows examples of parameter estimation for Growth Index data resulting from a herbicide treatment.

Parameter estimation techniques may be used to characterize the plant response provided by the array of index values, indicative of a plant response to a herbicide treatment, derived from spectral data. FIG. 23 shows these parameter estimation techniques fitted to the Growth Index data illustrated in FIG. 22 (441). The application of these techniques to the index array data derived from spectral data is shown previously for the present invention as outputs 20 (FIGS. 1, 2, 3), 88 (FIG. 11), 98 (FIGS. 12, 17), and 131 (FIG. 14).

FIG. 23 illustrates: (a) the fitting of an exponential curve 451 to measured Growth Index data 450 from 441 (FIG. 22) for the full observation window of 120 hours (5 days); (b) simulated data 452 with additive noise, to simulate potential measurement error, for the full observation window of 120 hours generated around the reference curve 451; (c) the normalized plant response 457, obtained by normalizing the fit curve 451 in (a) as described in Equation 2; and (d) a comparison of fitted curves and parameter value estimates derived from a full observation window of 120 hours for actual data (450, 456) and a shortened observation window 453 of 24 hours for the noise data of (b).

The parameter estimation for the African violet data (450, 451) shown in FIG. 23 (a) indicates a time constant, $\tau$, of 32.9 hours and a recovery probability, $A_{recovery}$, near zero. The time constant, $\tau$, may be a measure of the time required for the herbicide to have a physiological effect on the plant. The offset, $A_{recovery}$, may be an indicator of the recovery probability.

In greater detail, FIG. 23 (a) shows an exponential decay curve 451 (dashed line) fitted to the measured data 450 observed for 120 hours (5 days). The decay curve 451 is the best fit exponential decay function using the full observation window of 120 hours. The resulting derived parameter values from the measured data are $\tau=32.93$ hours and $A_0=1.14$.

FIG. 23 (b) shows the reference exponential decay curve 451(dashed), derived in (a) with additive noise data 452 (circles) generated around the reference curve 451. The circles are data generated with an $A_0$ random noise amplitude of +/−5%, to simulate data measurement error.

FIG. 23 (c) shows the normalized plant response 457, which is the decaying exponential function 451 fit to the data 450 of (a) normalized to the initial value at time=0. It is noteworthy to observe that in the normalized plant response 457, there is a 30% drop in Growth Index percentage after 12 hours and a 50% drop after 20 hours. These significant changes in 12 hours and 20 hours, respectively, indicate that an accurate determination of curve parameters is possible using data acquired 12-20 hours after the application of the glyphosate herbicide.

FIG. 23 (d) shows a comparison of curve fits and parameter estimates. The circles 453 are the first 24 hours of the noise data generated in (b). The dashed line 454 is the reference line 451 derived from actual data (450, 456) over the full observation window of 120 hours. The solid line 455 is the best-fit estimate using the early additive noise samples 453 during the first 24 hours. Table 1 shows parameter estimates and error from the reference parameter values.

The parameter estimation for the African violet data (450, 451) shown in FIG. 23 (a) indicates an initial amplitude, $A_0$, of 1.14, a time constant, $\tau$, of 32.9 hours and a recovery probability, $A_{recovery}$, near zero. This indicates an effective measure of attack time and recovery probability for the glyphosate concentration, 0.96%, as applied to the African violet plant treated with glyphosate 412 (FIG. 19).

Using the 'early samples' 453, the resulting parameter estimates from the first 24 hours of noise-added data are $\tau=31.59$ hours and $A_0=1.15$. When compared to the parameters derived from the entire 120 hours of measured data, this corresponds to errors for $\tau$ and $A_0$ of −4.1% and 0.8%, respectively. In this case, accurate parameter values have been obtained using only the first 24 hours of data, rather than the entire 120 hours of data. This shortens a 120-hour protocol by 96 hours. Thus, the approach of the present invention provides a significant saving in protocol time and the associated test facility capacity typically required to house the test plants for the duration of the test. A comparison of the accuracy of these data is shown in Table 1.

In one embodiment of the present invention, following treatment with one or more herbicides, the entire plant response, which typically takes many days (for example, 14-28 days), may be determined in a shortened time period, such as 10-24 hours, 24-48 hours, or 2-5 days.

In another embodiment, the present invention provides an indication of herbicide resistance via a shortened observation window, significantly shorter than the time normally required for the full plant response to develop. The duration of the shortened observation window may be adjusted to achieve the desired precision, based on the measurement accuracy, noise level, and shape of the plant response curve.

In another embodiment of the present invention, spectral data is acquired at intervals following application of a herbicide treatment to a plant, a Growth Index, indicative of plant growth and plant health, is computed from the spectral data, for one or more spatial positions on a plant, crop or field. The time-varying array of Growth Index values indicates a plant response curve which may be modeled by a mathematical function such as a decaying exponential function. Parameter estimation techniques are used to compute parameters that characterize the mathematical function, such as a time constant, $\tau$, and an initial value, $A_0$. Optionally, data from a shortened observation window may be used to derive the parameters resulting in a significant savings in test time, such as reducing the testing time from 120 hours to 24 hours.

In an embodiment of the present invention, a subset of the shortened observation window may be used to compute less precise parameter values that are still sufficient to indicate whether the herbicide has an effect on the plant under test. The advantage becomes an even shorter qualitative test.

In one embodiment of the present invention, spectral data is acquired, an index algorithm is used to transform the spectral data into an index array representing a plant response, and the time-varying index array is characterized by parameters of a mathematical function indicative of the plant response to the herbicide treatment.

Generation of a Herbicide Dose-Response Curve from Plant Response Curves

The effects of herbicide treatments on plants vary with plant species and environmental conditions. Dose-response curves may be used to quantify the efficacy of a herbicide treatment under various circumstances and with various plant species. Using biomass measurements, Minkey and Moore determined dose-response curves for the herbicide glyphosate showing variations due to conditions and species. D. M. Minkey and J. H. Moore, Estimating Dose Response Curves for Predicting

TABLE 1

Comparison of parameter values

| Data | Observation Window Duration (hours) | Amplitude Constant, $A_0$ | Time Constant, $\tau$ (hours) | $A_0$ error from reference (%) | $\tau$ error from reference (%) |
|---|---|---|---|---|---|
| 1 Growth Index from spectral data | 120 (5 days) | 1.14 | 32.93 | Reference | Reference |
| 2 Growth Index curve data with additive noise shortened observation window | 24 | 1.15 | 31.59 | 0.8 % | −4.1% |

Glyphosate Use Rates in Australia, Eleventh Australian Weeds Conference Proceedings, 1995. Conditions included water status and relative humidity. Species included wheat, canola, capeweed, and annual ryegrass. Minkey and Moore measurements were made via biomass methods conducted 5-6 weeks following each herbicide treatment. The present invention can be used to obtain similar dose-response curves under varying conditions and with various species, as an alternative to biomass measurement methods or can be used in combination with biomass methods or other techniques to make those techniques even more effective. The present invention provides a noninvasive, non-destructive and remote imaging solution to acquire the spectral data and may provide dose-response curves in less than 24 hours.

Figure 24:
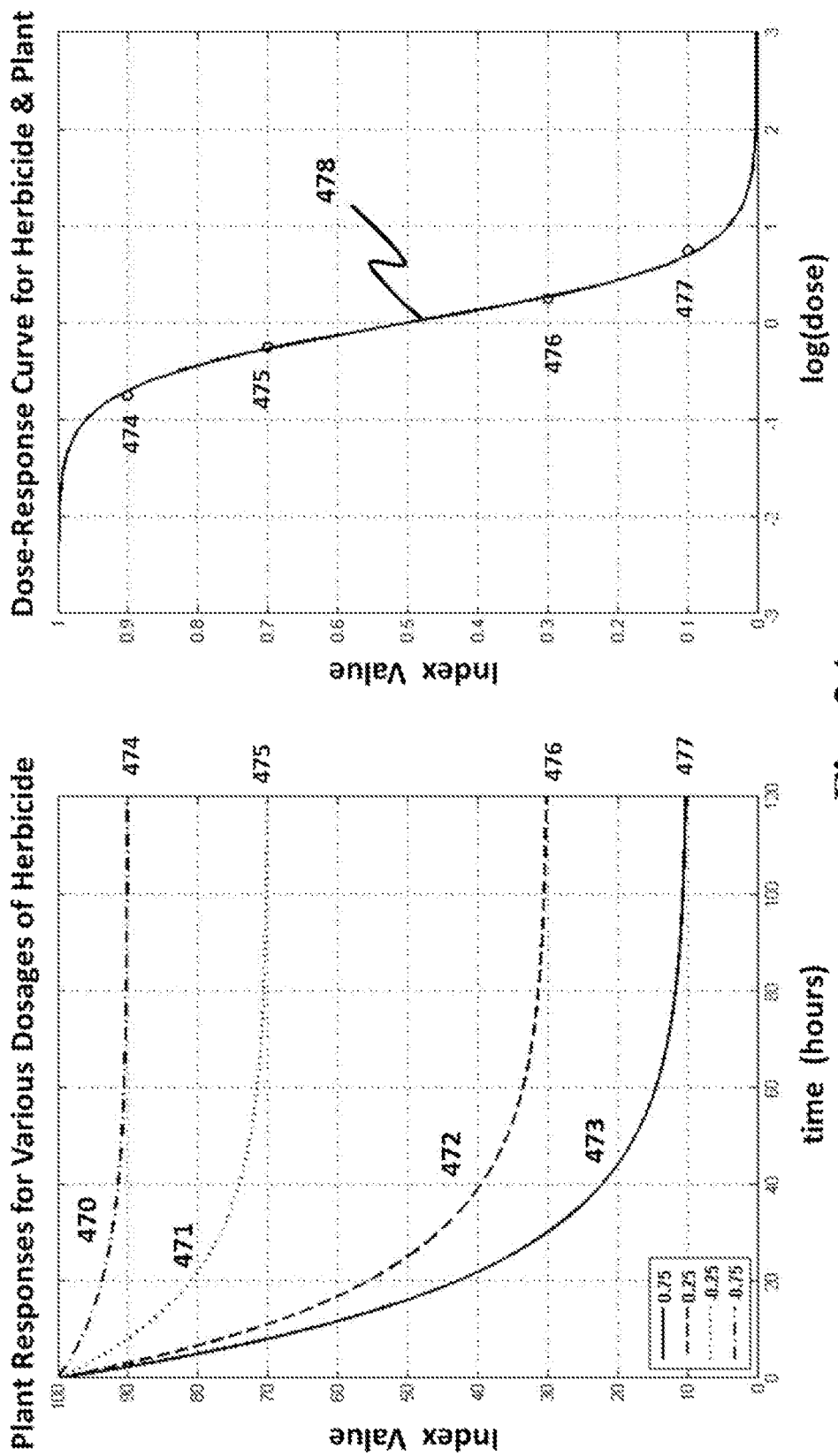
FIG. 24 illustrates the generation of a dose-response curve from time-varying index value arrays.

The present invention may be used to generate a dose-response curve from a family of plant response curves. FIG. 24 provides an example of the method illustrated in the block diagram format of FIG. 14. First, similar plants are divided into four groups and each is treated with a different dosage of the herbicide treatment. In the example of FIG. 24, these doses (in ln(dose) format) are −0.75, −0.25, 0.25, and 0.75, respectively. Using spectral data and the Growth Index as described herein, the simulated family of plant response curves (470, 471, 472, 473) are presented in FIG. 24 (left). The exponential decay offsets are 90%, 70%, 30% and 10% (474, 475, 476, 477), respectively, corresponding to the log-dose values of −0.75, −0.25, 0.25, and 0.75, respectively. Using parameter estimation methods familiar to those skilled in the art, the sigmoid function 478 may be derived as shown in FIG. 24 (right) with the data points (circles, 474, 475, 476, 477) representing the plant response offset values (90%, 70%, 30% and 10%) for the respective log-dose values (−0.75, −0.25, 0.25, and 0.75), respectively. The response values in FIG. 24 (right) are shown as a percentage of a full scale of 1.0, as is common for such charts.

As shown in FIG. 24, the present invention may be used to generate dose-response curves similar to current state-of-the-art dose-response curves as reported by Minkey and Moore. Advantageously, the present invention may use a spectral imaging system to conveniently, noninvasively and non-destructively acquire plant response data in a shortened time window, such as under 24 hours.

In one embodiment, the present invention provides a dose-response curve based on a family of plant response curves derived from spectral data.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of characterizing a time varying response of at least one plant subjected to a plant treatment, comprising the steps of:
   a) using a spectral imaging system to remotely and noninvasively acquire a spectral data set comprising at least first and second spectral image samples of one or more target surfaces for the at least one plant subjected to the plant treatment wherein :
      (i) the first and second spectral image samples are acquired from the at least one plant from at least first and second different spectral sampling events, respectively, occurring at least at first and second different sampling times during a time window in which the plant treatment is acting on the at least one plant; and
      (ii) each of the first and second spectral image samples include spectral information associated with two or more pre-selected wavelength regions of the electromagnetic spectrum, wherein:
         1) for each of the first and second spectral image samples, the spectral information associated with the two or more pre-selected wavelength regions is indicative of how the plant treatment impacts photosynthesis of the at least one plant over time; and
         2) the two or more pre-selected wavelength regions include spectral information indicative of a spectral response associated with at least one photosynthesis-related plant pigment; and
   b) using information comprising the spectral information associated with the two or more pre-selected wavelength regions of the electromagnetic spectrum from at least the first and second spectral image samples to provide information indicative of the response of the at least one plant to the plant treatment as a function of time.

2. The method of claim 1, wherein step (b) comprises the steps of:
   (i) providing an index data set comprising a plurality of index values respectively corresponding to each of at least two spectral image samples, respectively, wherein each index value is derived from an algorithm that uses at least a portion of the spectral data set to derive the index value, and wherein each index value provides information indicative of the response of the at least one plant to the plant treatment at the corresponding spectral sampling event; and
   (ii) using information comprising the index values for at least two spectral image samples to provide information indicative of the response of the at least one plant to the plant treatment as a function of time.

3. The method of claim 2, wherein step (ii) comprises the steps of:
   1) providing a mathematical function that is indicative of the variation of the index values as a function of time;
   2) providing one or more parameters of the mathematical function that control the fit of the mathematical function with respect to the variation of the index values as a function of time;
   3) using information comprising the values of the one or more parameters to indicate the response of the at least one plant to the plant treatment.

4. The method of claim 1, wherein step (a) comprises the step of remotely and noninvasively acquiring the first and second data samples using a spectral imaging system.

5. The method of claim 1, wherein step (b) comprises the step of using an index algorithm that converts at least the first and second spectral data samples into at least first and second index values, respectively, wherein each index value is indicative of the plant response at the time that the corresponding spectral data sample was acquired.

6. The method of claim 1, wherein step (a) comprises using an image capture array to capture a plurality of spectral images of at least a portion of the at least one plant, wherein the image capture array captures the spectral images using a filter array, and wherein the filter array comprises two or more filter elements associated with the two or more pre-selected wavelength regions, respectively.

7. The method of claim 1, wherein step (a) comprises acquiring the spectral information for the first or second spectral image sample through a filter that provides a filtering bandwidth in the range from 5 nm to 200 nm wide.

8. The method of claim 1, wherein each of the first and second spectral image samples comprises a data volume comprising a first dimension representing the spectral information associated with the two or more pre-selected wavelength regions of the electromagnetic spectrum, and at least two additional dimensions representing intensity images indicative of a spatial distribution of the spectral information.

9. The method of claim 1, wherein step (b) comprises using a time varying function to characterize the plant response, wherein said function is a time-decaying exponential function.

10. The method of claim 1, wherein step (b) comprises using information from an observation time window to characterize the plant response over a longer period of time than the observation time window.

11. The method of claim 1, wherein step (b) comprises using a time-decaying, exponential function to characterize the plant response, with a time constant parameter indicative of the rate at which the plant treatment causes a plant response and a recovery offset parameter indicative of a probability of a recovery to the plant treatment.

12. The method of claim 1, wherein at least one pre-selected wavelength region corresponds to a plant spectral response associated with a herbicide mode of action.

13. The method of claim 1, wherein step (b) comprises using an image masking technique to exclude a portion of the spatial information within a scene associated with at least one pre-selected wavelength region of the electromagnetic spectrum.

14. The method of claim 1, wherein step (b) comprises using a decay time constant for the plant response that is indicative of the rate of injury associated with the plant treatment.

15. A method to determine a time varying response of at least one plant to a plant treatment, comprising the steps of:
  a) providing a treated plant that has been treated with at least one plant treatment agent;
  b) at a first event in time, capturing a first portion of spectral data from the treated plant;
  c) using the first spectral data portion to compute a first index value for the first event that is indicative of a plant characteristic of the treated plant at the time of the first event, wherein the first spectral data portion is associated with at least one pre-selected wavelength band that is indicative of how the plant treatment impacts photosynthesis of the at least one plant over time and that includes spectral information indicative of a spectral response associated with at least one photosynthesis-related plant pigment, and wherein the plant characteristic has a time varying response to the plant treatment;
  d) at a second event in time, capturing a second portion of spectral data from the treated plant;
  e) using the second spectral data portion to compute a second index value for the second event that is indicative of the plant characteristic of the treated plant group at the time of the second event, wherein the second spectral data portion is associated with at least one pre-selected wavelength band that is indicative of how the plant treatment impacts photosynthesis of the at least one plant over time and that includes spectral information indicative of a spectral response associated with at least one photosynthesis-related pigment; and
  f) using information including the first and second index values to provide information indicative of an impact of the plant treatment on the at least one plant.

16. The method of claim 15, wherein the treated plant is part of a plant population including a multiple of plant groups, wherein each plant group comprises at least one treated plant, wherein steps a) to f) are carried out respectively on the multiple groups of the plant population to determine a family of time varying response curves, wherein each plant group is treated with a different dosage of the at least one treatment agent, wherein each time varying response curve of the family of time varying response curves corresponds to a different treatment dosage of the at least one treatment agent; and wherein the method further comprises using the family of time varying response curves and the corresponding dosages to determine a corresponding dose-response curve representative of the effect of the treatment on the plant population.

17. A spectral analysis system for characterizing a response of at least one plant to a treatment with at least one treatment agent, comprising:
  a) a spectral acquisition system that comprises at least one of a spectral point acquisition system or a spectral imaging acquisition system, wherein the spectral acquisition system is configured to acquire spectral data from the at least one plant in a manner such that the acquired spectral data is associated with at least two, unique, pre-selected wavelength bands of the electromagnetic spectrum, wherein each of the at least two, unique, pre-selected wavelength bands of the electromagnetic spectrum includes associated spectral information indicative of how the treatment impacts photosynthesis of the at least one plant over time; and
    wherein each of the at least two, unique, pre-selected wavelength bands of the electromagnetic spectrum includes associated spectral information indicative of a spectral response associated with at least one photosynthesis-related plant pigment; and
  b) a computer system comprising:
    (i) a memory coupled to the spectral acquisition system in a manner effective to store the acquired spectral data;
    (ii) program instructions that cause the spectral acquisition system to acquire the spectral data from the at least one plant at least at the first and second spectral sampling events; and
    (iii) program instructions that use information comprising the acquired spectral data to evaluate the response of at least one plant to the treatment over time.

18. The method of claim 1, wherein the plant treatment is a herbicide treatment.

19. The method of claim 1, wherein:
  (i) the first, pre-selected wavelength region is aligned with an absorbance peak associated with at least one photosynthesis-related, plant pigment selected from at least one of chlorophyll-a, chlorophyll-b and carotenoid pigments;
  (ii) the second, pre-selected wavelength region is not aligned with an absorbance peak associated with at least one photosynthesis-related, plant pigment selected from at least one of chlorophyll-a, chlorophyll-b and carotenoid pigments; and wherein step b) of claim 2 comprises:
(i) computing a plant growth characteristic; and
(ii) using the computed growth characteristic to provide information indicative of the response of the at least one plant to the plant treatment as a function of time.

20. The method of claim 19, wherein the plant growth characteristic is a Growth Index computed as follows:

$$\text{Growth Index} = k_1(A)(D) + k_2;$$

where A is associated with an average reflectance level within the photosynthesis region of the electromagnetic spectrum; D is associated with a difference between a reflectance associated with a wavelength region within the photosynthesis region away from a pigment absorbance peak and a reflectance associated with a wavelength region aligned with a pigment absorbance peak; $k_1$ is a scalar factor; and $k_2$ is an offset term.

21. The method of claim 20, wherein the Growth Index is computed using spectral data from the two wavelength regions as follows:

$$\text{Growth Index} = k_1(A)(D) + k_2 = \frac{[\lambda_1] - [\lambda_2]}{[\lambda_1] + [\lambda_2]};$$

where $$A = \frac{1}{[\lambda_1] + [\lambda_2]};$$

$D$ = difference in non-peak & peak reflectance = $[\lambda_1] - [\lambda_2]$;

and where $[\lambda_1]$ and $[\lambda_2]$, are spectral images, captured by a spectral image acquisition system, centered around wavelength regions of the electromagnetic spectrum, $\lambda_1$ and $\lambda_2$, respectively, with $\lambda_1$ centered in a region of the photosynthesis region not aligned with an absorbance peak, and with $\lambda_2$ centered in a region of the photosynthesis region that is aligned with an absorbance peak.

* * * * *